United States Patent [19]

Sasada et al.

[11] Patent Number: 5,692,061
[45] Date of Patent: Nov. 25, 1997

[54] METHOD OF UTILIZING A TWO-DIMENSIONAL IMAGE FOR DETECTING THE POSITION, POSTURE, AND SHAPE OF A THREE-DIMENSIONAL OBJECTIVE

[75] Inventors: Katsuhiro Sasada; Tomoharu Nakahara; Hidekazu Araki, all of Kadoma, Japan

[73] Assignee: Matsushita Electric Works, Ltd., Osaka, Japan

[21] Appl. No.: 391,006

[22] Filed: Feb. 21, 1995

[30] Foreign Application Priority Data

Feb. 23, 1994 [JP] Japan ................................. 6-025731
Dec. 20, 1994 [JP] Japan ................................. 6-317279

[51] Int. Cl.⁶ ............................................. G06K 9/00
[52] U.S. Cl. ............................... 382/106; 382/154
[58] Field of Search .............................. 382/103, 106, 382/154, 291; 348/42, 135; 356/12, 20

[56] References Cited

U.S. PATENT DOCUMENTS 4,414,685  11/1983  Sternberg ................................. 382/49
4,556,986  12/1985  Craig ....................................... 382/42
5,267,329  11/1993  Ulich et al. ............................ 382/48

FOREIGN PATENT DOCUMENTS

| 61-122509 | 6/1986 | Japan | 382/154 |
| 2-230478 | 9/1990 | Japan | G06F 15/70 |
| 4-54409 | 2/1992 | Japan | G01B 11/26 |
| 6-29695 | 4/1994 | Japan | G01B 11/00 |

*Primary Examiner*—Andrew Johns
*Attorney, Agent, or Firm*—Burns, Doane, Swecker & Mathis, L.L.P.

[57] ABSTRACT

A method for recognizing a three-dimensional objective in which a two-dimensional image is obtained from the same viewing point as a distance image obtained by picking up the objective in a three-dimensional space and the two-dimensional image is utilized to previously limit an existence zone of the objective under detection for the distance image and to perform objective detecting operation over the partial distance image in the limited zone, thereby realizing a sufficiently high speed detection of, in particular, the three-dimensional objective.

8 Claims, 58 Drawing Sheets

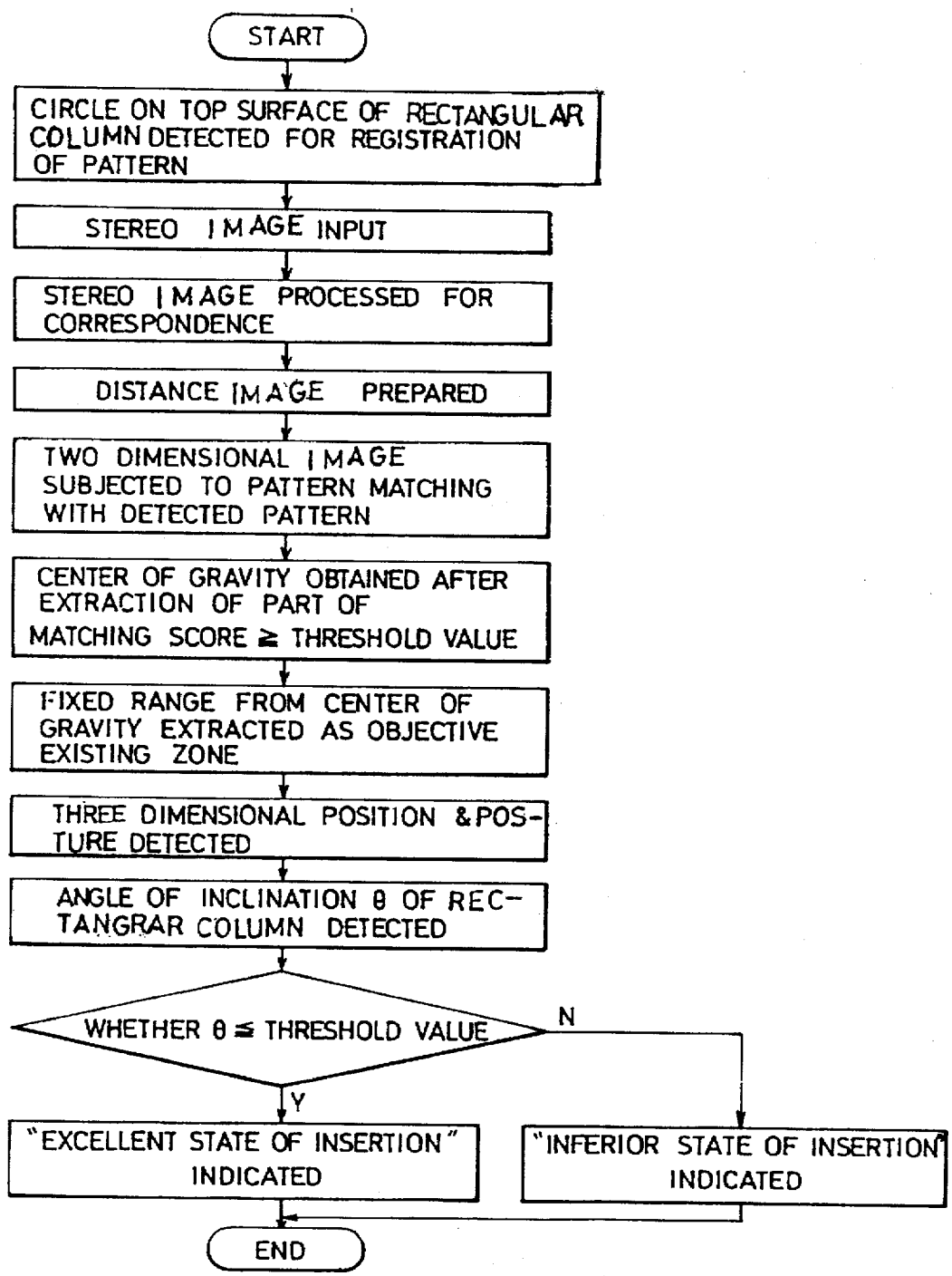

FIG. 26
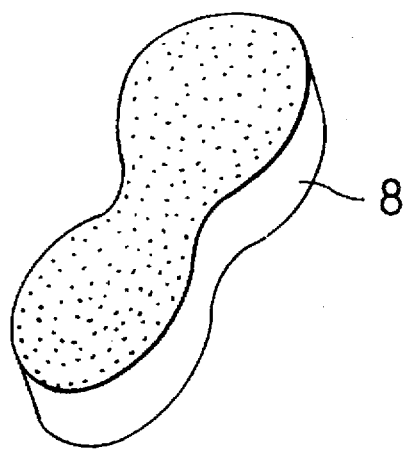
FIG. 27
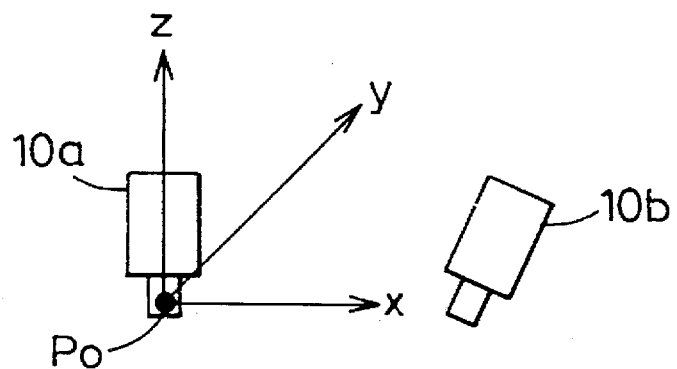
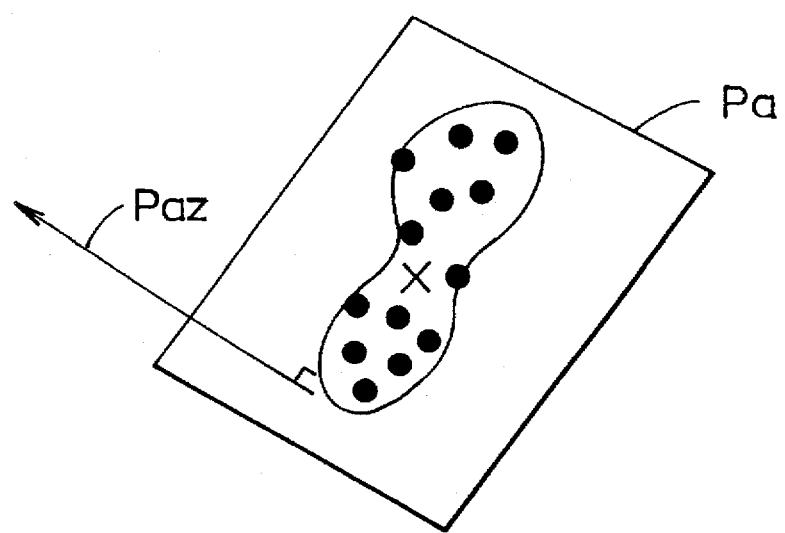

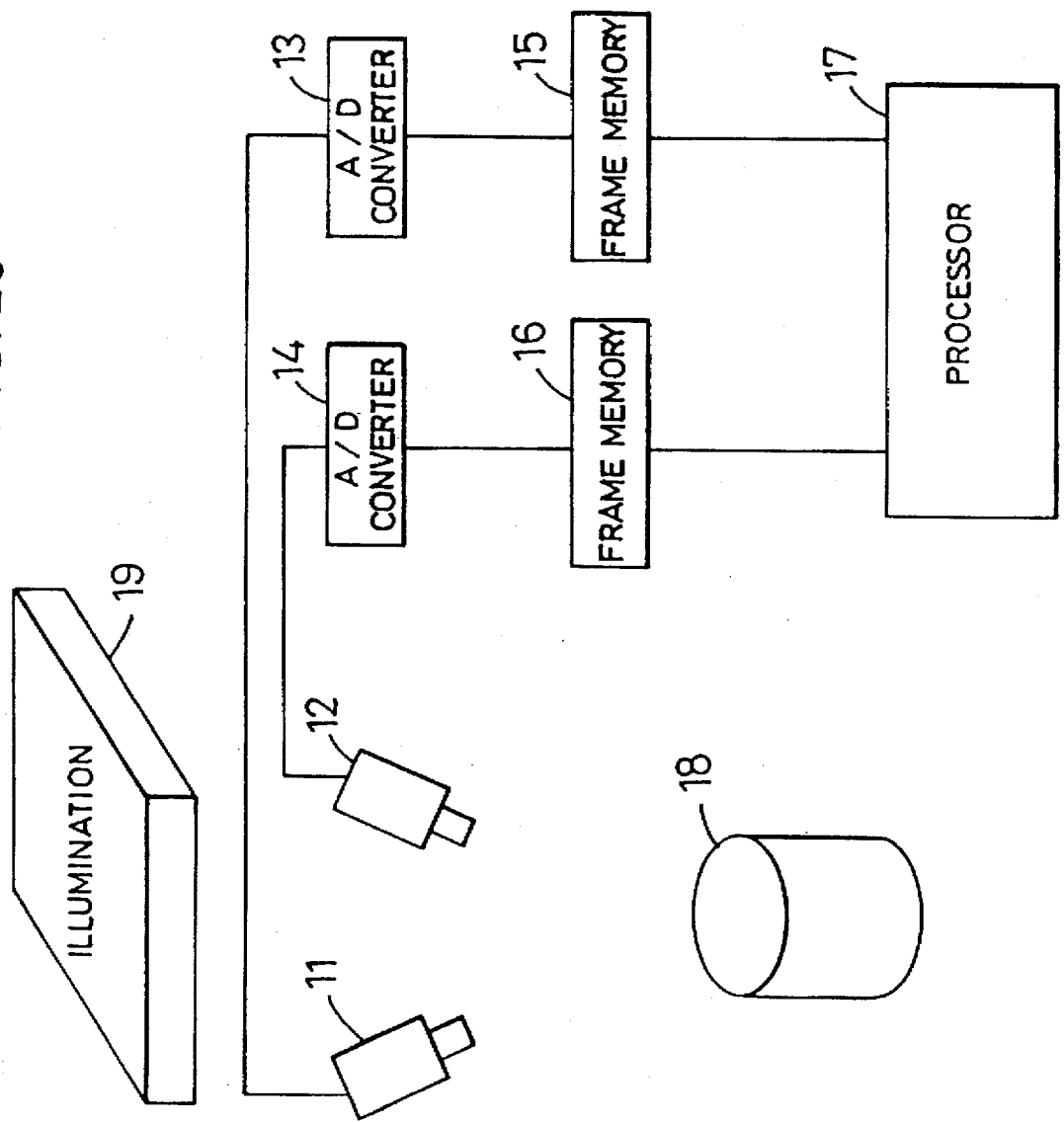

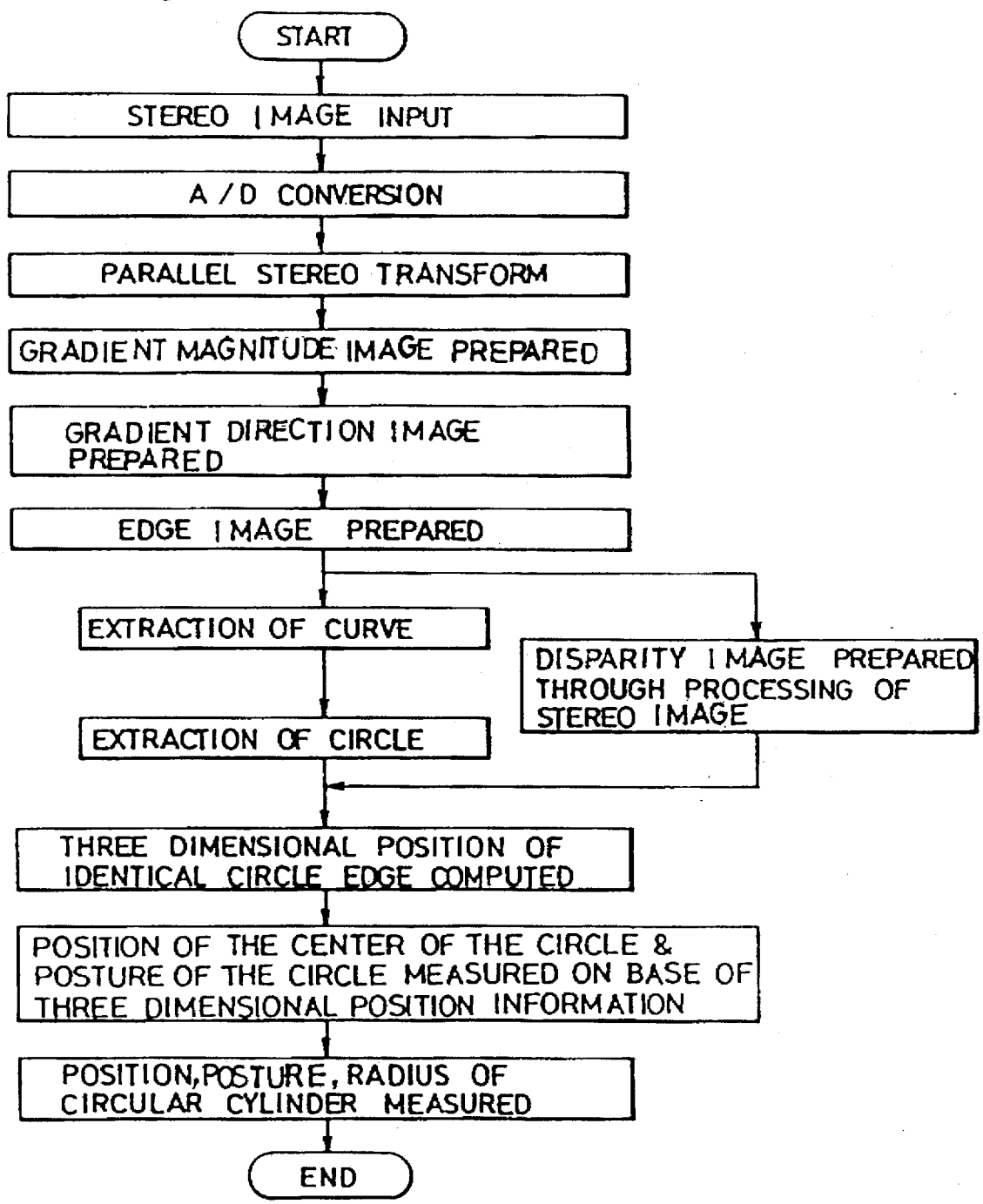

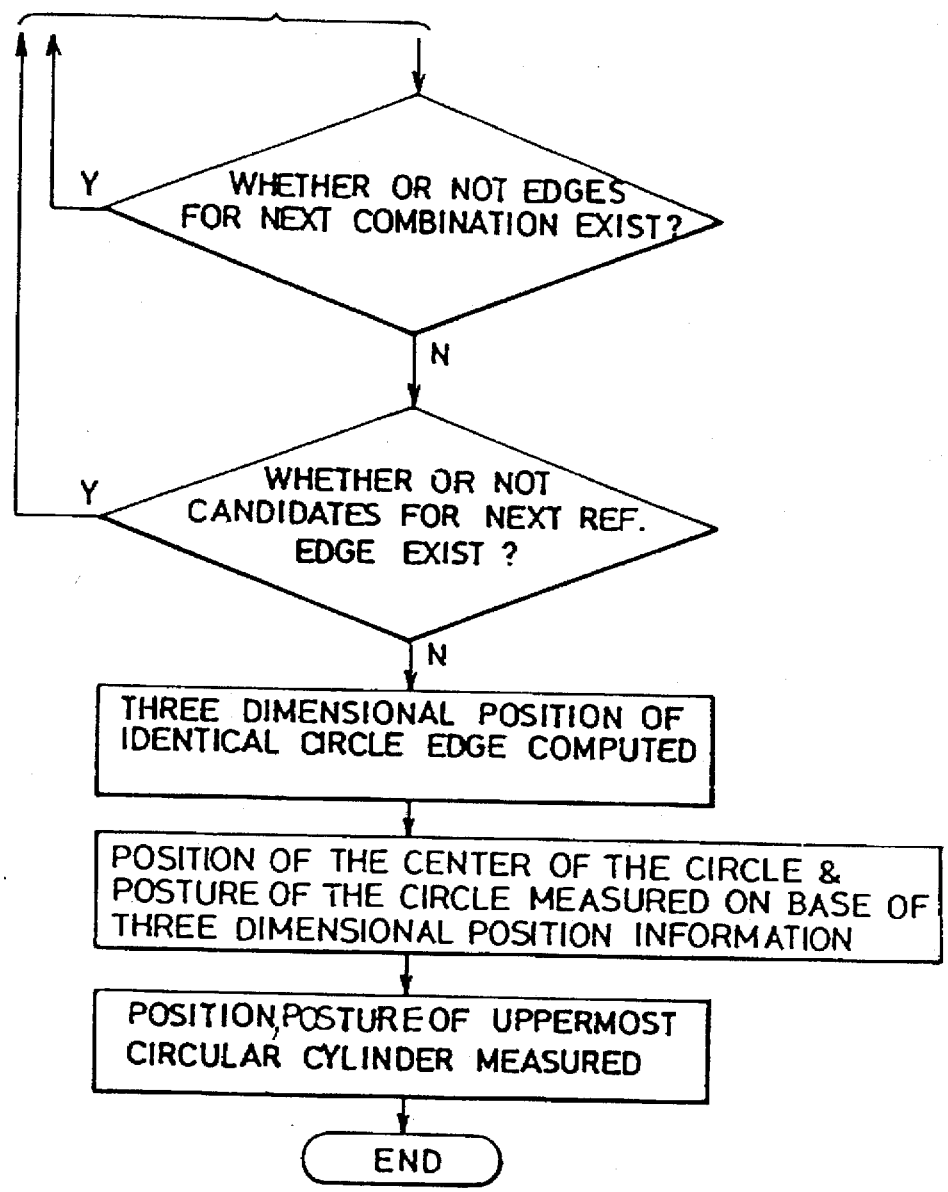

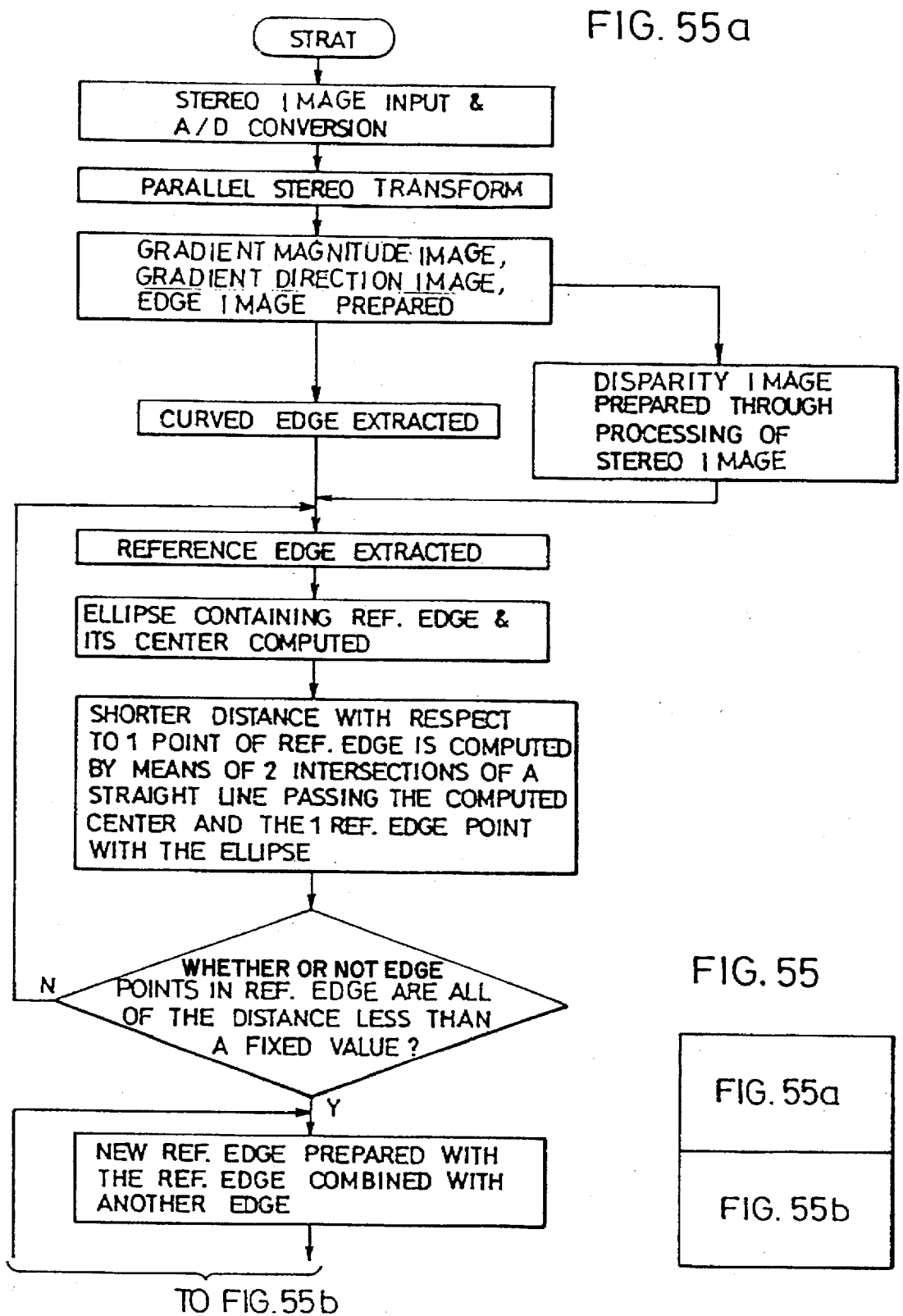

FIG. 55b

FROM FIG. 55a

```
SHORTER DISTANCE WITH RESPECT TO
1 POINT OF REF. EDGE IS COMPUTED
BY MEANS OF 2 INTERSECTIONS OF A
STRAIGHT LINE PASSING THE
COMPUTED CENTER AND THE 1 REF.
EDGE POINT WITH THE ELLIPSE
```

WHETEHR OR NOT EDGE POINTS IN REF. EDGES ARE ALL OF THE DISTANCE LESS THAN A FIXED VALUE ? — N

Y

REF. EDGE AND ANOTHER EDGE ARE DECIDED TO BE OF IDENTICAL CIRCLE

N — WHETHER OR NOT EDGES FOR NEXT COMBINATION ARE PRESENT ?

Y

THREE DIMENSIONAL POSITION OF IDENTICAL CIRCLE COMPUTED

POSITION OF THE CENTER OF THE CIRCLE & POSTURE OF THE CIRCLE MEASURED ON BASE OF THREE DIMENSIONAL POSITION INFORMATION

POSITION, POSTURE, RADIUS OF UPPERMOST CIRCULAR CYLINDER MEASURED

END

FIG. 56
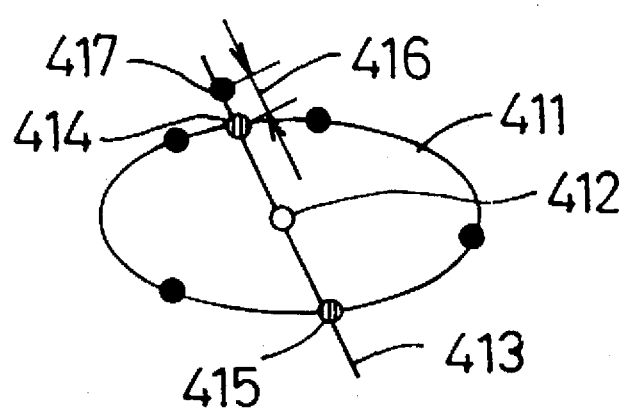
FIG. 58
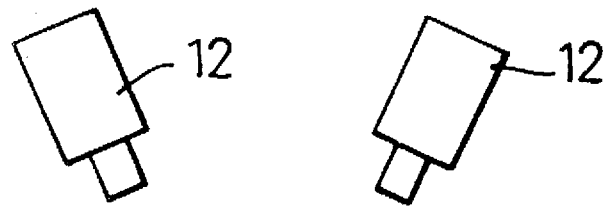
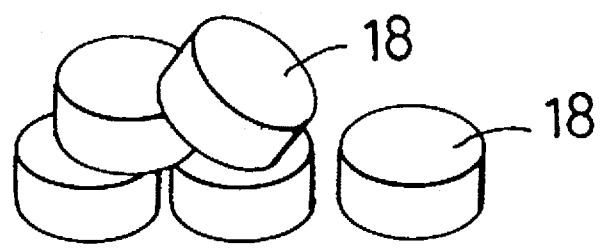

FIG. 62
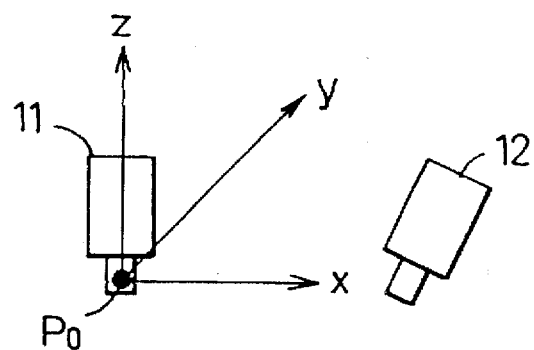
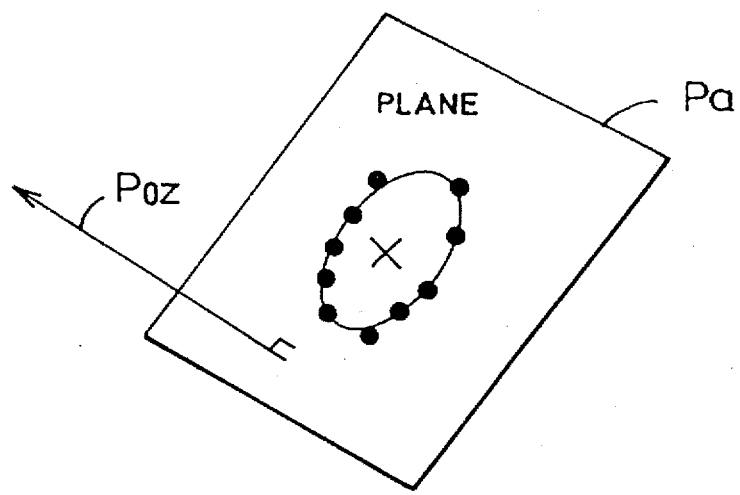
FIG. 63
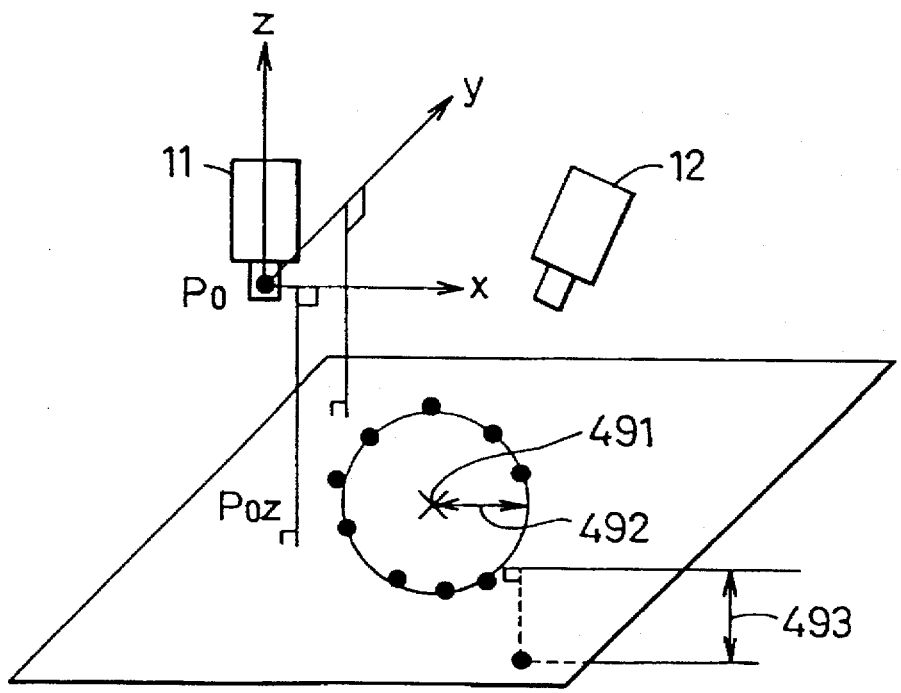

FIG. 64b

FROM FIG. 64a

↓

IDENTICAL CIRCLE EDGES ARE ROTATED SO THAT z-AXIS OF IMAGE TAKING SYSTEM OF COORDINATES COINCIDES WITH DIRECTION OF NORMAL OF THE PLANE IN THREE DIMENSIONAL SPACE

↓

EDGE POINTS SEPARATED FROM THE PLANE MORE THAN A FIXED DISTANCE ERASED

↓

THE CENTER & RADIUS OF CIRCLE COMPUTED WITHIN TWO DIMENSIONAL SPACE WITH x,y COORDINATES VALUES OF IDENTICAL CIRCLE EDGE AFTER ROTATION EMPLOYED

↓

CENTER OF THE CIRCLE INVERSE ROTATED TO THE ORIGINAL SYSTEM OF COORDINATES

↓

POSITION, POSTURE, RADIUS OF CIRCULAR CYLINDER MEASURED

↓

END

FIG. 64

| FIG. 64a |
|----------|
| FIG. 64b |

FIG. 70a
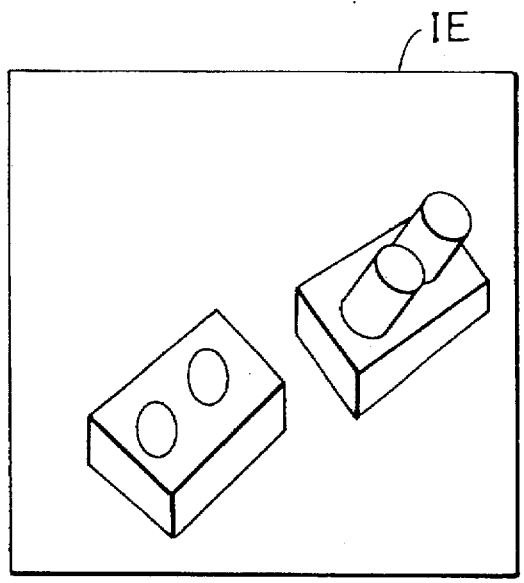
FIG. 70b
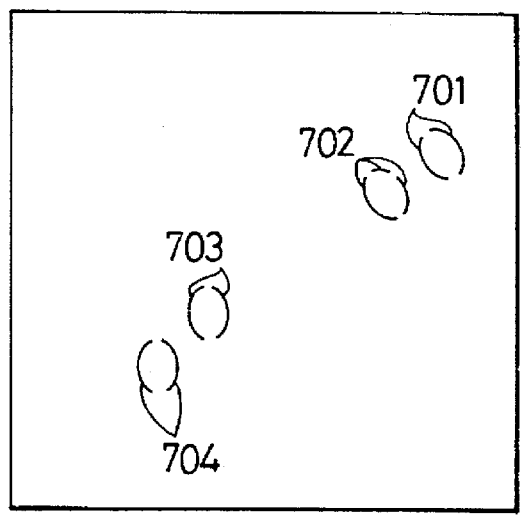
FIG. 71
| -1 | 0 | 1 |
|---|---|---|
| -2 | 0 | 2 |
| -1 | 0 | 1 |
Gx
| 1 | 2 | 1 |
|---|---|---|
| 0 | 0 | 0 |
| -1 | -2 | -1 |
Gy

METHOD OF UTILIZING A TWO-DIMENSIONAL IMAGE FOR DETECTING THE POSITION, POSTURE, AND SHAPE OF A THREE-DIMENSIONAL OBJECTIVE

BACKGROUND OF THE INVENTION

The present invention relates to a method for recognizing an objective in a three-dimensional space and, more particularly, an objective recognition method for detecting the position, attitude or posture and shape of an objective.

DESCRIPTION OF RELATED ART

For recognizing a three-dimensional objective, there have conventionally been suggested a method in which objective position detection is carried out by extracting a cluster in a space of parameters indicative of the positional posture of an objective obtained based on correspondences between all edge segments in an image and all arris or ridge lines of an objective model as disclosed in Japanese Patent Laid-Open Publication No. 2-230478. In another method an objective to be checked is considered to be an objective model comprising a plurality of rigid bodies and joints having degrees of freedom of rotation connected to the bodies. Posture candidates for each of the rigid bodies are found based on correspondences between features (such as designated segments or designated points) in an image and the objective model. An image of the objective image is estimated from the respective posture candidates and collated with the image to thereby determined a suitable posture as disclosed in Japanese Patent Laid-Open Publication No. 4-54409.

In the former method, it is necessary to make correspondences between all the edge segments in the image and all the arris lines of the objective model. Thus, when the target objective has a complicated shape, the number of edge segments in an image and the number of arris lines in an objective model become large, which disadvantageously results in that a lot of time is required for making the correspondences and a detection accuracy becomes bad. Even in the latter method, when an objective has a flexible structure, the numbers of rigid bodies and joints become large. So final detection of the three-dimensional posture of an objective requires lots of time.

Meanwhile, for the purpose of recognizing an objective having such a shape as a cylindrical shape, there is suggested such a method for realizing high-speed detection of an objective as shown in Japanese Patent Laid-Open Publication No. 6-29695. In this method, an objective to be checked is photographed obliquely by two image pick-up means to obtain two images. Curve edges are extracted from the two images, some of the curve edges when located within a predetermined distance range being regarded as edges in an identical elliptical line. The center of a right circle is regarded as photographed as the center of the ellipse in the images. The centers of the upper and lower ellipses are calculated and made associated with each other from the two images. The centers of right circles corresponding to the upper and lower ellipses are calculated based on the trigonometrical survey. The orientation or direction of a line segment connecting the calculated two centers is calculated to find a central line for the cylinder, thereby determining the position and posture of the cylindrical body.

However, this method has a problem that, when it is desired to recognize a ring-shaped objective or a plurality of cylindrical objectives, combinations of curve edges not in an identical circle are erroneously regarded as in the identical circle, and some edges in the lower cylindrical surface become positioned off the screen, leading to the fact that it becomes impossible to measure the direction of the central line of the cylindrical objective, i.e., its posture. Further, when the center of a circle is projected to an image, the center will be projected as offset from the circle center in the image so long as the plane containing the circle is not perpendicular to the optical axis of the image pick-up means. Furthermore, since nearly half of edges of the lower circle are hidden as unseen, the center accuracy of the circle calculated based on such edges tends to be low. Accordingly, the values of the position and posture thus obtained have been low in accuracy and reliability.

SUMMARY OF THE INVENTION

It is therefore an object of the present invention to provide an objective recognition method for realizing high-speed detection with a high accuracy.

In accordance with an aspect of the present invention, the above objective is attained by providing an objective recognition method which comprises the steps of obtaining a two-dimensional image from the same viewing point as a distance image obtained by photographing an objective in a three-dimensional space, specifying a partial image for the two-dimensional image, applying the specified two-dimensional partial image to the distance image to extract a partial image for the distance image, and subjecting the distance partial image to an objective detecting operation.

In accordance with another aspect of the present invention, there is provided an objective recognition method wherein a two-dimensional image is obtained from the same viewing point as a distance image obtained by photographing an objective in a three-dimensional space, an inertia principal axis and gravity center of a target objective image in the two-dimensional image, the distance image is projected onto a plane passing through the inertia principal axis and perpendicular to the two-dimensional image, an inertia principal axis and gravity center of a target objective image in a projected plane, and a position and posture of an inertia principal axis of the target objective in the three-dimensional space is detected from the 2 obtained inertia principal axes and the 2 obtained gravity centers.

In accordance with yet a further aspect of the present invention, there is provided an objective recognition method wherein an edge image and an intensity gradient direction image are obtained from gray images obtained by photographing an objective having a circular shape in a three-dimensional space from a plurality of directions, an edge image as a reference is created through stereo image processing and a disparity image is created from the reference image and the other edge image, only curved edges are extracted from the reference edge image, a circle is extracted from the curved edges, and a position and posture of the extracted circle are detected with use of three-dimensional information found from the disparity of edge points of the extracted circle.

In the present invention, in the objective detecting operation, the two-dimensional image is utilized to previously restrict the existence zone of the objective under detection in the distance image, and the objective detecting operation is carried out over the distance partial image of the restricted zone. Thus, the present invention can realize the high-speed detecting operation when compared to the prior art wherein detecting operation is carried out over all zones of the distance image. In this case, the specification of the partial image of the two-dimensional image may be carried out on the basis of the shape pattern of the surface of the target objective, the statistical image feature of texture, the color or brightness classification, or the two-dimensional geometrical feature derived from the three-dimensional geometrical feature of the target objective.

While the present invention is susceptible of various modifications and alternative constructions, certain illustrated embodiments hereof have been shown in the drawings and will be described below in detail. It should be understood, however, that there is no intention to limit the invention to specific forms disclosed, but on the contrary, the intention is to cover all modifications, alternative constructions and equivalents falling within the spirit and scope of the invention.

BRIEF EXPLANATION OF THE DRAWINGS

These and other features of the present invention will become apparent from the following description, with reference to the accompanying drawings, in which:

FIG. 22 is a flowchart for explaining the operation of an embodiment to which the inspection method according to the present invention is applied;

FIG. 26 is a perspective view of an example of the target objective in FIG. 25;

FIG. 27 is a diagram for explaining a plane onto which the upper surface of the target objective in the embodiment of FIG. 25 is applied;

FIG. 29 is a block diagram of a system in which the present invention is employed and an objective to be detected has a cylindrical shape;

FIG. 33 is a flowchart for explaining the operation of a variation of the present invention;

FIGS. 52, 52A and 52B show a flowchart for explaining the operation of other embodiment of the present invention;

FIGS. 55, 55A and 55B show a flowchart for explaining the operation of a variation of other embodiment of the present invention;

FIG. 56 is a flowchart for explaining the extracting operation of the embodiment of FIG. 55;

FIG. 58 is a perspective view of objectives in the embodiment of FIG. 57;

FIG. 62 is a diagram showing a plane of an objective when viewed from its upper side in the embodiment of FIG. 61;

FIG. 63 is a diagram for explaining a state of the plane when rotated in the embodiment of FIG. 61;

FIGS. 64, 64A and 64B show a flowchart for explaining the operation of a variation of other embodiment of the present invention;

FIGS. 65, 65A and 65B show a flowchart for explaining the operation of other embodiment;

FIG. 70a is a diagram for explaining edge images in the embodiment of FIG. 68;

FIG. 70b is a diagram for explaining extracted circular edges in the embodiment of FIG. 68; and FIG. 71 is a diagram for explaining a Sobel operator used, for example, in the embodiments of FIGS. 29 to 31.

DETAILED DESCRIPTION OF THE PREFERRED EMBODIMENTS

Figure 1:
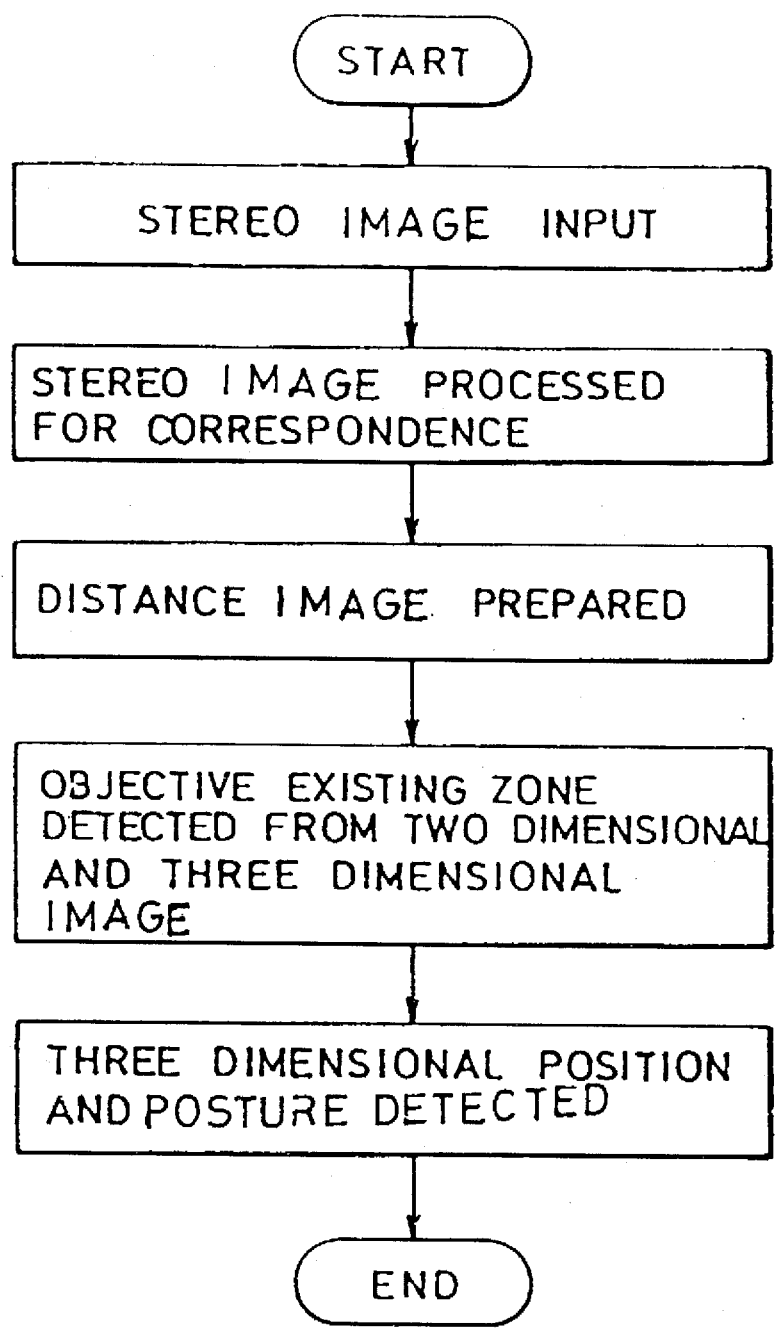
FIG. 1 is a flowchart for explaining the operation of an embodiment of a system of the present invention.
Figure 2:
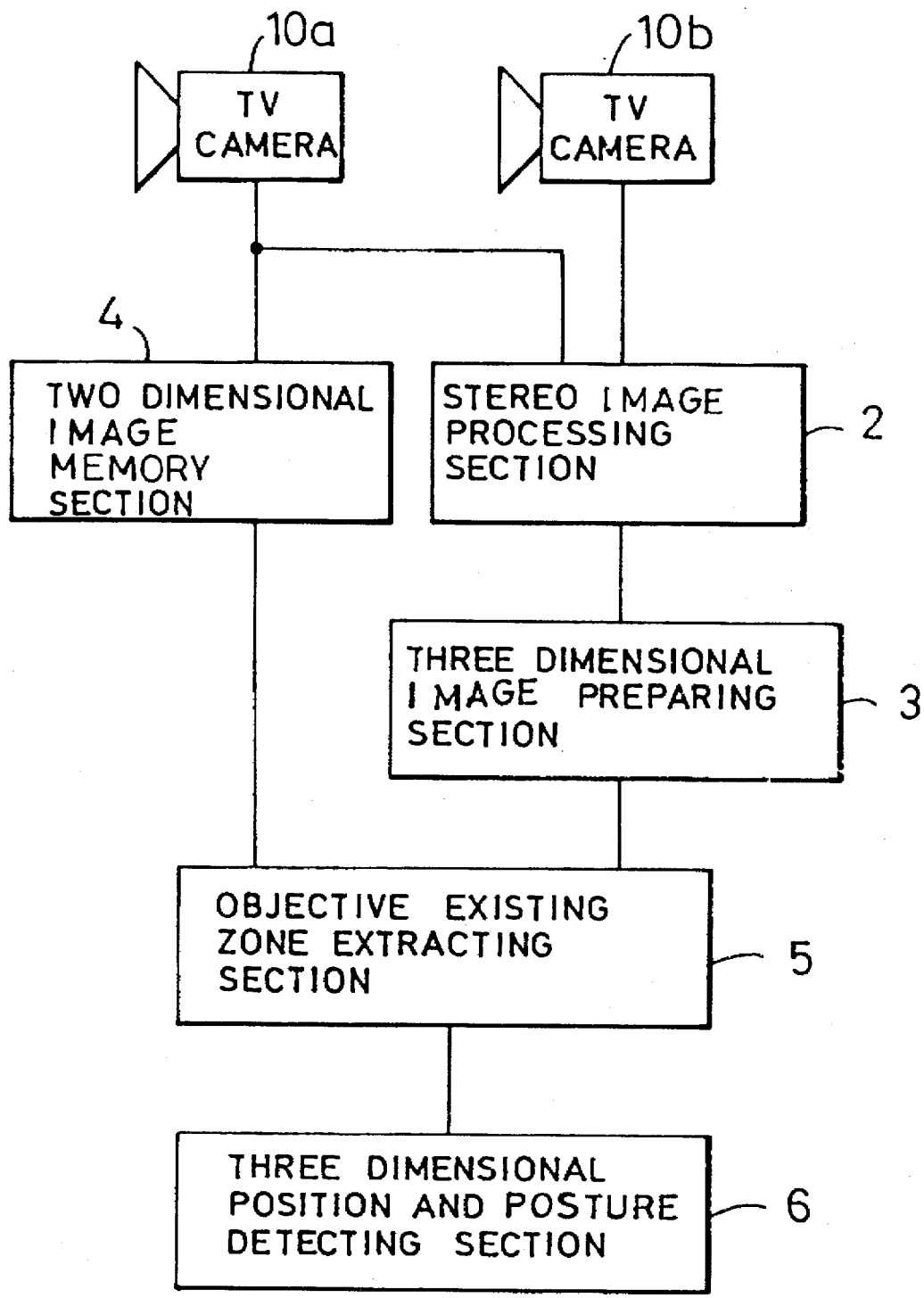
FIG. 2 is a block diagram of the system of the embodiment of FIG. 1.

The present invention will be detailed in connection with illustrated embodiments. First and second features of the present invention involving using a distance image and a two-dimensional image photographed from the same viewing point as the distance image. Though there are various ways of creating the distance image, explanation will be made in connection with a case where the distance image is created from a stereoscopic image, i.e., from two-dimensional images. In FIG. 2, reference symbols $10a$ and $10b$ denote television cameras for capturing stereo images. An image photographed by one $10a$ of the television cameras $10a$ and $10b$ connected to a two-dimensional image memory 4 is used as a stereo reference image. Images photographed by the television cameras $10a$ and $10b$ are associated with each other in a stereo image processor 2, and distances calculated based on the associated result are mapped onto the stereo reference image to generate a distance image in a three-dimensional image generator 3. The two-dimensional image acquired by one television camera $10a$ is stored in the two-dimensional image memory 4. An objective existence zone extractor 5, on the basis of the two-dimensional image and distance image, extracts an objective existence zone in which the objective is present, and a three-dimensional position/posture detector 6 detects a three-dimensional position or posture of the objective based on the objective existence zone and the distance image in its vicinity.

Figure 3:
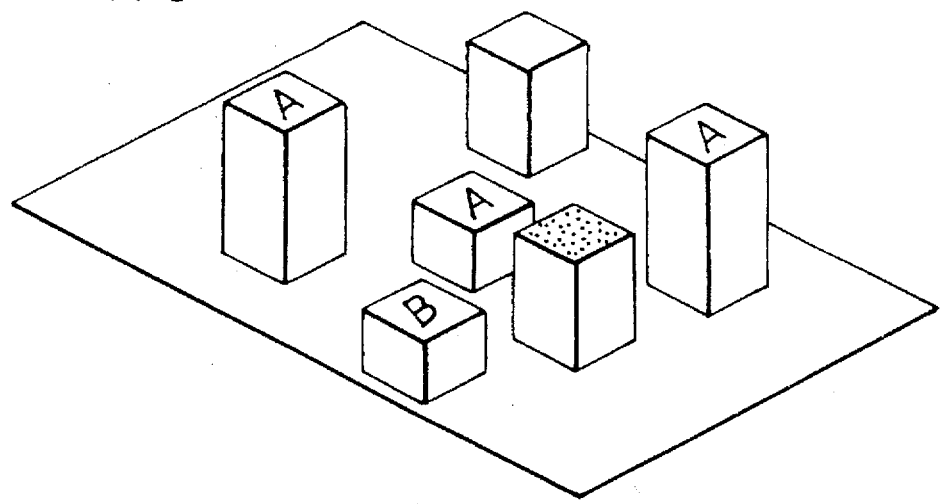
FIG. 3 is a perspective view of an example of objectives under detection in the embodiment of FIG. 1.
Figure 4A:
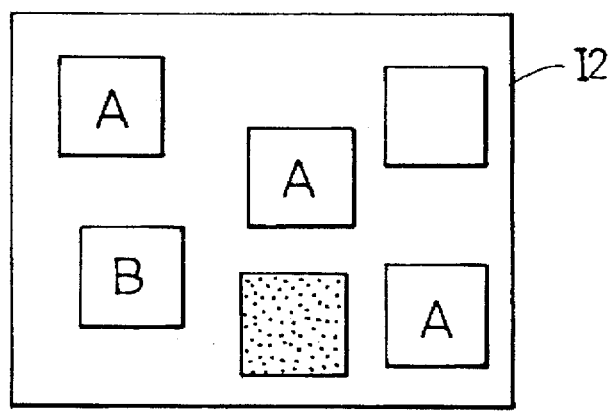
FIG. 4a is a diagram for explaining a two-dimensional image of the exemplary objectives in the embodiment of FIG. 1.
Figure 4B:
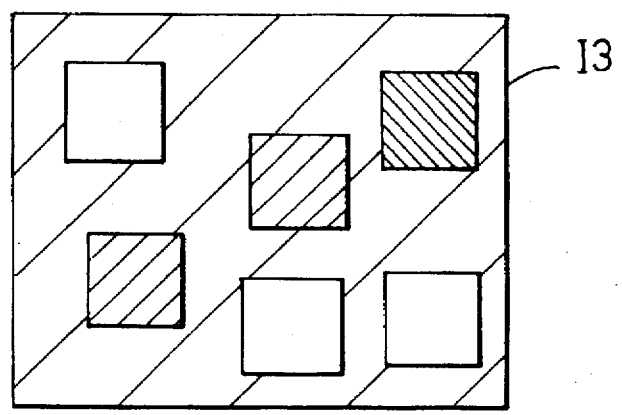
FIG. 4b is a diagram for explaining a distance image of the exemplary objectives in the embodiment of FIG. 1.

FIG. 3 shows an example of objectives to be detected, FIG. 4a is a two-dimensional image I2 of the exemplary objectives, and FIG. 4b is a distance image I3 thereof. Areas which are differently hatched in the distance image I3 stand for different heights of the objectives. This representation is also applied to cases which will be described later.

Figure 5:
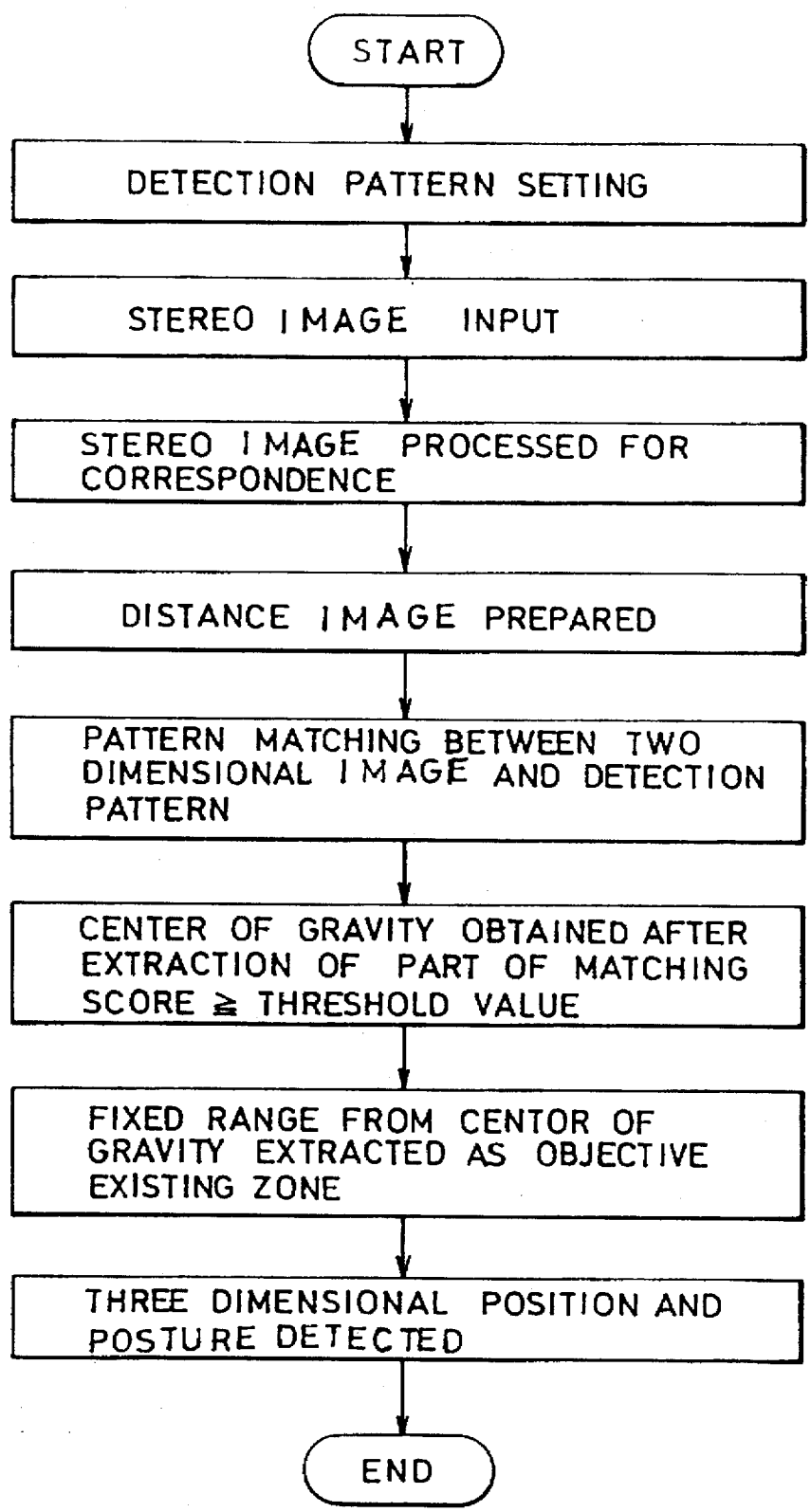
FIG. 5 is a flowchart for explaining the operation of a more specific variation of the embodiment of FIG. 1.
Figure 6:
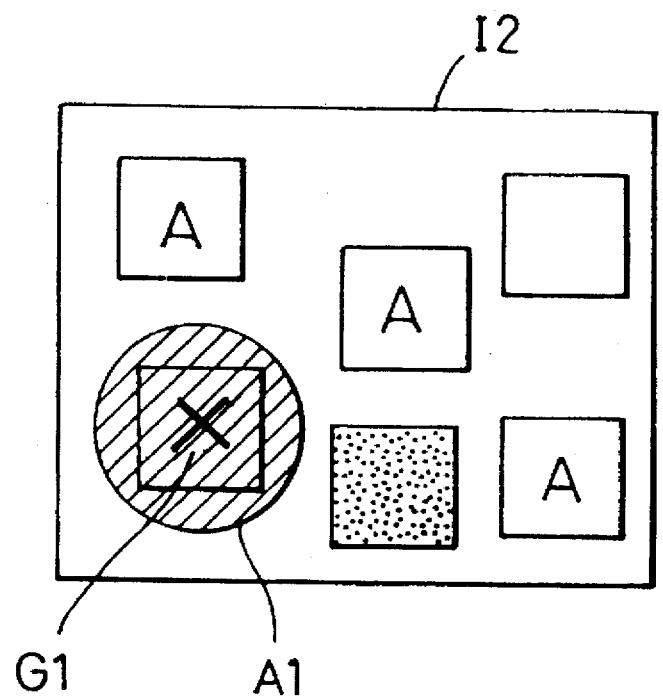
FIG. 6 is a diagram for explaining the operation of the variation of FIG. 5.

Explanation will first be made as to how to extract an objective existence zone using a shape pattern present on a surface of an objective under detection undetectable from the distance image. The extraction of an objective existence zone by the objective existence zone extractor 5 is carried out by means of pattern matching in the case of FIG. 5. For example, when a letter "B" is present on a surface of an objective under detection, the letter "B" is used as a detection pattern. Pattern matching is carried out between the two-dimensional image I2 and the detection pattern to extract a part corresponding to a matching score equal to or larger than a threshold value and to use as an objective existence zone A1 a zone including the extracted part and covering a circle having a center corresponding to a gravity center G1 of the extracted part as shown in FIG. 6. An objective detecting operation is carried out over a partial image of the distance image I3 corresponding to the objective existence zone A1. This objective detecting operation may be realized not only by the two methods already explained in connection with the prior art but also by another method which will be explained later.

Figure 8:
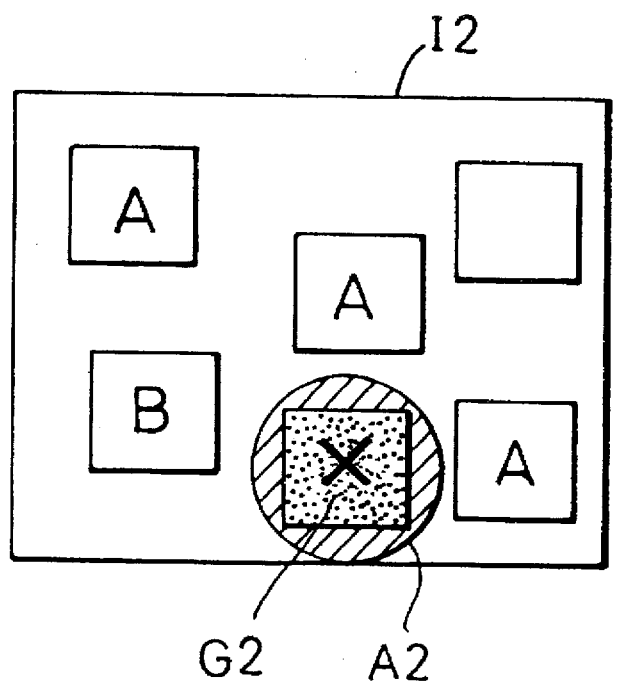
FIG. 8 is a diagram for explaining the operation of the variation of FIG. 7.
Figure 7:
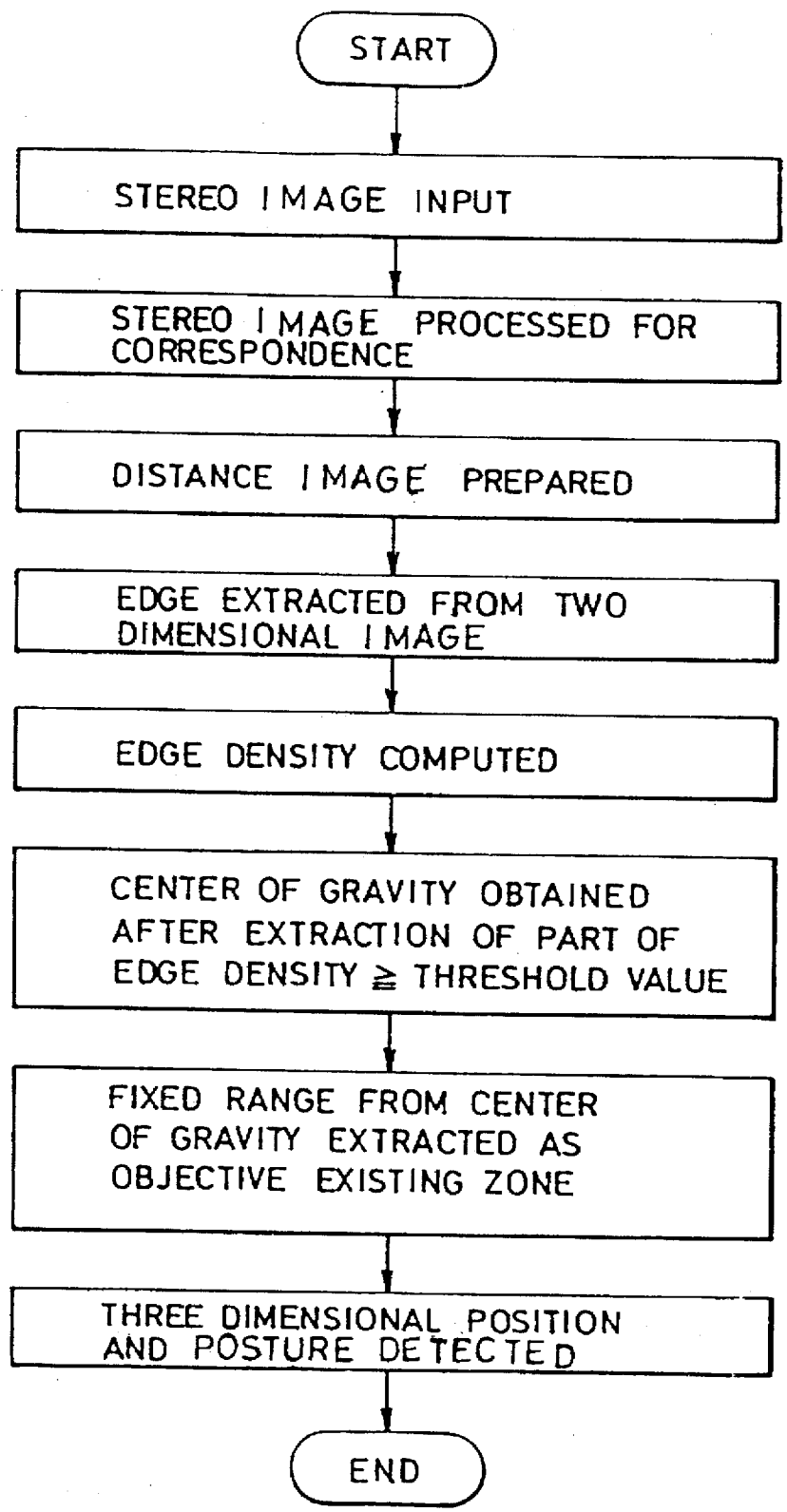
FIG. 7 is a flowchart for explaining the operation of another specific variation of the embodiment of FIG. 1.

For setting the objective existence zone A2, as shown in FIGS. 7 and 8, edges may be extracted from the two-dimensional image I2, a part corresponding to an edge intensity equal to or larger than a threshold value may be extracted, an objective existence zone A2 having a center corresponding to a gravity center G2 of the extracted part may be set, and objective detecting operation may be carried out over a partial image of the distance image I3 corresponding to the objective existence zone A2. This objective detecting operation utilizes the fact that differences in the statistical image features of the objective texture appear as different edge densities in the two-dimensional image I2.

Figure 9:
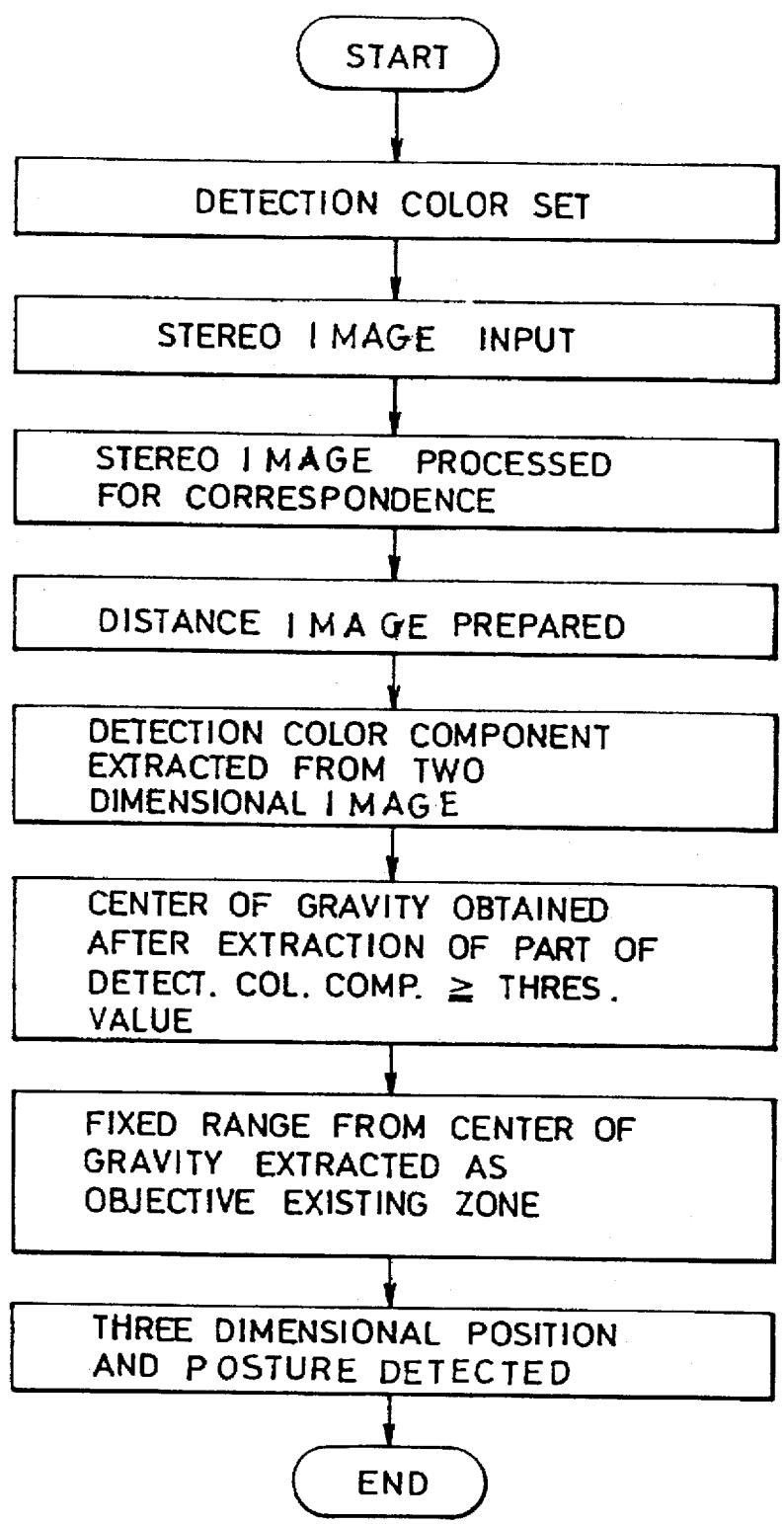
FIG. 9 is a flowchart for explaining the operation of a further specific variation of the embodiment of FIG. 1.
Figure 10:
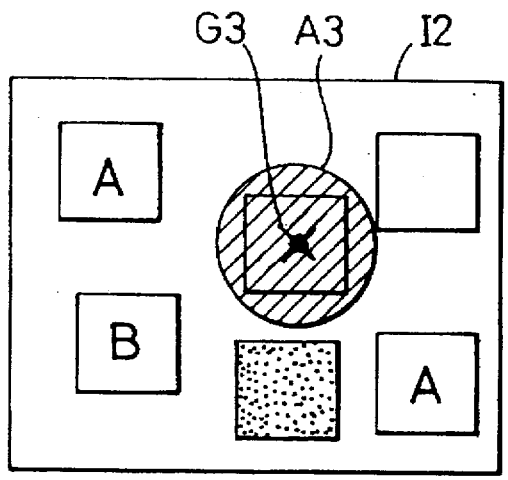
FIG. 10 is a diagram for explaining the operation of the variation of FIG. 9.

When only one of a plurality of rectangular parallelopipeds located in their center is red in color and the other rectangular parallelopipeds are blue, as shown in FIG. 9, color extraction (red extraction in the illustrated example) may be carried out from the two-dimensional image I2 to extract a part having a red component equal to or larger than a threshold value. And as shown in FIG. 10, an objective existence zone A3 having a center corresponding to a gravity center G3 of the extracted part may be set and objective detecting operation may be performed over a partial image of the distance image I3 corresponding to the objective existence zone A3. It goes without saying that a specific part may be extracted based on its brightness in place of the color. In this case, it will be noted that an objective existence zone is set on the basis of an extracted part of a two-dimensional image having a target component equal to or larger than its threshold value and an image corresponding to the set zone is used as a partial image of the two-dimensional image.

Figure 12:
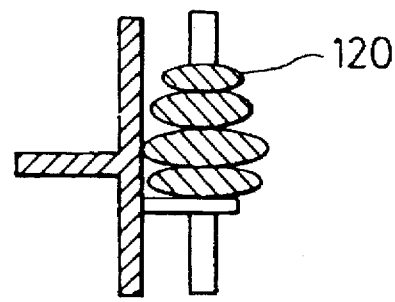
FIG. 12 is a front view of an example of a detection objective in the variation of FIG. 11.
Figure 13A:
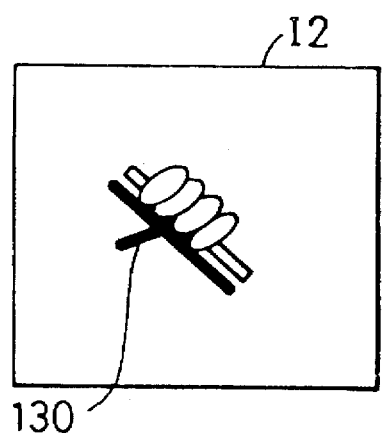
FIG. 13a is a diagram for explaining a two-dimensional image in the variation of FIG. 11.
Figure 13B:
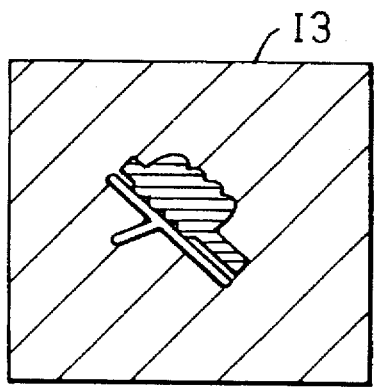
FIG. 13b is a diagram for explaining a distance image in the variation of FIG. 11.
Figure 14:
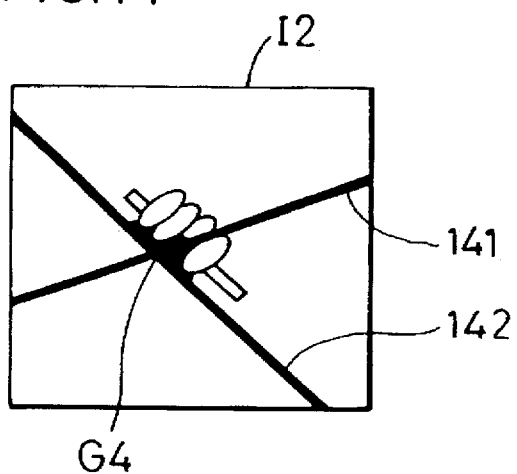
FIG. 14 is a diagram for explaining the operation of the variation of FIG. 11.
Figure 11:
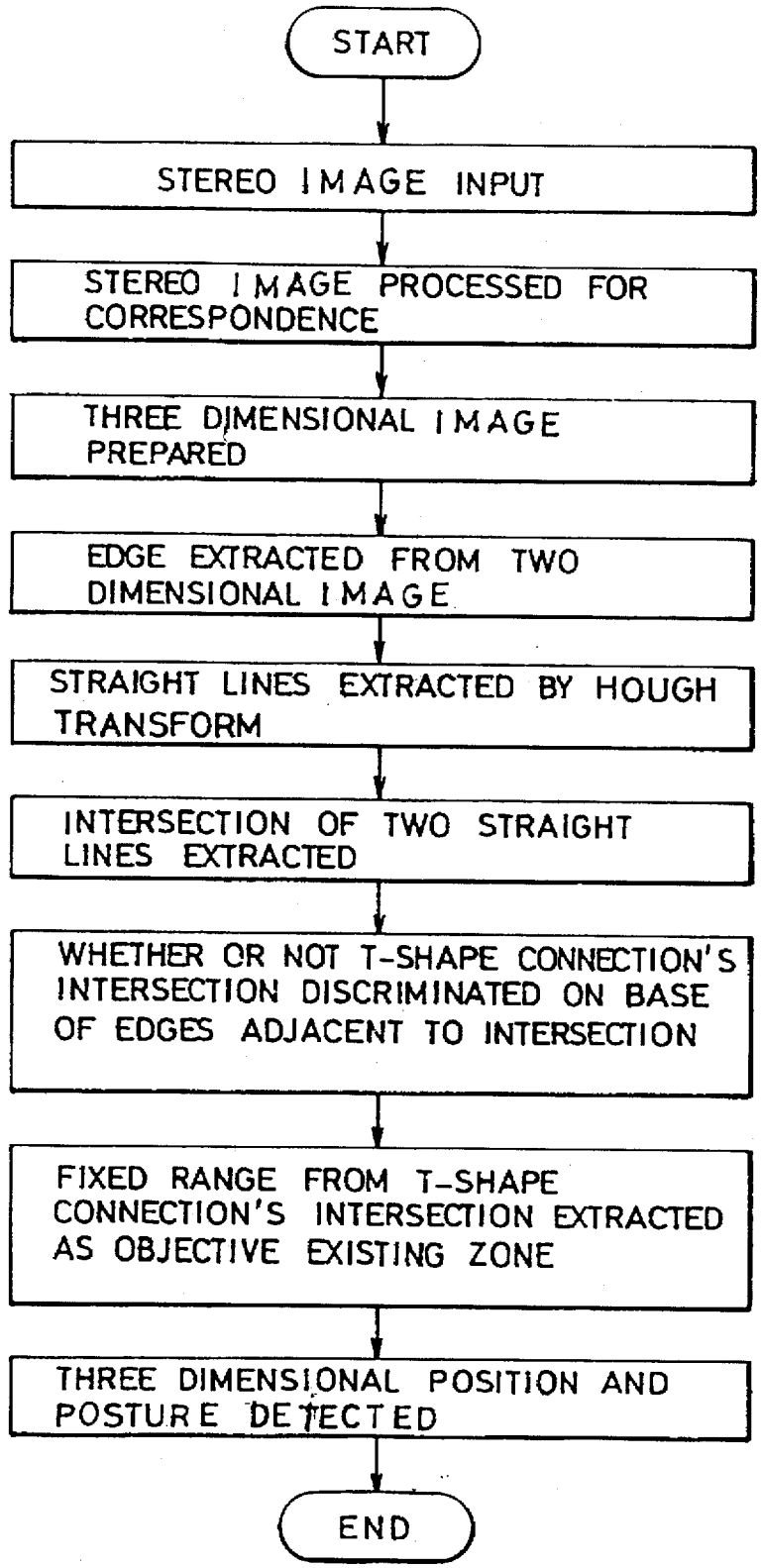
FIG. 11 is a flowchart for explaining the operation of yet a further specific variation of the embodiment of FIG. 1.

In addition to the above, the existence zone of an objective under detection may be previously limited by utilizing two-dimensional geometrical features derived from three-dimensional geometrical features. FIG. 11 shows a case where a two-dimensional geometrical feature comprised of two straight lines connected in the form of a letter T is utilized. More specifically, first, an objective 120 shown in FIG. 12 is photographed to obtain such a two-dimensional image I2 as shown in FIG. 13a and such a distance image I3 as shown in FIG. 13b. In this case, a two-dimensional geometrical feature appears as such a T-shape connection of two straight lines as shown by a reference numeral 130. Next, edges are extracted from the two-dimensional image I2 and subjected to a Hough transform to detect straight lines, an intersection point of the detected lines is extracted, the presence or absence of a T-shaped connection is judged, whereby an intersection point G4 in the T-shaped connection is extracted as shown in FIG. 14. And a zone having a predetermined range and having a center corresponding to the intersection point G4 of the T-shaped connection is applied to a distance image I3 to detect a three-dimensional position or posture of the objective from a distance partial image.

Figure 15:
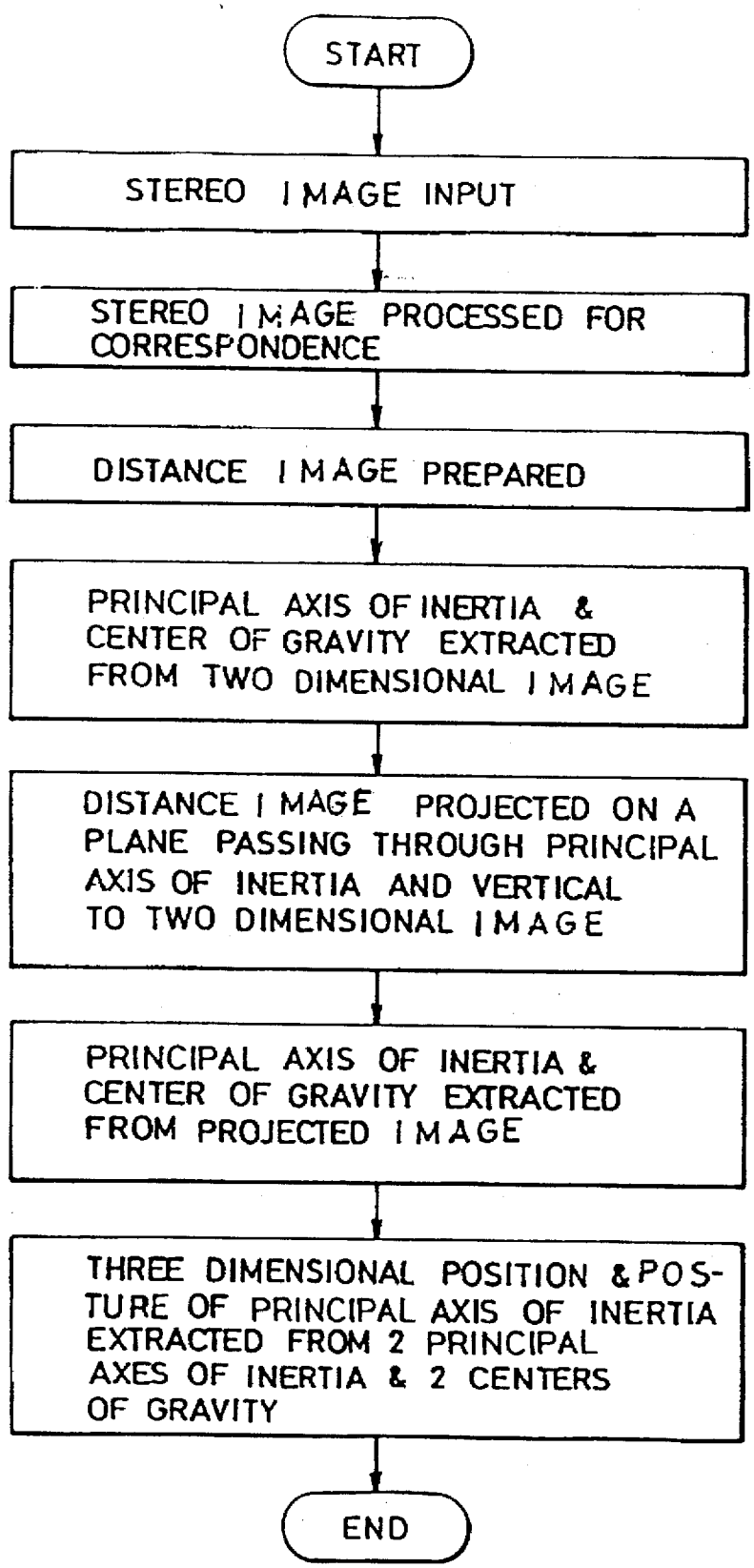
FIG. 15 is a flowchart for explaining the operation of another embodiment of the present invention.
Figure 16:
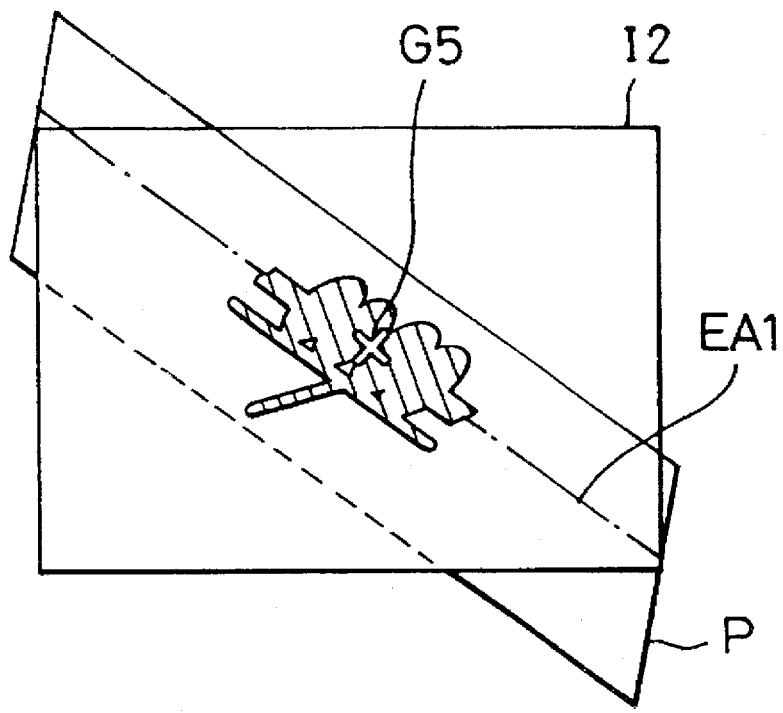
FIG. 16 is a diagram for explaining one operation of the embodiment of FIG. 15.
Figure 17:
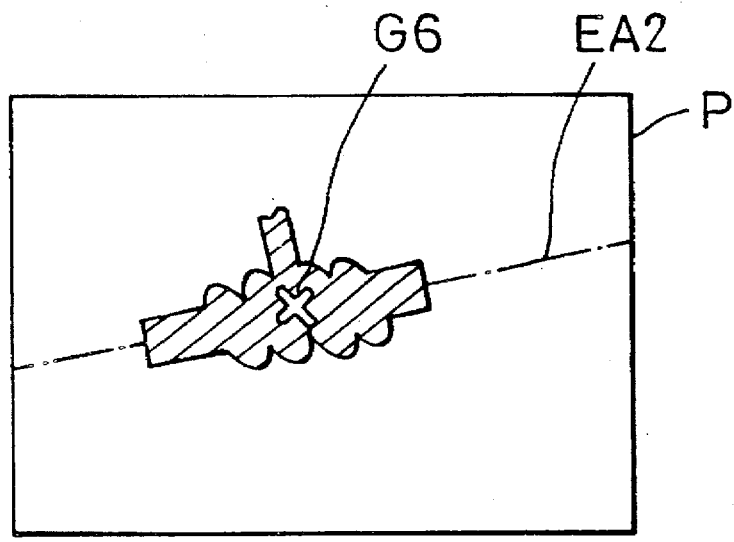
FIG. 17 is a diagram for explaining another operation of the embodiment of FIG. 15.

As shown in FIGS. 15 and 16, an inertia principal axis EA1 and a gravity center G5 are detected from the two-dimensional image I2, and the distance image I3 is projected onto a plane P passing through the Inertia principal axis EA1 and perpendicular to the two-dimensional image I2. When an inertia principal axis EA2 and a gravity center G6 are detected from the projected image as shown in FIG. 17, the posture of the inertia principal axis can be detected from the two inertia principal axes EA1 and EA2 and the position of the inertia principal axis can be detected from the gravity centers G5 and G6.

Figure 18:
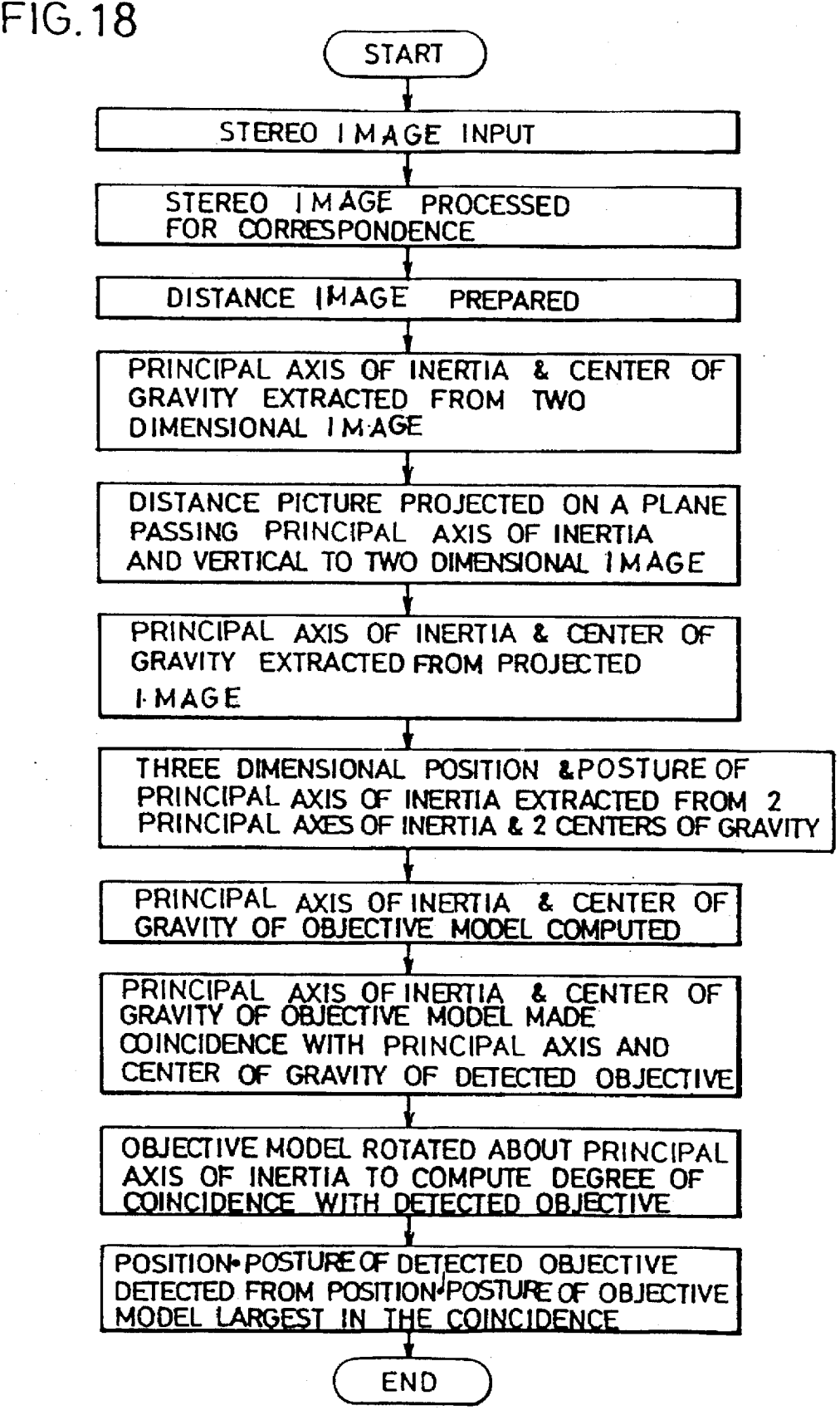
FIG. 18 is a flowchart for explaining the operation of a further embodiment of the present invention.

Further, as shown in FIG. 18, after the posture and position of the inertia principal axis are detected as mentioned above, an inertia principal axis and gravity center for the objective model are found and made to coincide with the posture and position of the detected inertia principal axis, the objective model is rotated on the inertia principal axis to find a coincidence or matching degree between the objective model and target objective, and a three-dimensional position and posture of the objective can be detected on the basis of the position and posture of the target model when the matching degree becomes maximum. In this case, since the position and posture of the inertia principle axis representative of the position and posture of the objective in the three-dimensional space are used as fixed references, that is, since 5 of 6 degrees of freedom of the objective in the three-dimensional space are restricted, the position and posture of the objective in the three-dimensional space can be accurately detected at a high speed.

Figure 19:
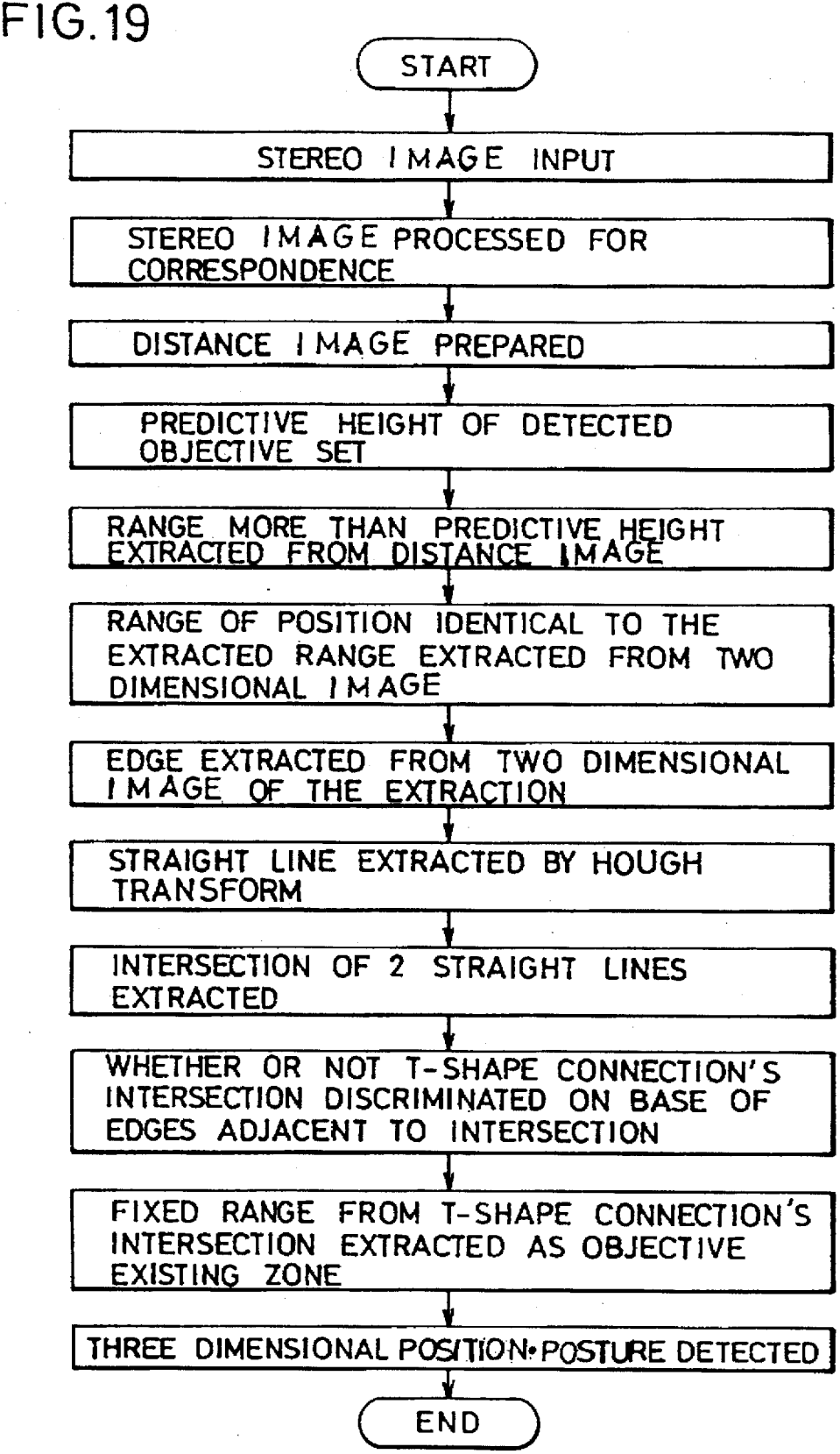
FIG. 19 is a flowchart for explaining the operation of yet another embodiment of the present invention.
Figure 20A:
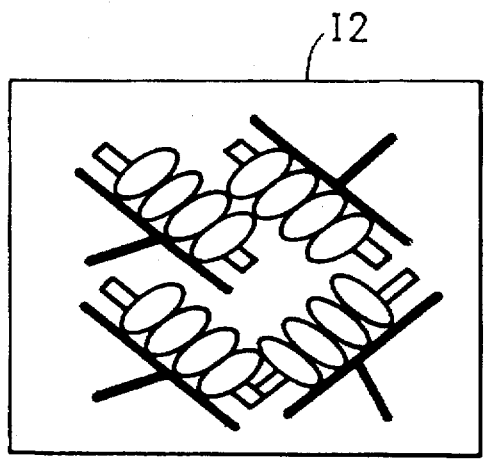
FIG. 20a is a diagram for explaining a two-dimensional image in the embodiment of FIG. 19.
Figure 20B:
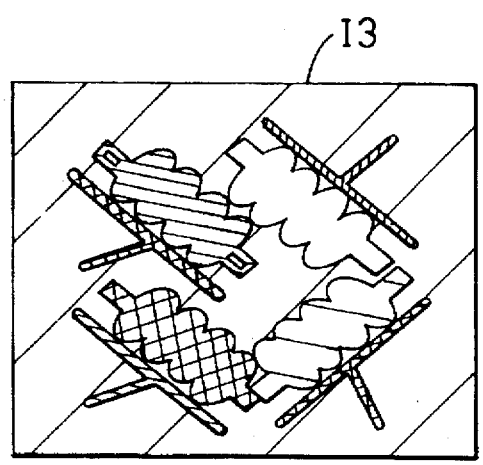
FIG. 20b is a diagram for explaining a distance image in the embodiment of FIG. 19.
Figure 21A:
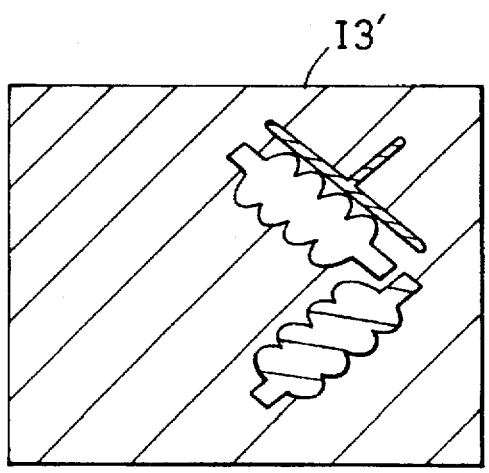
FIG. 21a is a diagram for explaining the distance image after subjected to a pre-processing operation in the embodiment of FIG. 19.
Figure 21B:
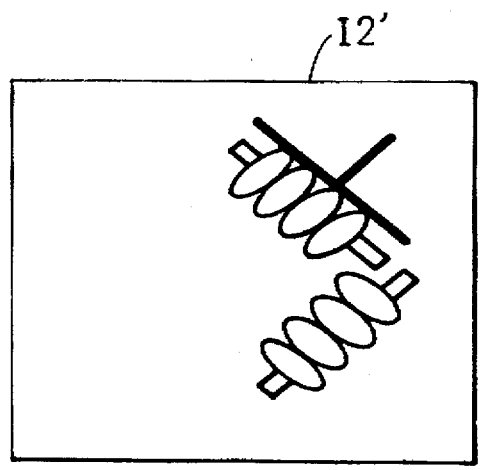
FIG. 21b is a diagram for explaining the two-dimensional image after subjected to a pre-processing operation in the embodiment of FIG. 19.

As will be seen from a two-dimensional image I2 shown in FIG. 20a and from a distance image I3 shown in FIG. 20b, when a plurality of such objectives as shown in FIG. 12 are piled, a predicted height of an existence position of an objective to be detected is set as a pre-processing, a zone higher than the predicted height is extracted from the distance image I3 (see FIG. 21a), and a zone having the same position as in the image is extracted from the two-dimensional image I2 (see FIG. 21b), as shown in FIG. 19. Thereafter, the zone restricted by the predicted height references of a two-dimensional image I2' and distance image I3' is subjected to such processing as mentioned above (in the illustrated example, which is the same as the processing shown in FIG. 11) to detect a three-dimensional position and posture of the objective.

Figure 23:
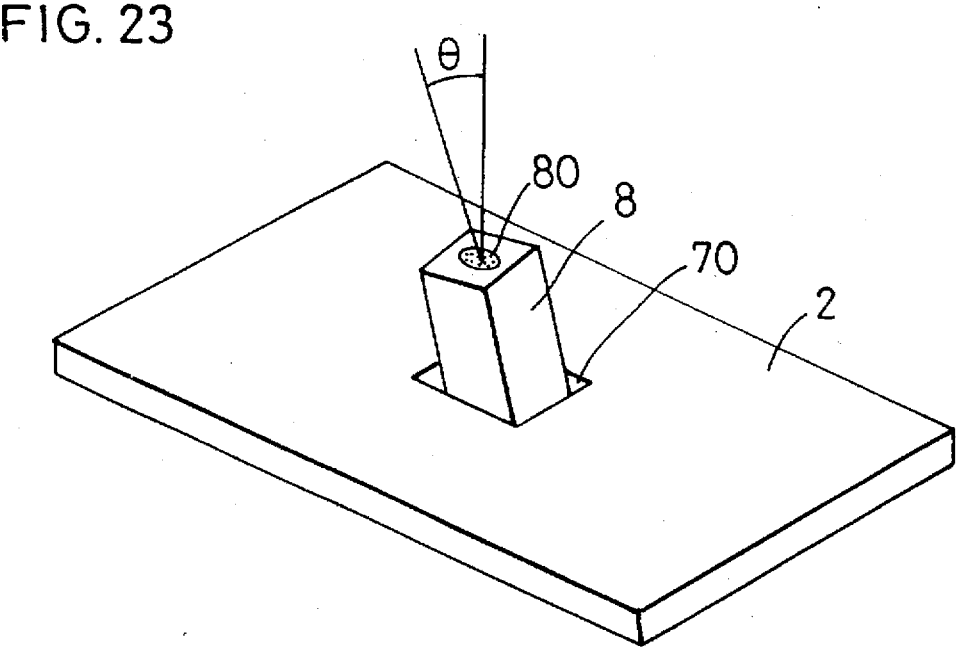
FIG. 23 is a perspective view of an objective to be inspected in the embodiment of FIG. 23.
Figure 24A:
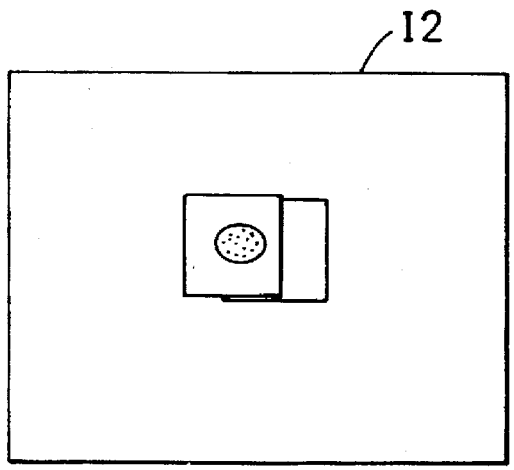
FIG. 24a is a diagram for explaining a two-dimensional image in the embodiment of FIG. 22.
Figure 24B:
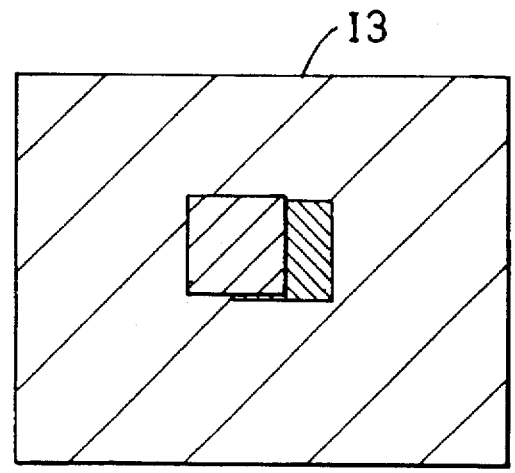
FIG. 24b is a diagram for explaining a distance image in the embodiment of FIG. 22.
Figure 25:
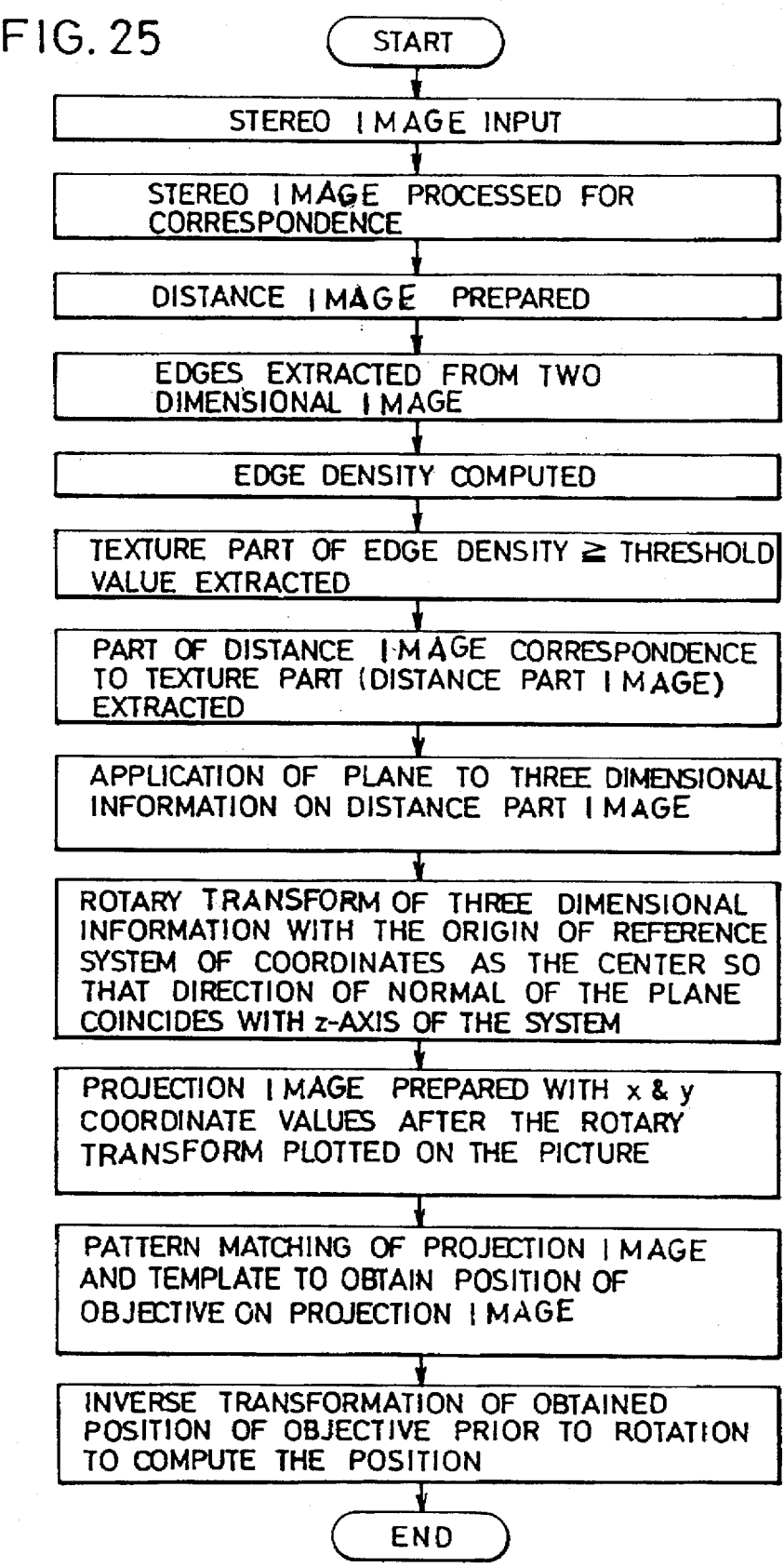
FIG. 25 is a flowchart for explaining the operation of another embodiment of the present invention to find a position and posture of a target objective.

Such a three-dimensional objective recognition method can be applied to objective inspection situations. For example, FIG. 23 shows a case where a rectangular column 8 is inserted into a square hole 70 of a base 2 and it is desired to examine whether or not the rectangular column 8 was inserted in the square hole perpendicularly ($\theta=90°$) to the base 2. FIG. 22 shows a flowchart for explaining the operation when the aforementioned pattern matching is employed. That is, such a two-dimensional image I2 as shown in FIG. 24a and such a distance image I3 as shown in FIG. 24b are obtained from stereo images of two television cameras. In more detail, a circle 80 (which may be replaced by an opening or a screw hole) on the top surface of the rectangular column 8 is used as a detection pattern, an objective existence zone is restricted in a similar way to the foregoing embodiment, and then a position and posture of the rectangular column 8 in the three-dimensional space are detected. On the basis of the detection result, a tilt $\theta$ of the rectangular column 8 is found to judge whether the inserted state is good or not.

FIGS. 25 to 28 show an example of a detection method in which a position and posture of an objective are detected based on a distance partial image extracted by utilizing the aforementioned texture. More specifically, when such an objective 8 as shown in FIG. 26 is present, a partial image corresponding to the top surface of the objective 8 is extracted from a distance image obtained by photographing the objective 8 and based on the texture, and three-dimensional information obtained from the partial image is applied to find a plane Pa containing the top surface of the objective 8 in the three-dimensional space as shown in FIG. 27. The plane Pa can be obtained by calculating coefficients a, b and c in the following equation by the least squares method.

$$ax+by+cz+1=0$$

Figure 28A:
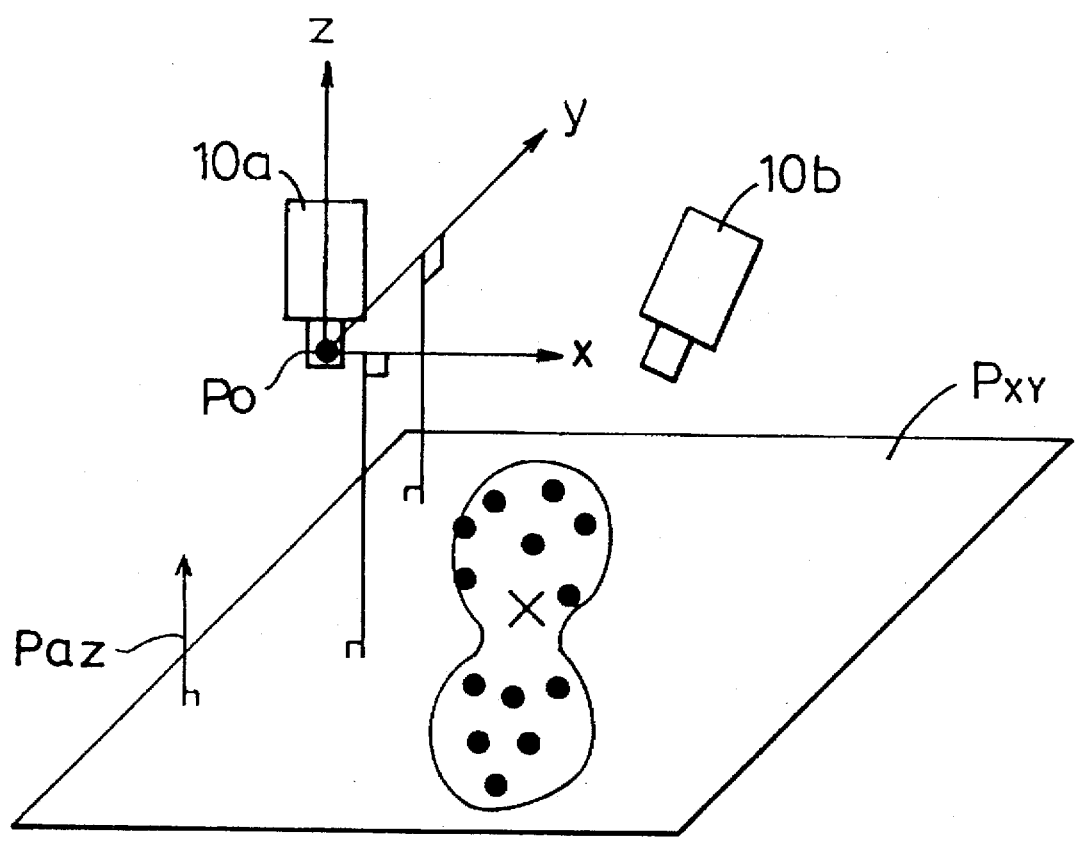
FIG. 28a is a diagram showing a rotated state of the plane in the embodiment of FIG. 25.
Figure 28B:
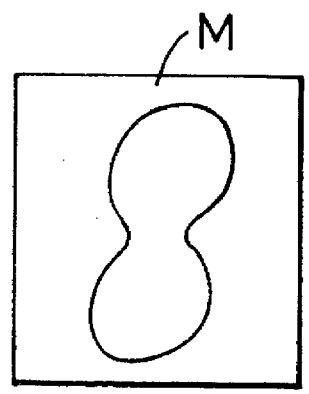
FIG. 28b is a diagram for explaining a template image.

Next, as shown in FIG. 27, three-dimensional positions of points on the top surface of the objective are rotated on an origin Po of a camera image coordinate system so that a normal Paz of the plane Pa coincides with a Z axis of the image coordinate system as shown in FIG. 28a, and the positions are then projected onto a plane (in this case, an X-Y plane Pxy of the above image coordinate system) of a reference coordinate system with use of x and y coordinate values of the points on the top surface of the objective after rotated. A projected image thus obtained and a previously-registered template image M (such as shown in FIG. 28b) are subjected to a pattern matching therebetween to find a position and posture of the objective of the projected image. The found objective position is subjected to an inverse transformation to find a position and posture of the top surface of the objective before the above rotation. In order to detect the position and posture of the objective on the two-dimensional image, the pattern matching with the template image has been employed in the illustrated example, but it goes without saying that another method such as a generalized Hough transform can be employed.

In the foregoing embodiment, the two-dimensional image has been obtained from the same viewing point as the distance image obtained by picking up the objective in the three-dimensional space, the zone to be subjected to the detecting operation of the position and posture of the target objective has been extracted and restricted, and the inertia principal axis and gravity center of the target objective have been extracted on the basis of two-dimensional image. However, when he target objective has such a shape as a circular cylinder, a circular part is extracted by utilizing an edge image, and a position, posture and radius of the circle are measured to realize higher speed recognition of the objective.

Figure 30:
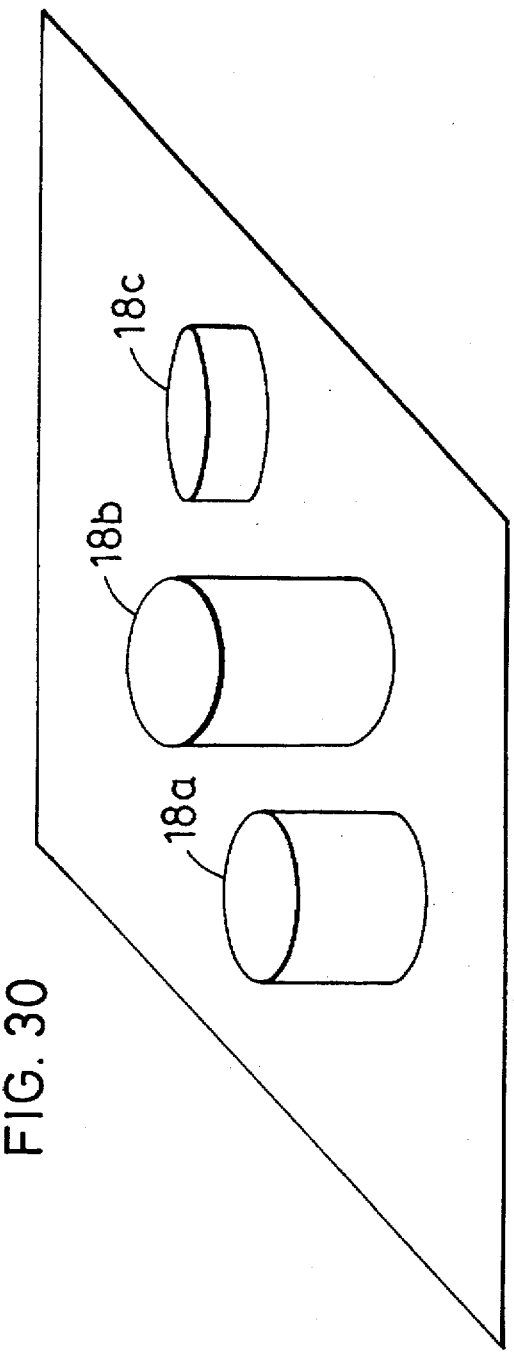
FIG. 30 shows perspective views of an example of the detection objective in the system of FIG. 29.
Figure 31B:
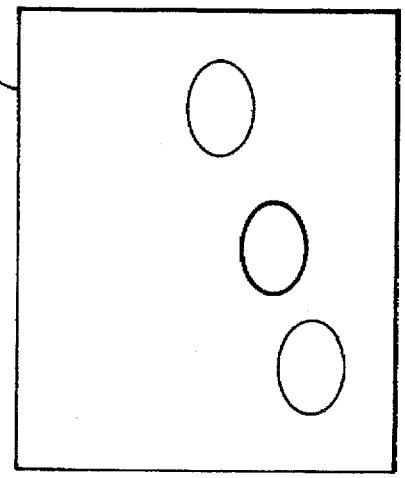
FIG. 31b is a diagram for explaining a disparity image in the system of FIG. 30.
Figure 31A:
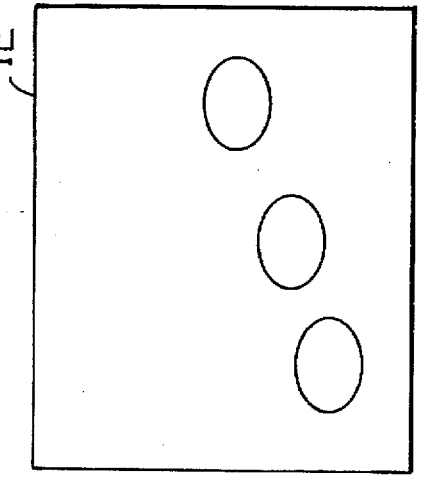
FIG. 31a is a diagram for explaining an edge image in a stereo reference image in the system of FIG. 30.

In this case, such a system as shown in FIG. 29 comprises two cameras 11 and 12 for photographing an objective 18 illuminated by an illuminator 19, A/D converters 13 and 14 for converting analog image signals from the both cameras 11 and 12 into digital image signals, frame memories 15 and 16 for storing the digital image signals therein, and a processor 17 connected to the frame memories 15 and 16. With this system, parallel stereo conversion is carried out through the stereo image processing of an edge image, that is, the two cameras 11 and 12 are matched in their orientation and focal distance, the image signals are converted into images so that the corresponding pixels of the two images coincide with each other in the Y coordinate value to thereby realize efficient corresponding point search, and a disparity corresponding to a difference between the X coordinate values of the two calculated images is photographed by the camera 11 and mapped onto an extracted edge image (stereo reference image) to create a disparity image. When a distance image is required, conversion from disparity to distance is added. For example, in the case where circular cylindrical objectives 18a, 18b and 18c having different heights are located as shown in FIG. 30, when the objectives are photographed from their upper side by the two cameras, such an edge image IE for the stereo reference image as shown in FIG. 31a and such a disparity image ID as shown in FIG. 31b are obtained. In FIG. 31b, a thicker line indicates a higher objective.

The images stored in the frame memories 15 and 16 through the image acquisition are subjected to the parallel stereo conversion to obtain an edge image and a gradient direction image based on the converted image. In order to extract edges from the images, a Sobel operator as shown in FIG. 71 is used. Upon application of this operator, the center of the operator is moved to a target pixel, the intensity values of pixels adjacent to the target pixel are multiplied by the values of the operator, whereby gradient magnitudes Gx and Gy in the X and Y directions, gradient intensity |G| and gradient direction θ are calculated with respect to all the pixels. When I(x,y) denotes the intensity of a pixel at a coordinate point [x,y], the gradient magnitudes Gx and Gy in the X and Y directions are expressed by the following equations.

$$Gx(x,y)=\{I(x+1,y-1)+2I(x+1,y)+I(x+1,y+1)\}-\{I(x-1,y-1)+2I(x-1,y)+I(x-1,y+1)\}$$

$$Gy(x,y)=\{I(x-1,y-1)+2I(x,y-1)+I(x+1,y-1)\}-\{I(x-1,y+1)+2I(x,y+1)+I(x+1,y+1)\}$$

Using Gx and Gy, the gradient intensity |G| and the gradient direction θ at each pixel position are found as follows. Images of pixels having such values are referred to as gradient intensity image and gradient direction image, respectively.

$$|G|=(Gx^2+Gy^2)^{1/2}$$

$$\theta=\tan^{-1}(Gy/Gx)$$

Figure 32C:
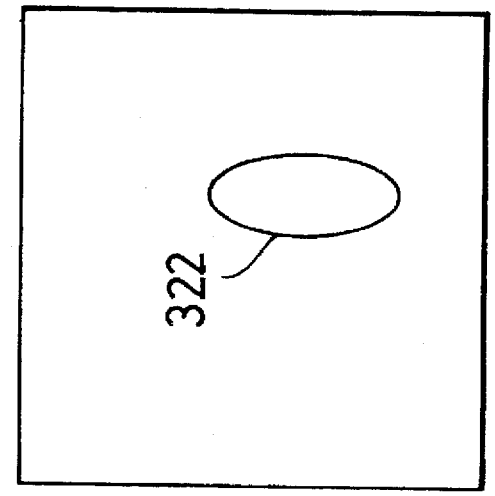
FIG. 32c is a diagram for explaining a circular edge extracted in the system of FIG. 30.
Figure 32B:
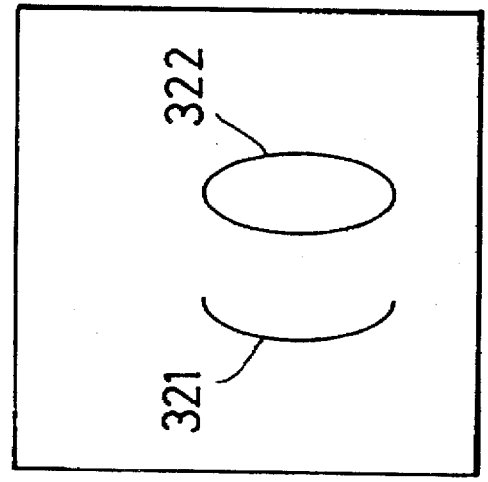
FIG. 32b is a diagram for explaining curve edges in the system of FIG. 30.
Figure 32A:
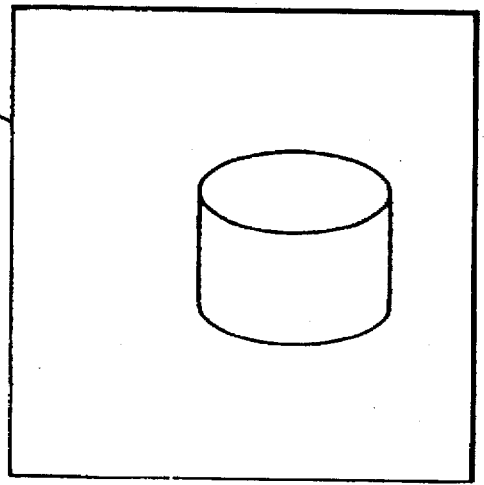
FIG. 32a is a diagram for explaining an example of an edge image in the system of FIG. 30.
Figure 34:
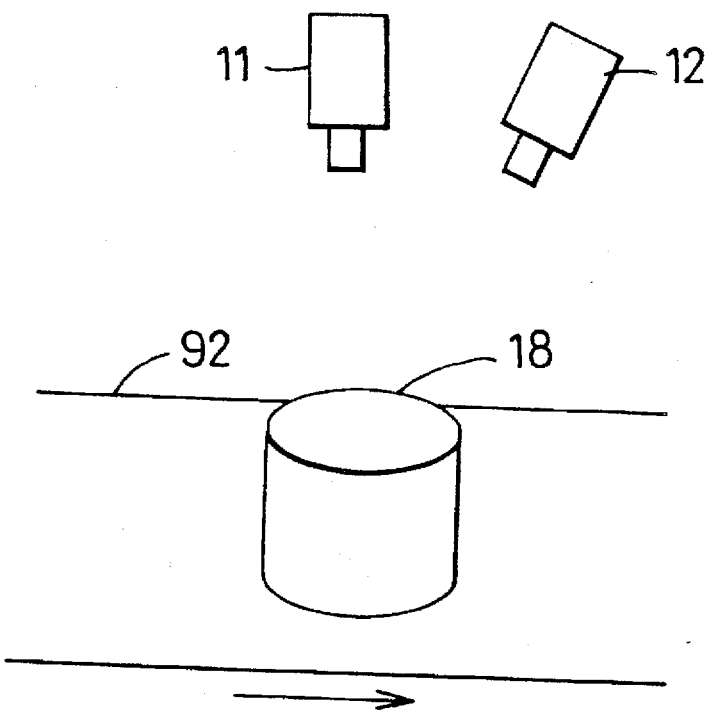
FIG. 34 is a perspective view of other embodiment of the present invention.

After a threshold value is provided for the value of the gradient intensity |G| and the gradient intensities for pixels having gradient intensities lower than the threshold value are set at 0, points having the highest gradient intensities in the vicinity, i.e., the gradient intensities in the form of a ridge line are extracted as edge points, such an edge image IE as shown in FIG. 32a is obtained. And only curved components 321 and 322 are extracted from the edge image of the stereo reference image as shown in FIG. 32b, and a circular component 322 is extracted from the extracted curved components as shown in FIG. 32c.

A disparity is calculated in the aforementioned manner on the basis of the two stereo edge images through the stereo image processing, the calculated disparity is mapped onto the edge image of the stereo reference image to create a disparities image, three-dimensional positions at points on the circular edge are calculated from the corresponding parts of the circular disparities image extracted in the aforementioned manner, and a central position and posture of a circle of the top surface of the circular cylindrical objective 18 are measured based on the calculated three-dimensional position information to thereby recognize a position and posture of the objective 18.

Figure 35:
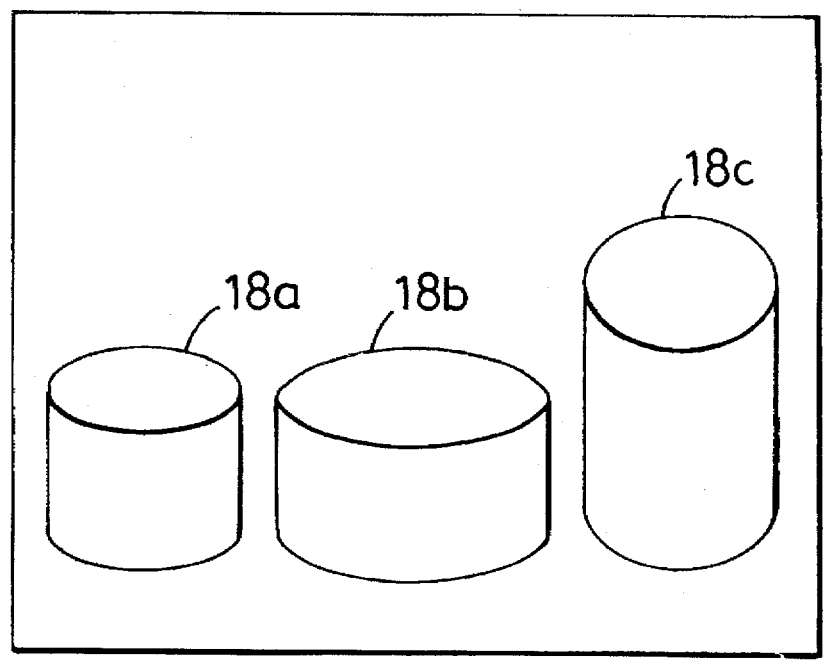
FIG. 35 shows perspective views of an objective in the embodiment of FIG. 34.
Figure 36A:
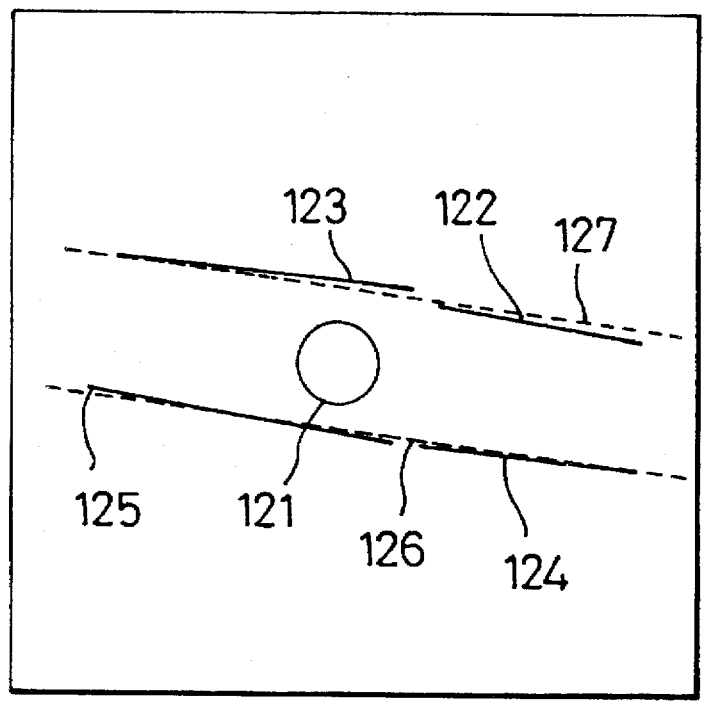
FIG. 36a is a diagram for explaining an edge image in the embodiment of FIG. 35.
Figure 36B:
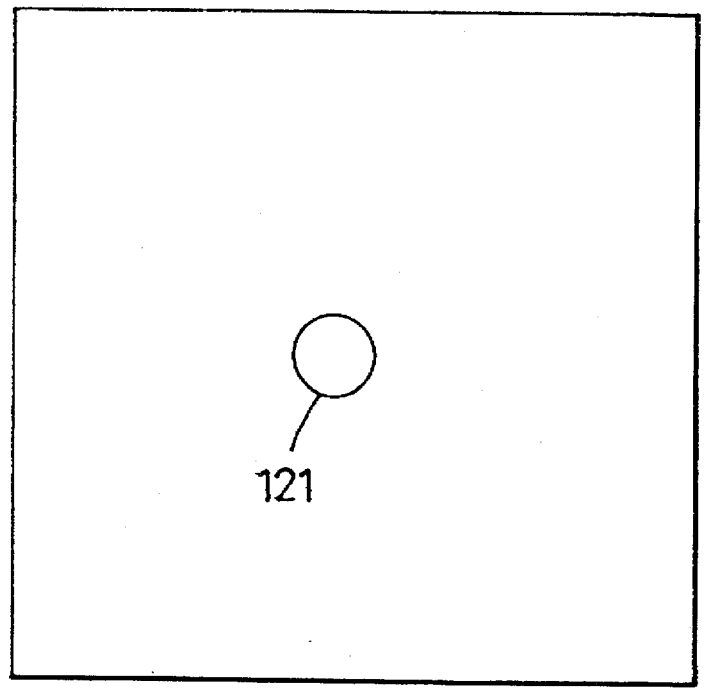
FIG. 36b is a diagram for explaining a circular edge extracted in the embodiment of FIG. 35.
Figure 37:
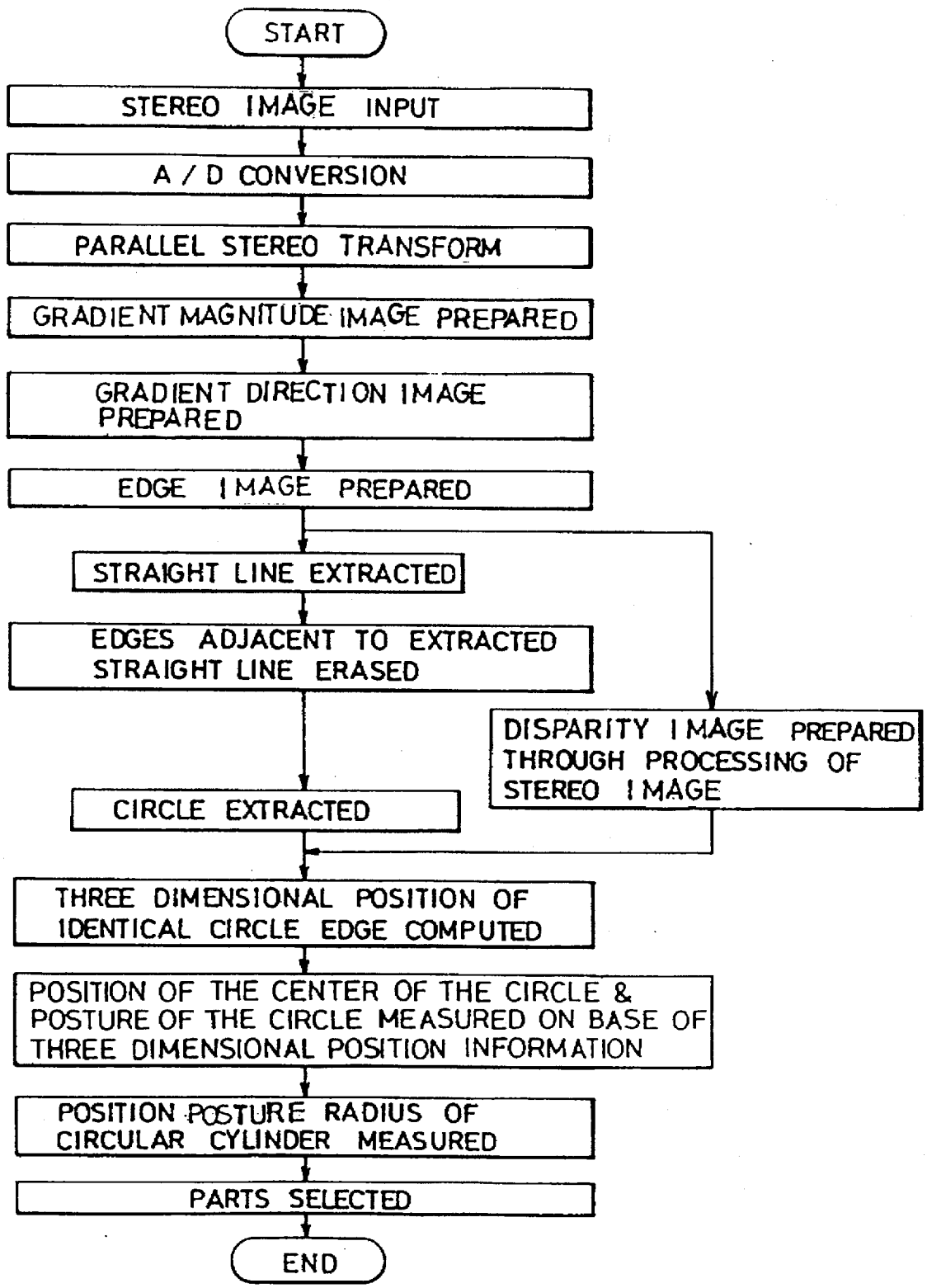
FIG. 37 is a flowchart for explaining the operation of another variation of the present invention.

The extraction of only the curved components from the edge image of the stereo reference image can be carried out, for example, by extracting straight lines through Hough transform and by erasing edges present within a predetermined distance from the extracted straight lines. Explanation will be made as to the case where three types of such objectives 18a, 18b and 18c as shown in FIG. 35 are conveyed along a conveyor 92 and the target objective 18 is one of three types of such objectives, and as to how to select the target objective from the three types of objectives. As shown in FIG. 37, an edge image is created through parallel stereo conversion and creation of a gradient magnitude image and a gradient direction image. In this case, a camera 11 for photographing an image to be used as a stereo reference image acquires the image of the objective 18 nearly right from its top, whereupon such an edge image as shown in FIG. 36a is obtained. When the edge image is subjected to a Hough transform to extract straight lines therefrom and edges present within a predetermined distance from extracted straight lines 126 and 127 are erased, edges 122 to 125 resulting from the conveyor 92 can be erased. Thus only a circular edge 121 of the top surface of the objective 18 can be extracted. And when three-dimensional positions at points on the circular edge are calculated from the disparity of the extracted circle and when a central position and radius of the circle of the top surface of the objective 18 are measured from the calculated three-dimensional position information, the objective 18 can be specified as one of the three types of objectives shown in FIG. 35 on the basis of the measured central position (height) and radius.

Figure 38:
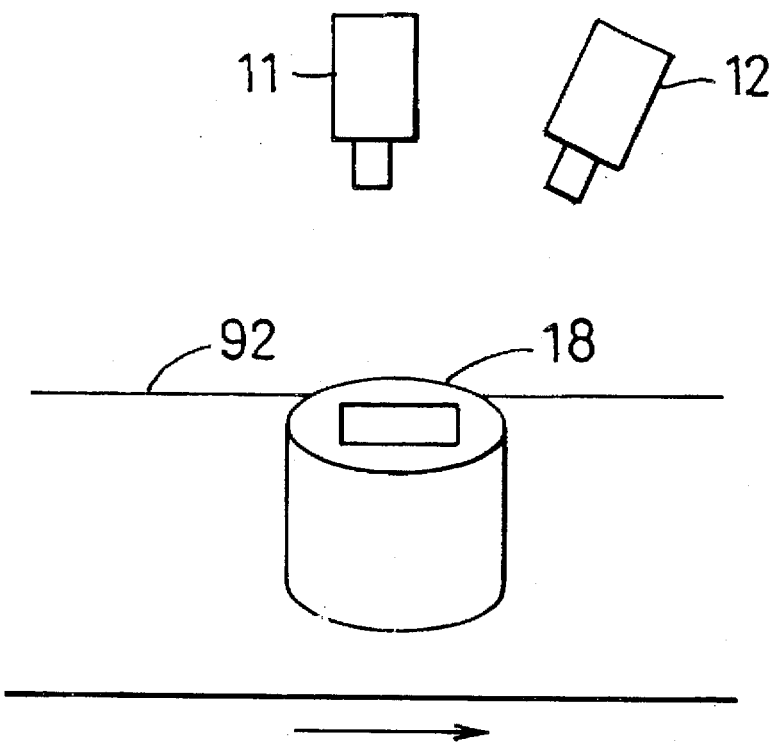
FIG. 38 is a perspective view of an image acquisition state of other embodiment of the present invention.
Figure 39:
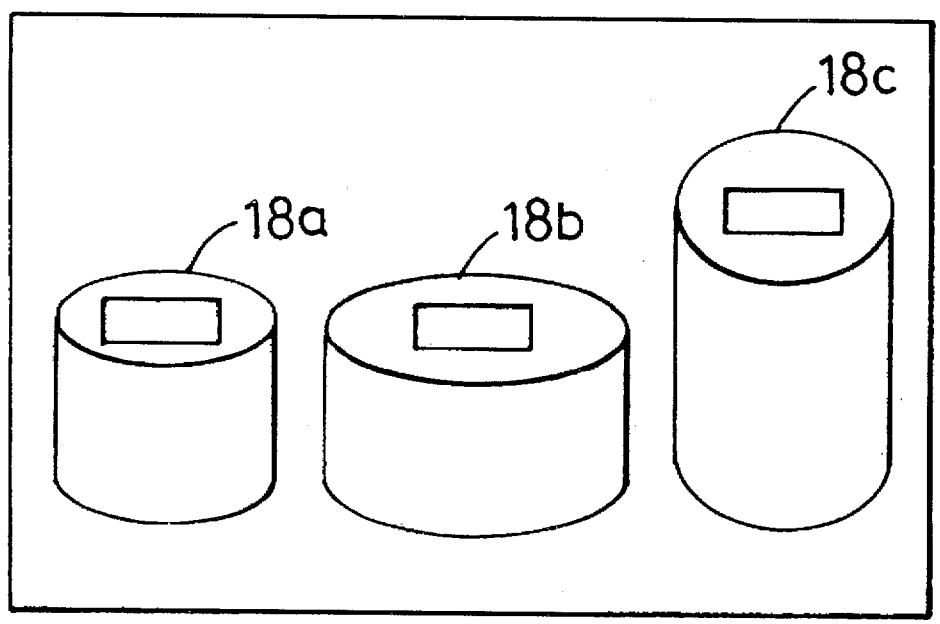
FIG. 39 shows perspective views of an objective in the embodiment of FIG. 38.
Figure 40A:
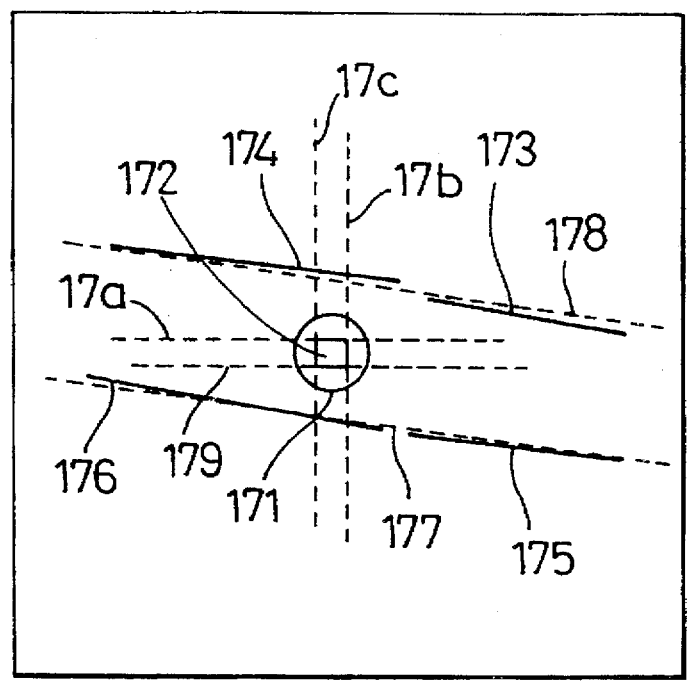
FIG. 40a is a diagram for explaining an edge image in the embodiment of FIG. 38.
Figure 40B:
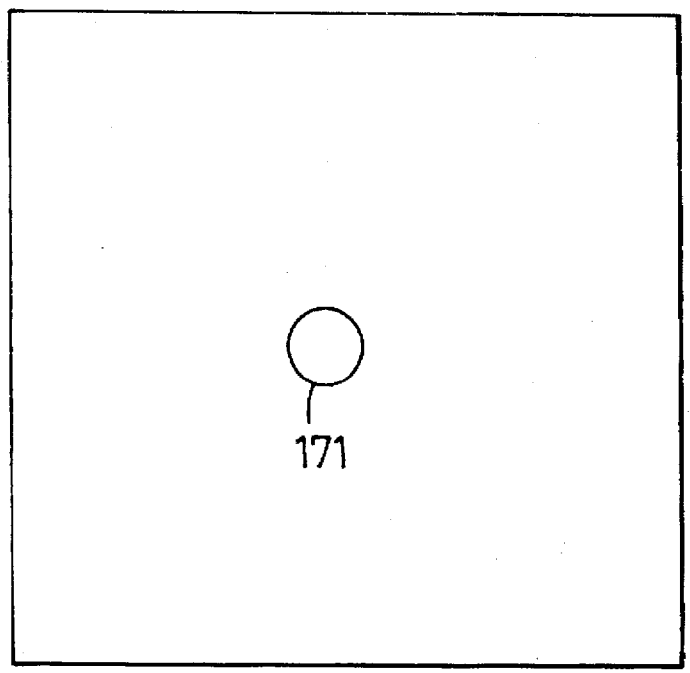
FIG. 40b is a diagram for explaining an extracted circular edge in the embodiment of FIG. 38.
Figure 41:
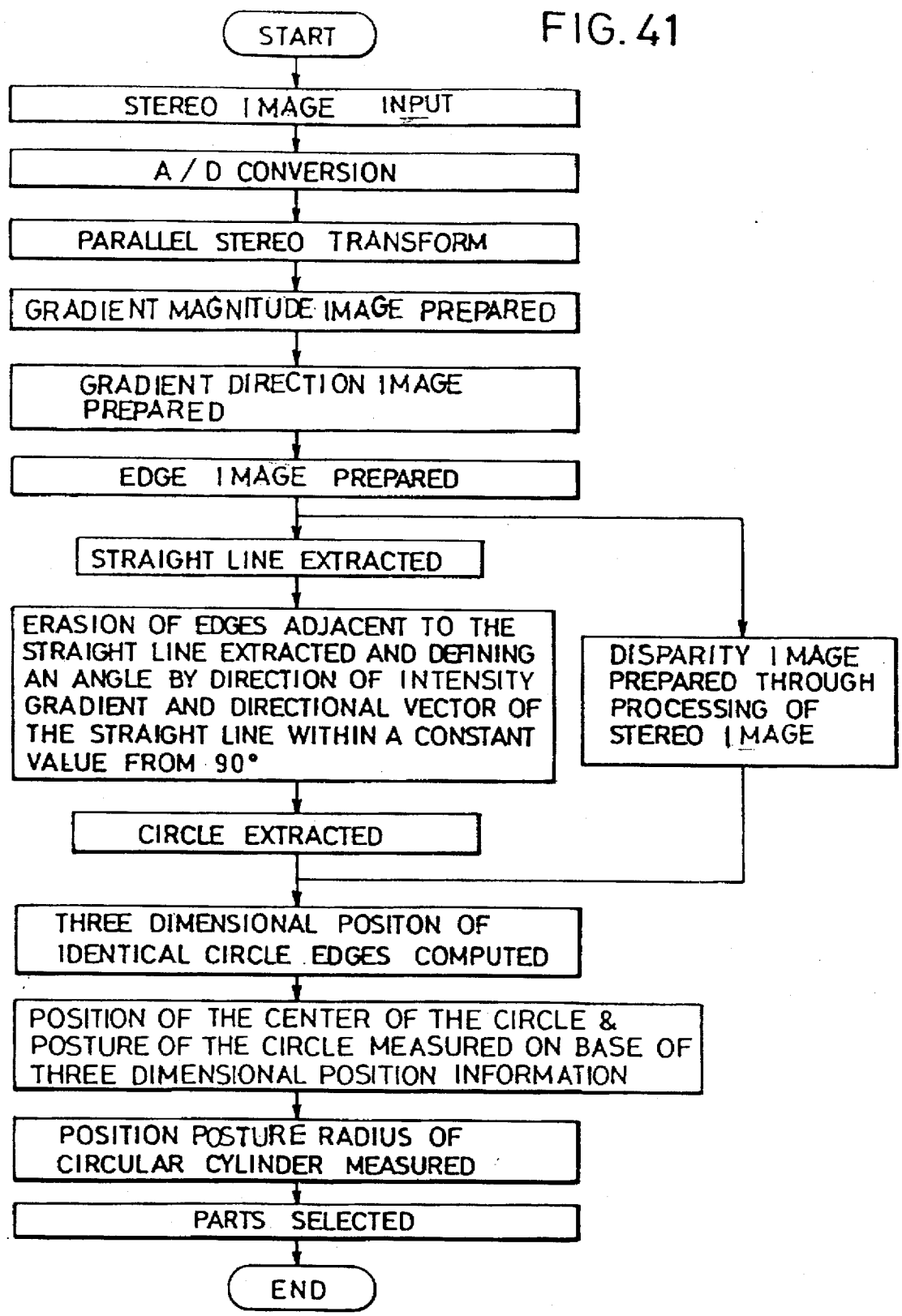
FIG. 41 is a flowchart for explaining the operation of another variation of the present invention.
Figure 42A:
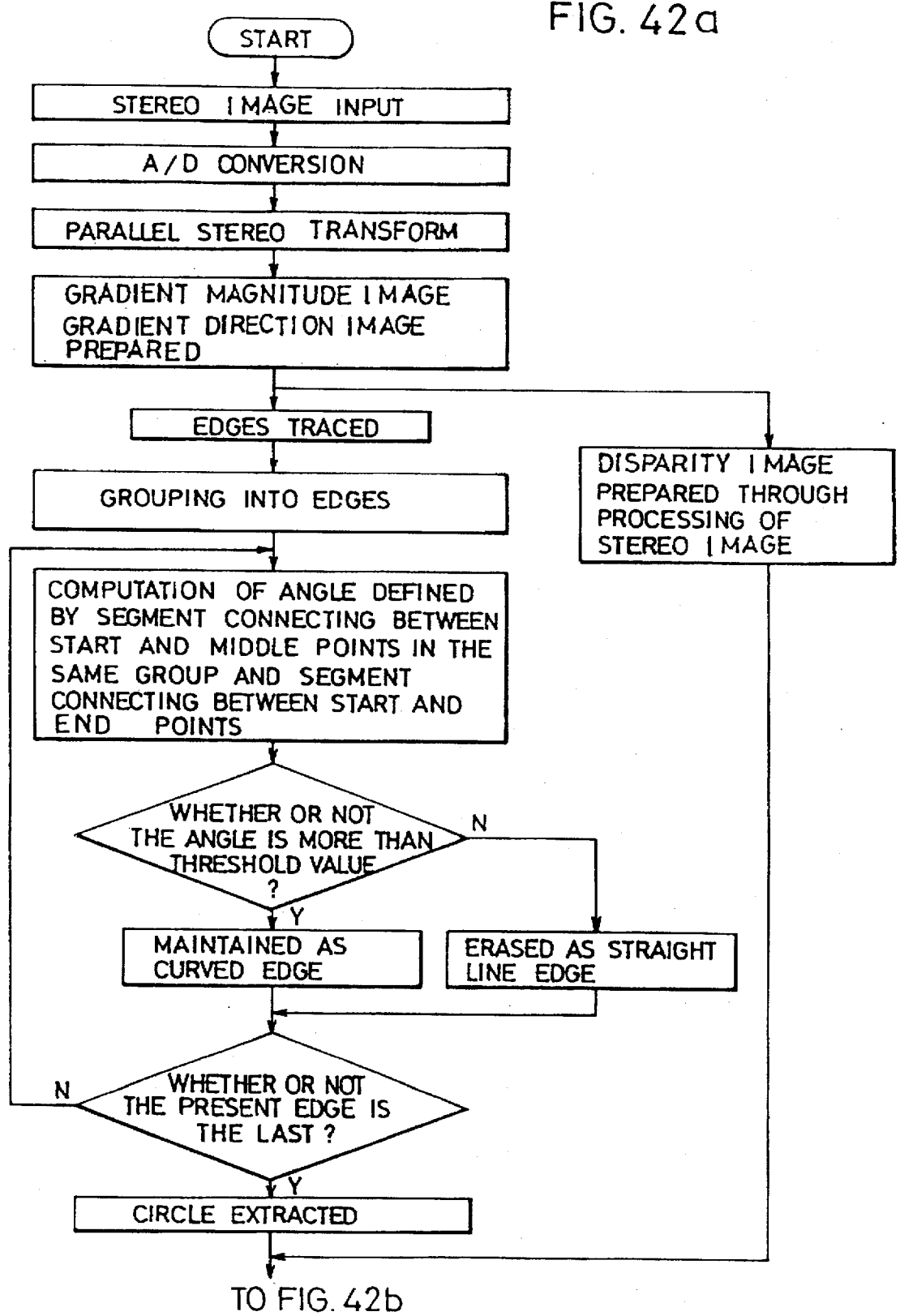
FIGS. 42, 42A and 42B are a flowchart for explaining the operation of other embodiment of the present invention.
Figure 42B:
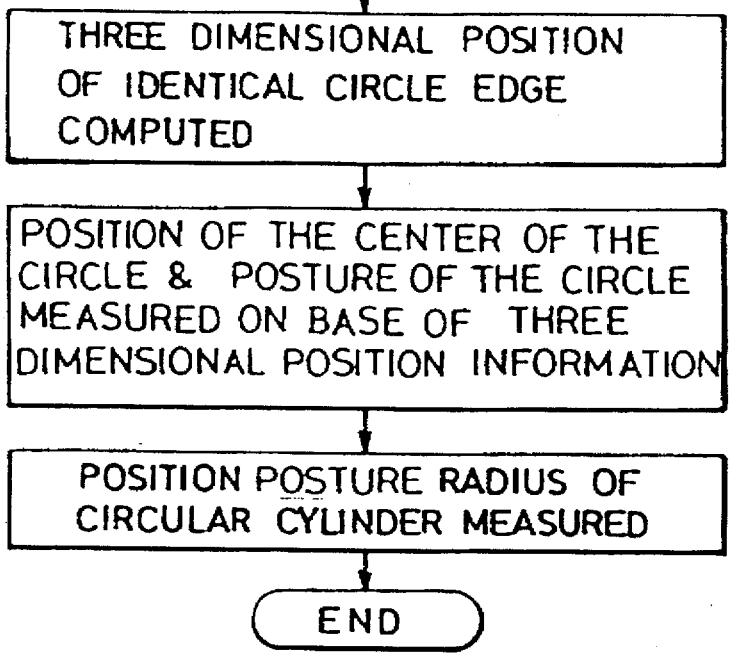
Figure 42:
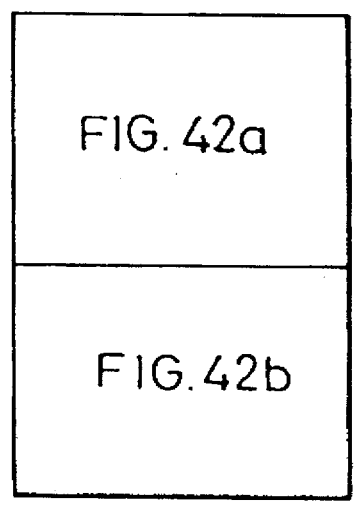
Figure 43A:
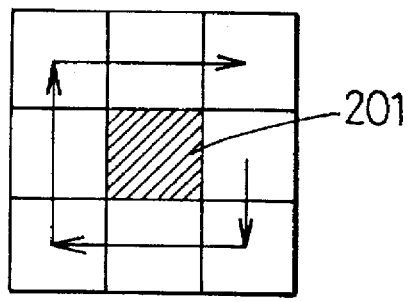
FIG. 43a is a diagram for explaining how to search edge points in the embodiment of FIG. 42.
Figure 43B:
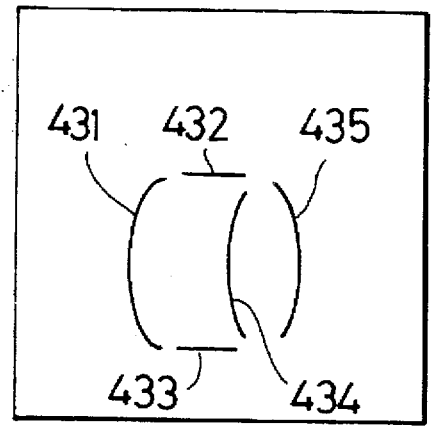
FIG. 43b is a diagram for explaining extracted edges in the embodiment of FIG. 42.

Meanwhile, when the circular cylindrical objectives 18, 18a, 18b and 18c have straight line components in the edges of their top surface as shown in FIGS. 38 and 39, mere erasing of edges present within a predetermined distance from the extracted straight lines also causes part of curved lines to be erased. To avoid such disadvantage, as shown in FIGS. 40 and 41, it is arranged to erase edges which are present within a predetermined distance from extracted straight lines 177, 178, 179, 17a, 17b and 17c and which have values within a predetermined value from 90° in the angle between their gradient direction and straight line direction vector. This enables realization of erasure of straight line edges while preventing partial erasing of a circular edge 171 as shown in FIG. 40b.

Figure 44:
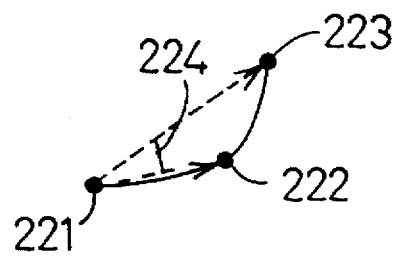
FIG. 44 is a diagram for explaining how to extract a curved edge in the embodiment of FIG. 42.
Figure 45A:
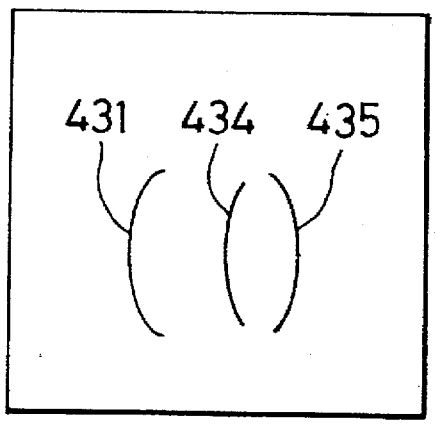
FIG. 45a is a diagram for explaining extracted curved edges in the embodiment of FIG. 42.
Figure 45B:
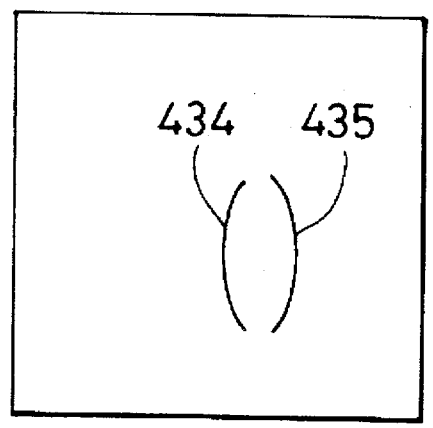
FIG. 45b is a diagram explaining extracted curved edges in the embodiment of FIG. 42.

The erasure of straight line components from the edge image while leaving curve components may be realized by such a method as shown in FIGS. 42 to 45. That is, edge points are found from an edge image of a stereo reference image for storage, points surrounded by a found target edge point 201 are searched clockwise from its right side to find the presence of another edge point as shown in FIG. 43a, storing operation of an edge point which gradient direction is different from the gradient direction of the previously-stored edge point 201 by a predetermined value or less as the next target edge point is continued, in the presence of the edge point, until no edge point is found at the points around the target edge point 201. When the number of such edge points stored exceeds a predetermined value, such edge points are assembled into edge groups 431 to 435 as shown in FIG. 43b. For each edge group, as shown in FIG. 44, an angle 224 made between a segment connecting an edge start point 221 and a middle point 222 and a segment connecting the edge start point 221 and an end point 223 is examined so that, when only such an edge that has the angle exceeding a predetermined value is left, only curved edges 431, 434 and 435 can be extracted as shown in FIG. 45a and such circular edges 434 and 435 as shown in FIG. 45b can be extracted from the edges of FIG. 45a.

Figure 46:
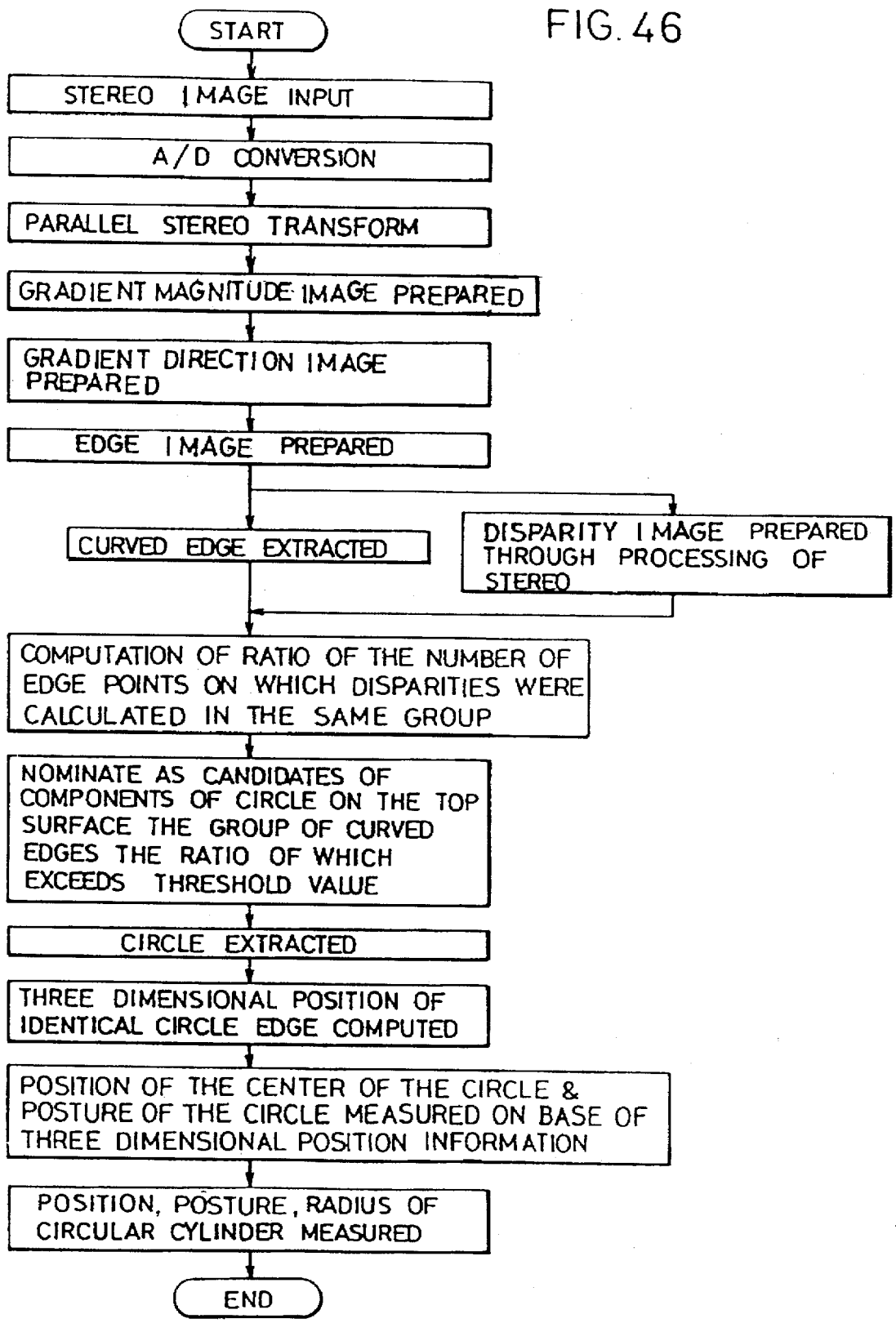
FIG. 46 is a flowchart for explaining the operation of a variation of other embodiment of the present invention.
Figure 47A:
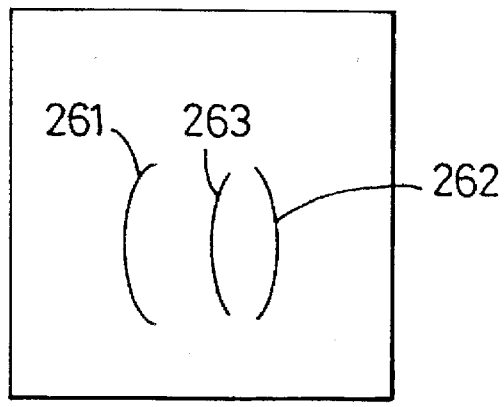
FIG. 47a is a diagram for explaining extracted curved edges in the embodiment of FIG. 46.
Figure 47B:
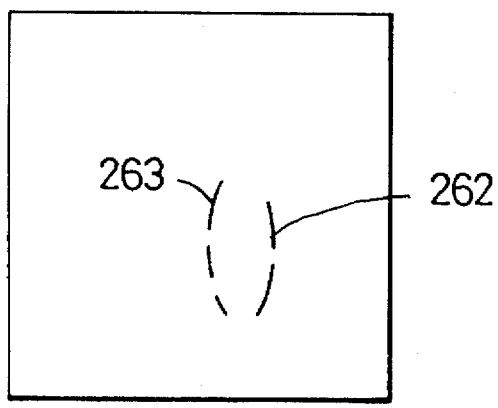
FIG. 47b is a diagram for explaining a binary image of edges with disparities calculated in the embodiment of FIG. 46.
Figure 47C:
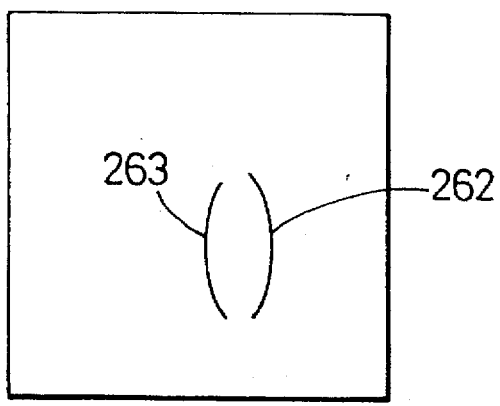
FIG. 47c is a diagram for explaining extracted circular edges in the embodiment of FIG. 46.
Figure 48A:
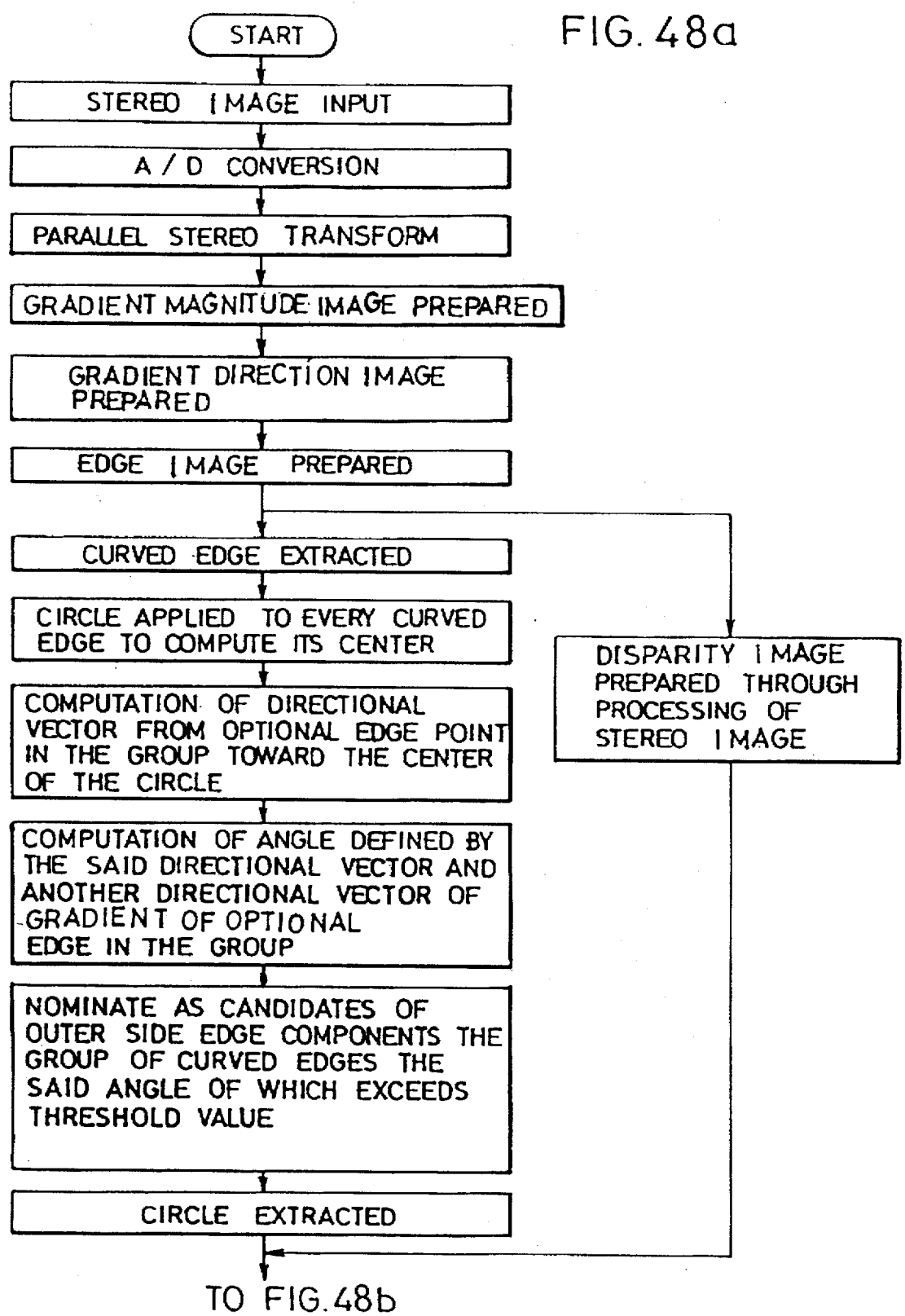
FIGS. 48, 48A and 48B show a flowchart for explaining the operation of a variation of other embodiment of the present invention.
Figure 48B:
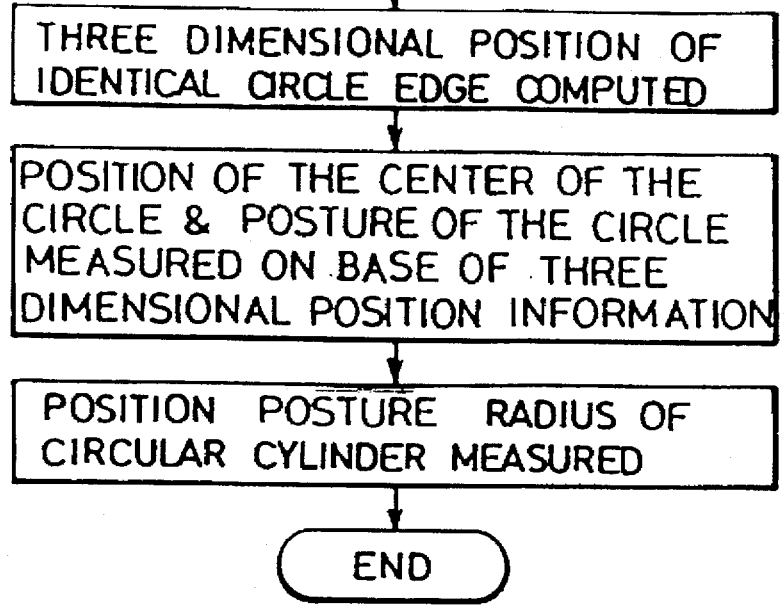
Figure 48:
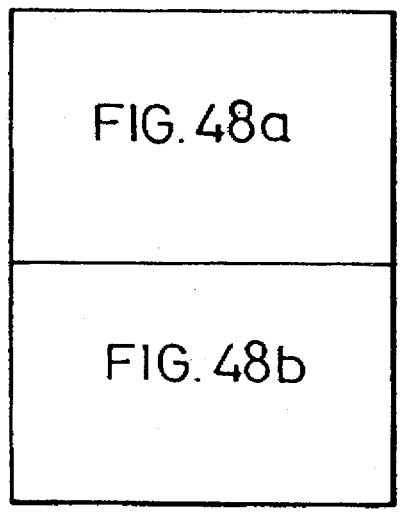

The extraction of circular edges from curved edges may be carried out in the following manner. First, a method shown in FIG. 46 utilizes the fact that the objective 18 has in its lower side substantially no corresponding parts in its left and right side images and thus its disparity detection ratio becomes considerably low. When the calculated disparities of curved edges 261, 262 and 263 are examined from such an edge image having only curved edges as shown in FIG. 47a, the curved edges 262 and 263 are almost calculated in their disparity as shown by a binary image of edge points with the disparities calculated in FIG. 47b. Since the curved edge 261 has no corresponding parts in the left and right side images and its disparity is not calculated yet, when curved edges whose already-calculated disparity ratios are smaller than a predetermined value are deleted, the curved edge 261 is deleted, which results in that only the curved edges 262 and 263 on the top surface of the objective can remain left as shown in FIG. 47c, from which the edges 262 and 263 can be extracted to form a circle.

Figure 49:
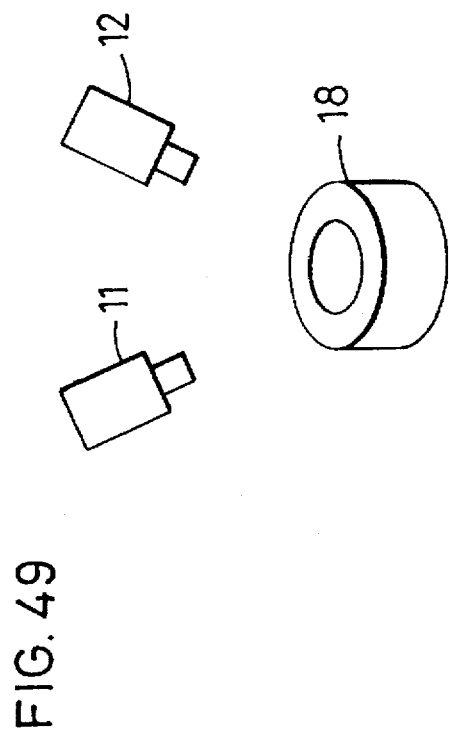
FIG. 49 is a perspective view of an objective in the embodiment of FIG. 48.
Figures 50A, 50B, 50C:
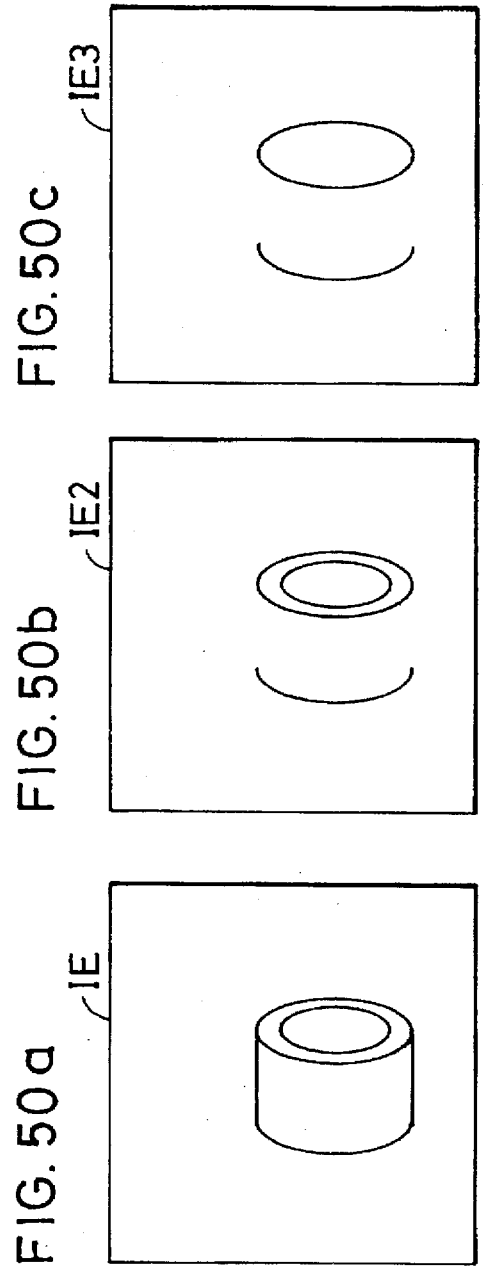
FIG. 50a is a diagram for explaining an edge image in the embodiment of FIG. 48.
FIG. 50b is a diagram for explaining extracted curved edges in the embodiment of FIG. 48.
FIG. 50c is a diagram for explaining extracted curved edges in the embodiment of FIG. 48.
Figure 51:
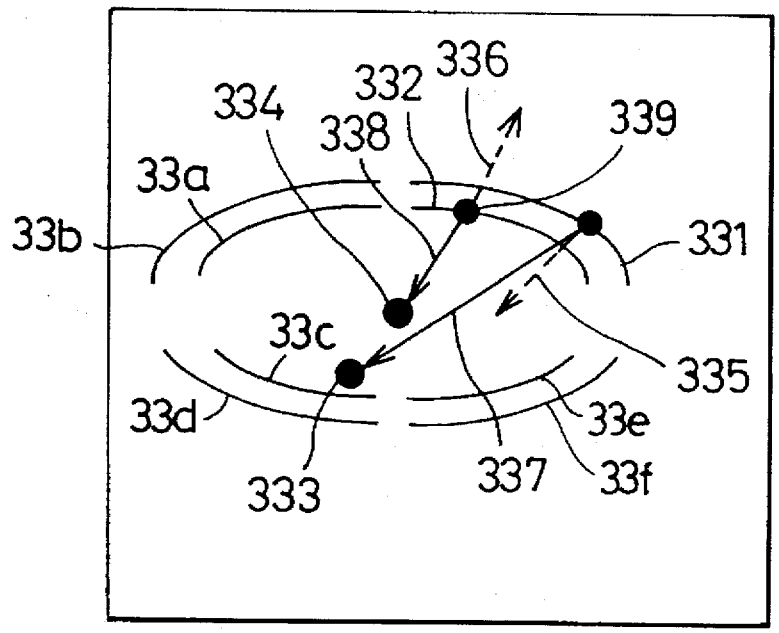
FIG. 51 is a diagram for explaining how to select curved edges in the embodiment of FIG. 48.

When the objective 18 has such a ring shape as shown in FIG. 49, since the top surface of the objective has two circular edges, only one (the outer circular edge in FIG. 49) of the circular edges is extracted. More specifically, an edge image IE for the objective 18 is as shown in FIG. 50a and, when straight line components are erased from the edge image, such an edge image IE2 as shown in FIG. 50b is obtained. When the objective 18 is seen bright on the background, and a gradient direction 335 of an edge 331 for the outer ring is directed inwardly of the circle while a gradient direction 336 of an edge 332 for the outer ring is directed outwardly of the circle as shown in FIG. 51, coefficients a and b and constant r can be found by the least squares method in accordance with a right-circle application equation which follows.

$$X^2+Y^2+ax+by+r=0$$

When the right-circle application equation is applied to the single edge 332 of the top surface to calculate a center (−a/2,−b/2) 334 of the circle, any one 339 of points of the right-circle edge is selected, a direction toward the calculated center 334 of the circle from the selected point 339 is found, and such an edge of the top surface is extracted that a difference between the direction 338 and the gradient direction 336 of the selected point is a predetermined value (90°) or less. Even with respect to edges 331, 33a, 33b, 33c, 33d, 33e and 33f of the top surface other than the edge 332, when the aforementioned operation is carried out to calculate a difference between the direction of gradient of a point of each edge and the direction from the point toward the center of the right circle, and when edges of the top surface having such differences of a predetermined value (90°) or less are extracted, such an edge image IE3 of a stereo reference image with the inner-side circular edges 332, 33a, 33c and 33e removed as shown in FIG. 50c can be obtained. In this connection, when the predetermined value for the difference is selected to be higher than 90°, the outer-side circular edges 331, 33b, 33d and 33f are erased while the inner-side circular edges 332, 33a, 33c and 33e are left.

Figure 53:
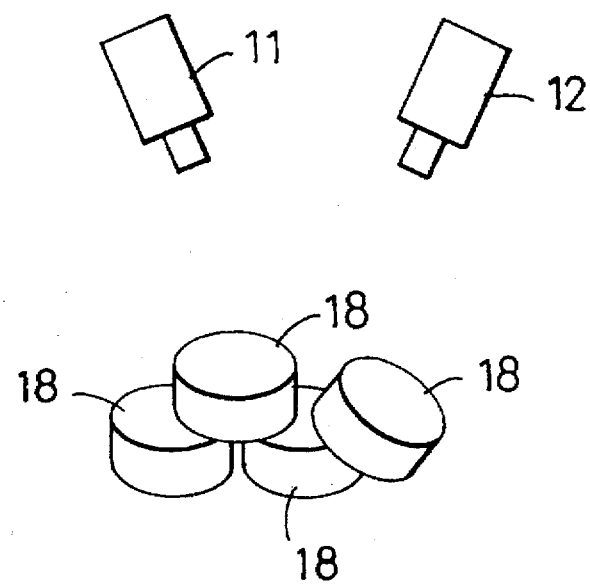
FIG. 53 shows perspective views of an objective in the embodiment of FIG. 52.
Figure 52A:
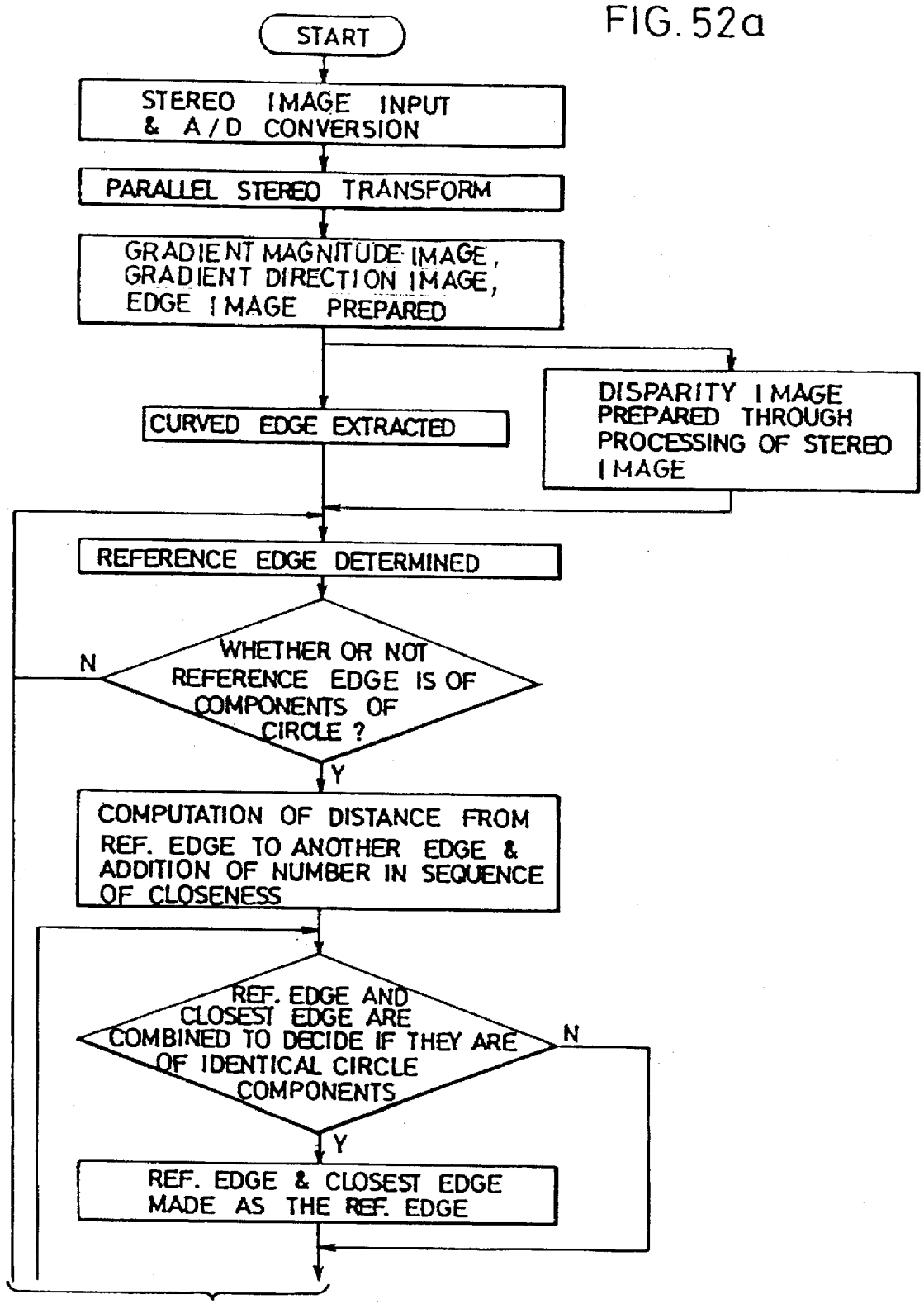
Figure 54A:
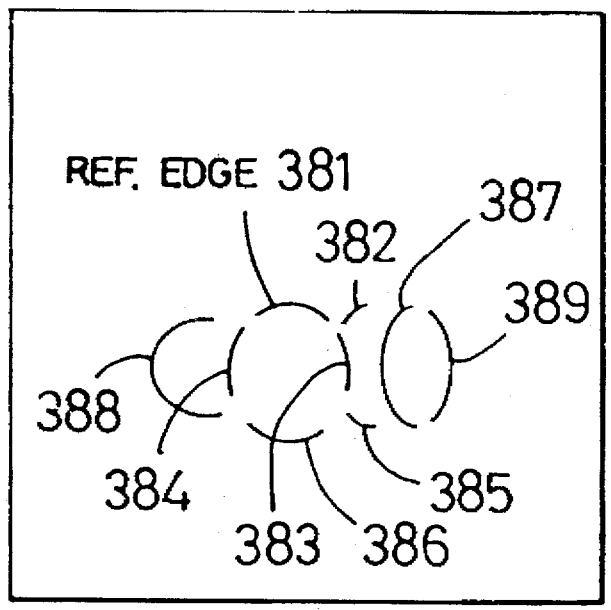
FIG. 54a is a diagram for explaining edge images in the embodiment of FIG. 52.
Figure 54B:
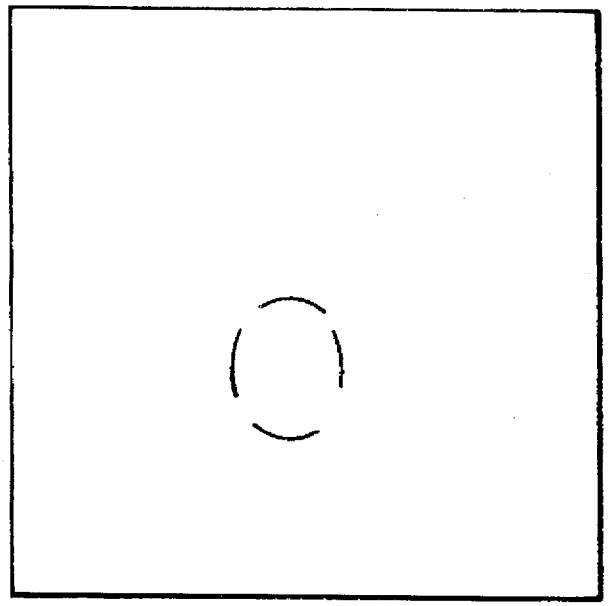
FIG. 54b is a diagram for explaining extracted circular edges in the embodiment of FIG. 52.

An embodiment of FIG. 52 is designed so that, when such circular cylindrical objectives 18 as shown in FIG. 53 are piled and thus its edge image IE is as shown in FIG. 54a, a highest-level one of the piled objectives is detected to measure its position and posture. Among a plurality of curved edges present in the edge image, an edge having the maximum disparity because of its highest-level location is selected and the selected edge is set to be a reference edge 381 as shown in FIG. 54a, and it is examined whether or not the reference edge 381 forms part of a circle. When the reference edge cannot be regarded as part of the circle, the edge having a disparity larger next to the edge 381 is selected as a reference edge and it is examined whether or not the edge forms part of the circle. The above operation is repeated until the reference edge capable of forming part of the circle is found. Thereafter, the other edges are denoted by reference numerals 382, 383, ... in an increasing order of the distance from the reference edge 381 and it is examined in the above numeral order whether or not the other edges form part of the same circle. Those of the edges judged to form part of the same circle as the reference edge are contained in the same group as the reference edge. Such processing is also carried out over other edges having distances of a predetermined value or less from the reference edge so that edges 381. 383. 384 and 386 having the same circle are assembled as shown in FIG. 54b, on the basis of which a position and posture of the highest-level objective 18 can be detected.

In an embodiment of FIG. 55, an edge having the largest disparity due to the highest-level location of the target objective is selected from the edge image of FIG. 54a. The selected edge is used as a reference edge 381, and the other edges are denoted by reference numerals 382, 383, ... in an increasing order of the distance from the reference edge 381. Thereafter, coefficients a, b, h, g and f are found by the least squares method in accordance with an equation (to be applied to ellipse) which follows.

$$ax^2+by^2+2hxy+2gx+2fy=1$$

An ellipse is applied to the reference edge 381 to calculate its center coordinate point (xo,yo). As shown in FIG. 56, a straight line 413 passing through a point 417 of the reference edge and a center 412 of an ellipse 411 intersects the ellipse at two intersection points 414 and 415, and, when a distance 416 of one 414 of the two intersection points closer to the edge point 417 therefrom exceeds a predetermined value at any points of the reference edge, the reference edge is not regarded as a circle component and a next reference edge is arbitrarily selected. When the distance does not exceed the predetermined value, on the other hand, the reference edge is regarded as a circle component, the reference edge 381 is combined with the edge 382 in the vicinity thereof, and the coefficients a, b, h, g and f are found in the above equation by the least squares method, whereby the ellipse is applied to the reference edge to calculate its center coordinate point (xo,yo). And distances between the points of the reference edge 381 and edge 382 in its vicinity and the found ellipse are found. When the found distances are all less than a predetermined value, the reference edge 381 and the edge 382 in its vicinity are judged to form part of the same circle. When even a single one of the distances is not less than the predetermined value, the edges are judged not to form part of the same circle and the reference edge 381 is combined with the next edge 383 in its vicinity to perform the aforementioned operation. When a series of operations is repeated until edges to be combined become null, edges belonging to the same circle can be combined into one. In this conjunction, the center coordinate point (xo,yo) of the above ellipse is expressed as follows.

$$xo=(hf/bg)/(ab-h^2)$$

$$yo=(hg/af)/(ab-h^2)$$

Figure 57A:
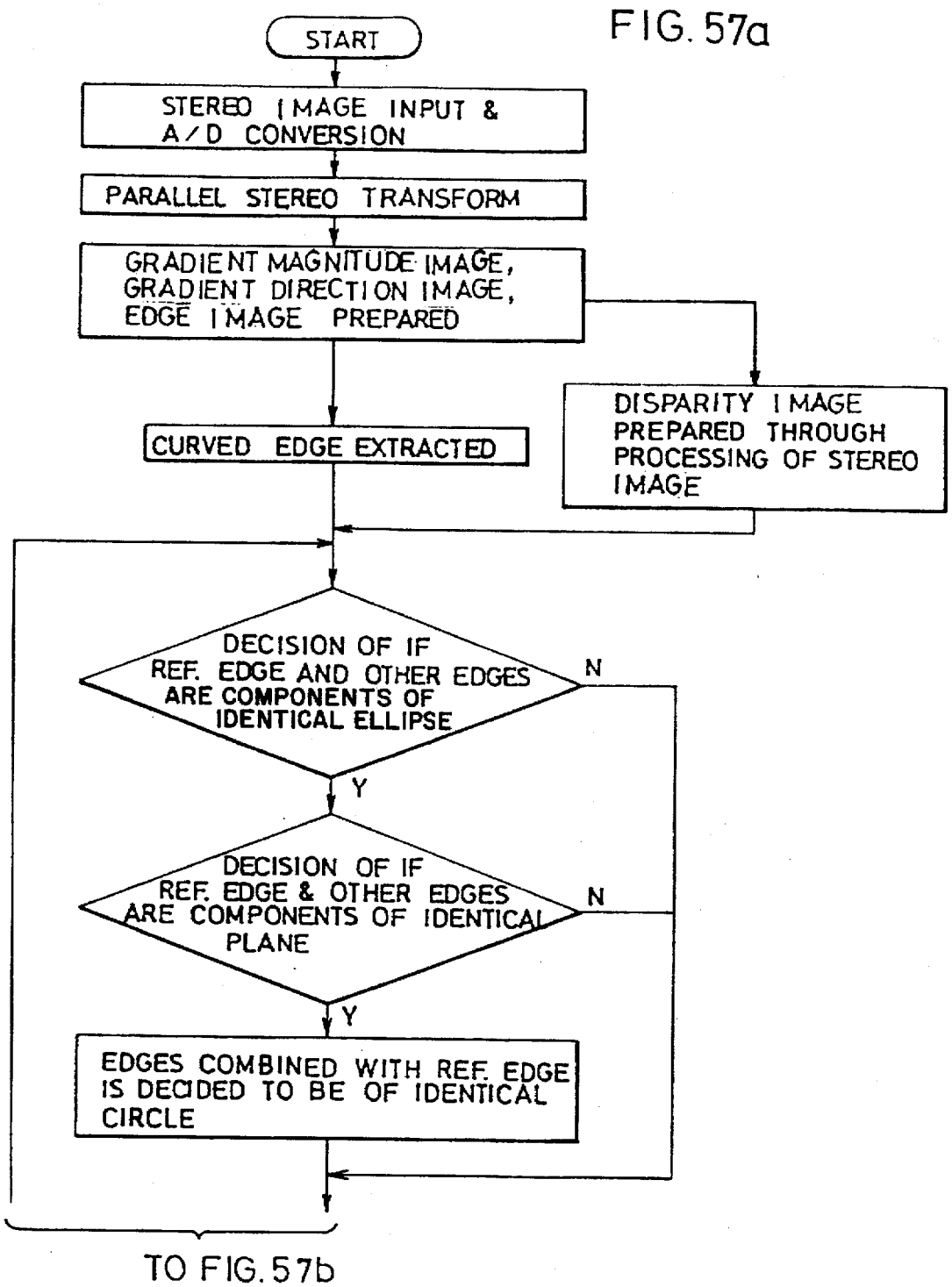
FIGS. 57, 57A and 57B show a flowchart for explaining the operation of a variation of other embodiment of the present invention.
Figure 57B:
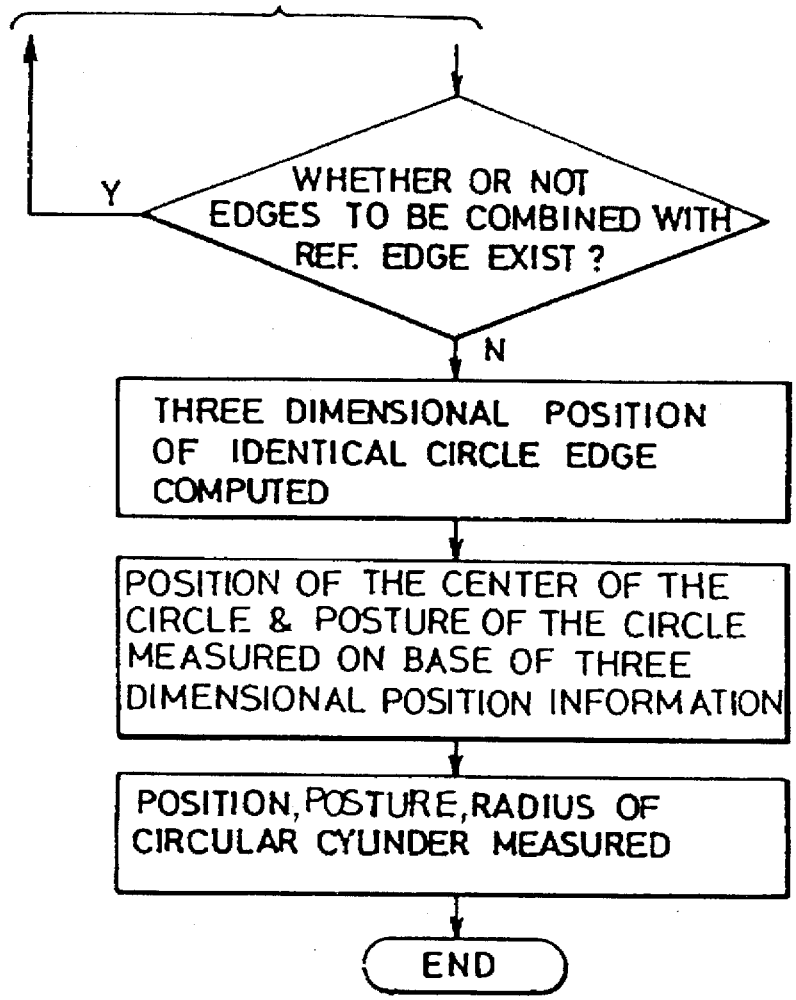
Figure 57:
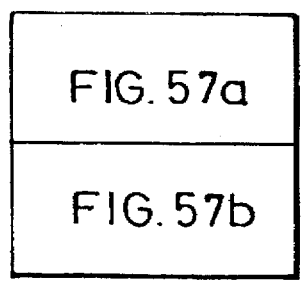
Figure 59A:
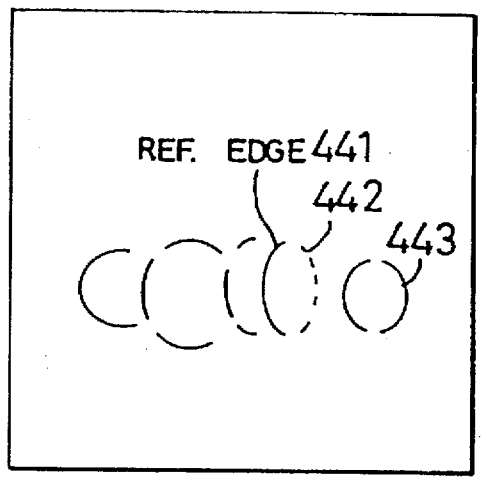
FIG. 59a is a diagram for explaining edge images in the embodiment of FIG. 57.
Figure 59B:
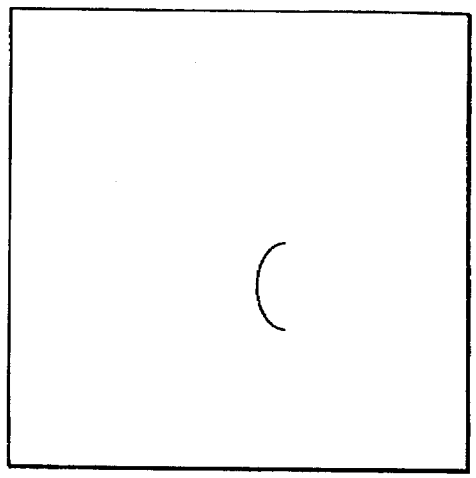
FIG. 59b is a diagram for explaining an extracted circular edge in the embodiment of FIG. 57.
Figure 60:
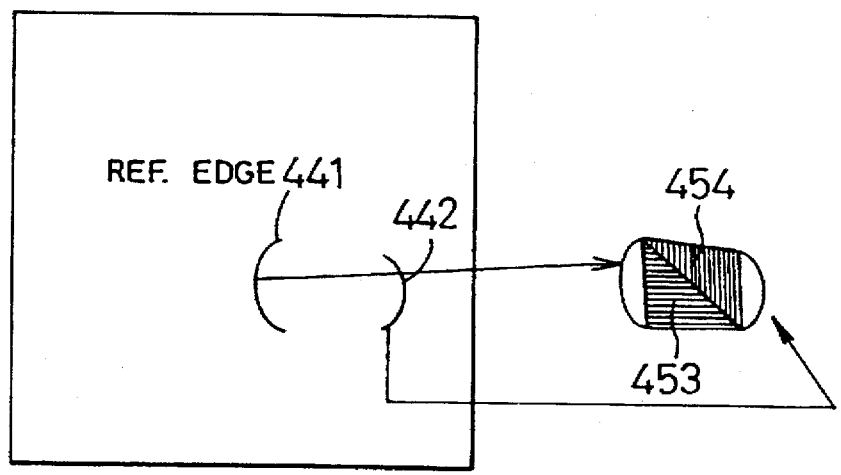
FIG. 60 is a diagram for explaining how to extract a circular edge in the embodiment of FIG. 57.

An embodiment shown in FIG. 57 is also intended to detect a highest-level one of a plurality of circular cylindrical objectives 18 piled as shown in FIG. 58. FIG. 59a shows an edge image IE of such objectives of FIG. 58. In FIG. 59a, a reference edge 441 corresponds to the highest-level edge having the maximum disparity. In this case, according to the method of the above embodiment, when the edge 442 to be detected as part of the same circle as the reference edge 441 cannot be detected due to the tilted objective or the like, it may be erroneously judged that the edge 443 is to be combined with the reference edge 441. In the illustrated example, in order to avoid such error, when the reference edge 441 and the edge 443 are judged to form part of the same circle according to the method of the above embodiment, final judgement of the same circle is carried out only when a difference is within a predetermined range between the direction of a normal of a plane 453 made with use of three-dimensional information found based on the disparity of any two points of the reference edge 441 and any one point of the other edge 443 and the direction of a normal of a plane 454 made with use of three-dimensional information found based on the disparity of any two points of the edge 443 and any one point of the reference edge 441 except for the selected two points, as shown in FIG. 60. Through the above operation, the circular edge 441 of the top surface of the highest-level objective can be extracted as shown in FIG. 59b.

Figure 61A:
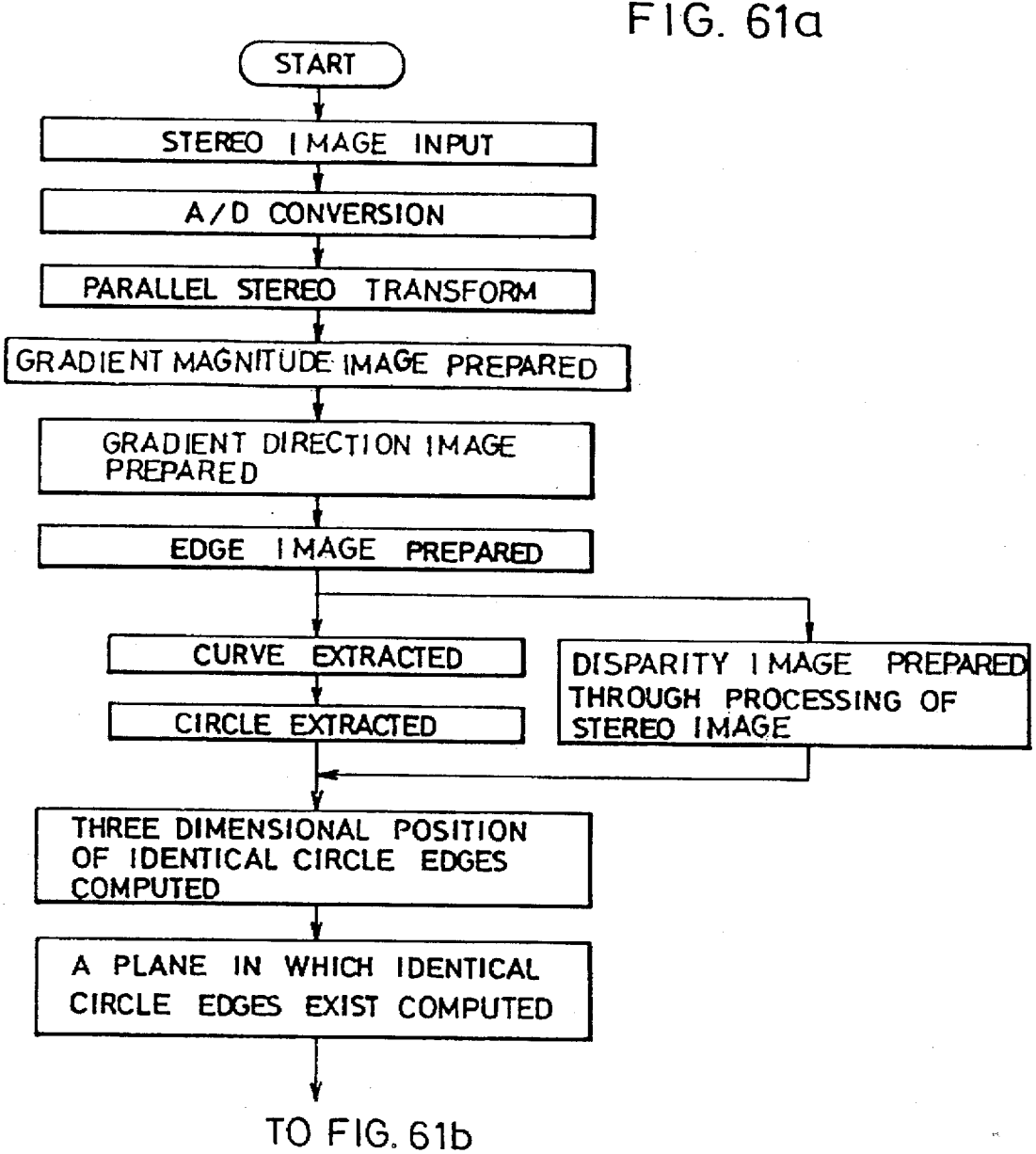
FIGS. 61, 61A and 61B show a flowchart for explaining the operation of a variation of other embodiment of the present invention.
Figure 61B:
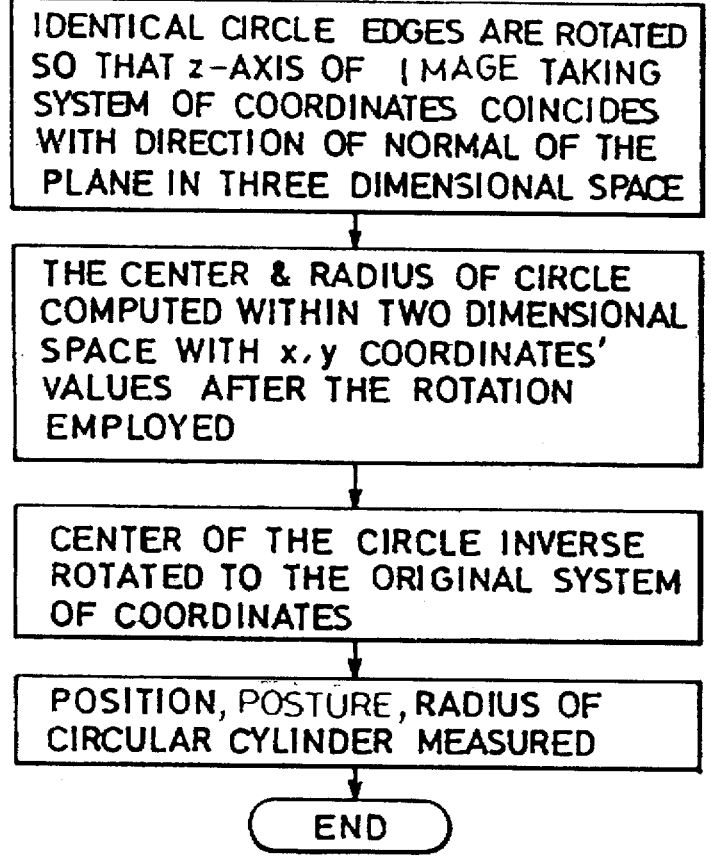
Figure 61:
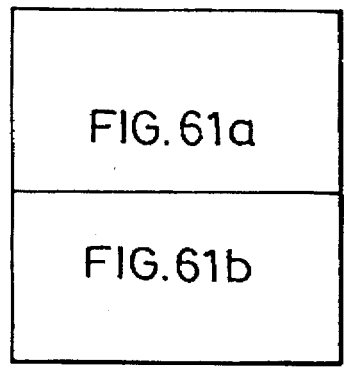

Explanation will be directed to the operation after the extraction of the circular edges of the top surface of the circular cylindrical objective. In an embodiment of FIGS. 61 to 63, as in the case of FIG. 25, three-dimensional positions of points are calculated based on the disparity of the extracted circle edges, and coefficients a, b and c are calculated by the least squares method in accordance with the following equation (to be applied to plane).

$$ax+by+cz+1=0$$

Then, a plane Pa containing the top surface of the objective 18 is found as shown in FIG. 62, three-dimensional positions of points in the top surface of the objective are rotated on an origin po of a camera coordinate system so that a normal Paz of the plane Pa coincides with the Z axis of the camera coordinate system as shown in FIG. 63, and coefficients a, b and constant r are found by the least squares method in accordance with the following equation (to be applied to right circle) to calculate a center position 491 and radius 492 of the right circle after the rotation.

$$x^2+y^2+ax+by+r=0$$

In the illustrated example, the camera coordinate system is employed as a reference coordinate system. A center position 486 of the right circle of the top surface of the objective 18 is calculated through inverse transformation (to before the rotation) of the center position 491 of the calculated right circle to obtain a position, posture and radius of the objective 18. In the calculation of the right circle after the coordinate system rotation, coefficients a, b, h, g and f are found in the above ellipse application equation by the least squares method and conversion to a standard ellipse is carried out to obtain a position and posture of the elliptical cylinder as well as a major and minor radii thereof.

Figure 64A:
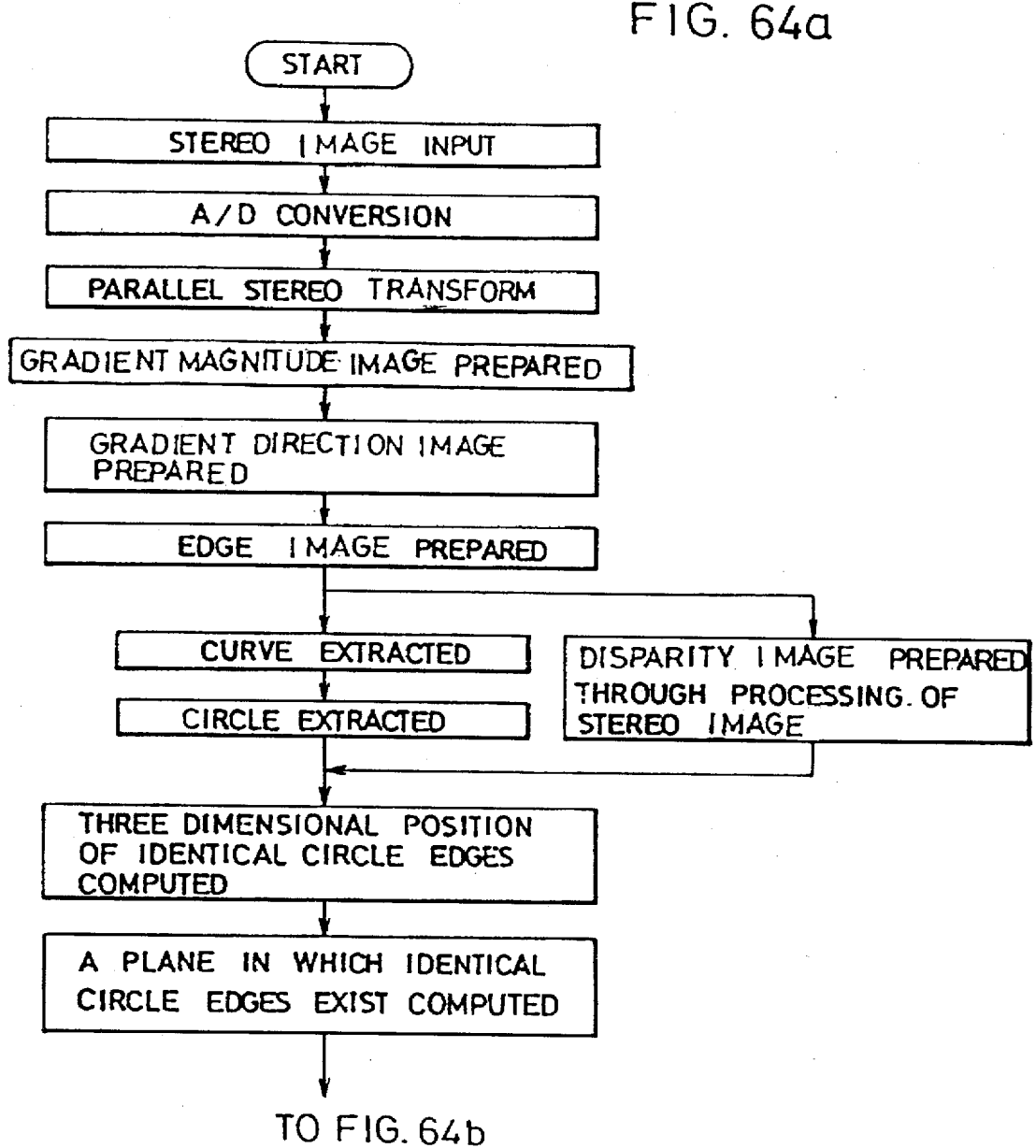

In an embodiment of FIG. 64, three-dimensional positions of points on the top surface of the objective are rotated on the origin po of the above image coordinate system as mentioned above so that the normal Paz of the plane Pa coincides with the Z axis of the coordinate system, after which certain edge points are removed so that a distance 493 (difference from the Z coordinate value) of the found plane Pa from the edge points of the circle after the rotation in the three-dimensional space exceeds a predetermined value. With use of the x and y coordinate values of edge points of the top surface of the objective 18 after the rotation except for the above edge points, coefficients a and b and constant r are found by the least squares method in accordance with the right-circle application equation to calculate a center position 491 and radius 492 of the right circle after the rotation. In this connection, the camera coordinate system is used as a reference coordinate system. And a center position 486 of the right circle of the top surface of the objective 18 is calculated through inverse transformation (to before the rotation) of the center position 491 of the calculated right circle to obtain a position, posture and radius of the objective 18 after the coordinate system rotation. In the calculation of the right circle after the coordinate system rotation, further, coefficients a, b, h, g and f are found by the least squares method in accordance with the aforementioned ellipse application equation; and a position and posture of the elliptical cylinder as well as a major and minor radii thereof are obtained through conversion to standard ellipse.

Figure 65A:
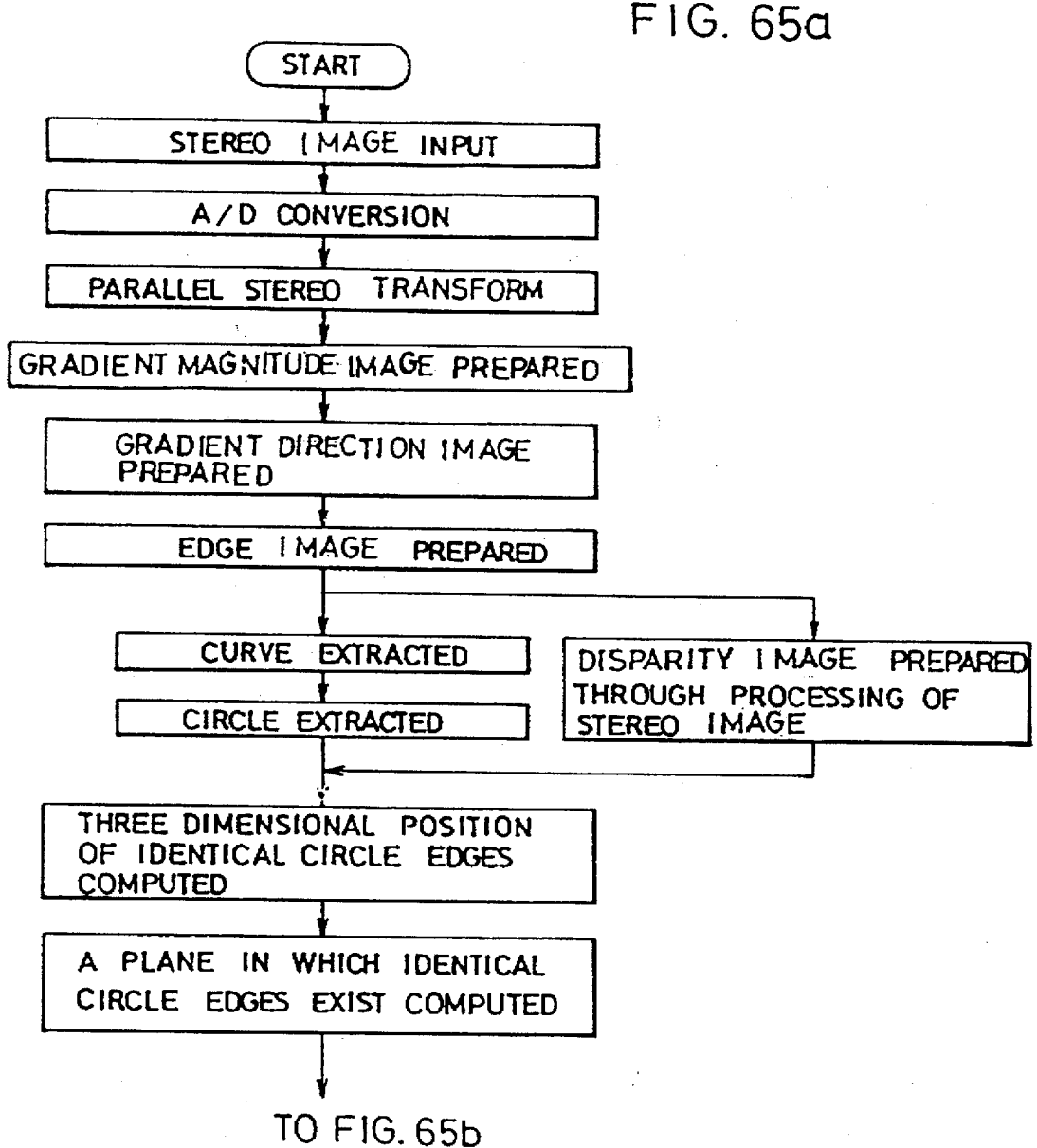
Figure 65B:
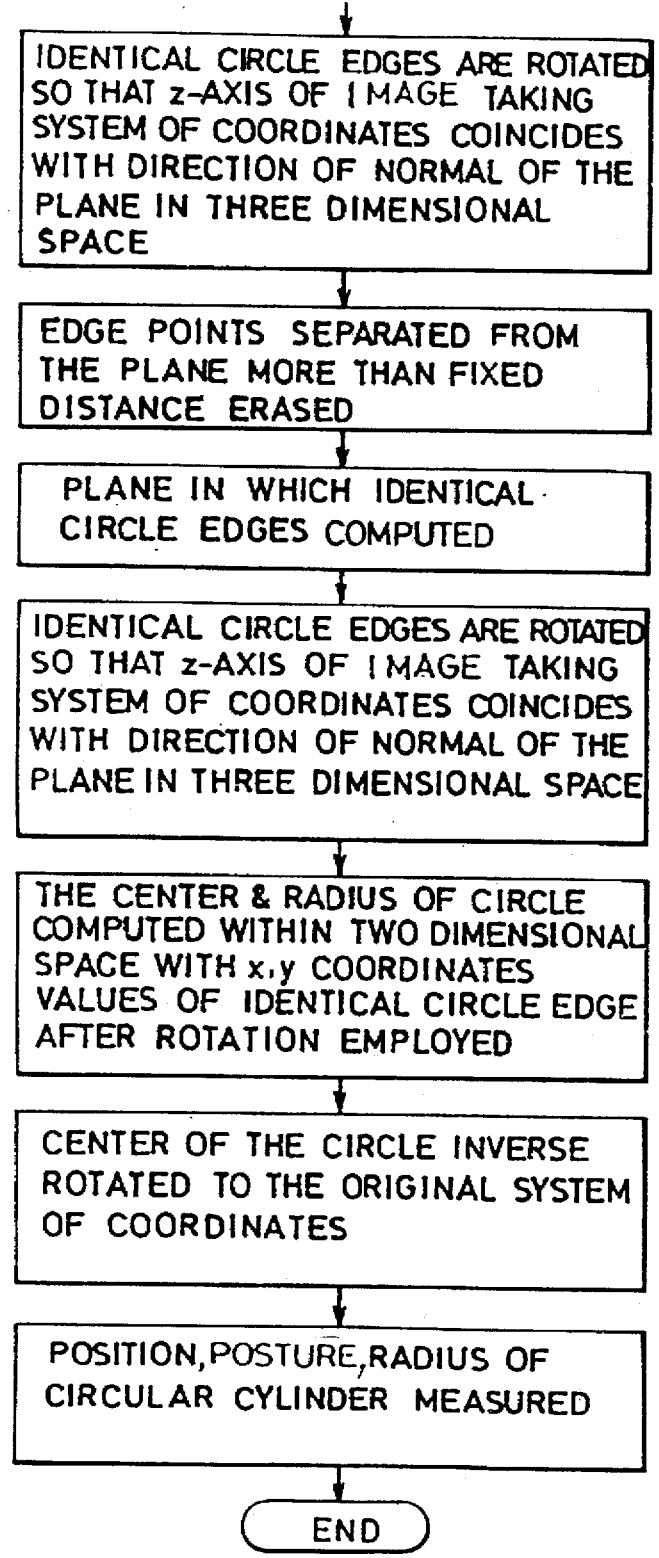

In an embodiment of FIG. 65, three-dimensional positions of points on the top surface of the objective are rotated on the origin po of the above image coordinate system as mentioned above so that the normal Paz of the plane Pa coincides with the Z axis of the coordinate system, after which certain points are so removed that a distance (difference from the Z coordinate value) of the found plane Pa from the edge points of the circle after the rotation in the three-dimensional space exceeds a predetermined value, a plane Pa in the three-dimensional space containing the edge of the top surface of the circular cylindrical objective 18 is again found by the least squares method, and three-dimensional positions of points of the top surface of the objective are rotated on the origin po of the camera coordinate system so that the normal Paz of the found plane Pa coincides with the Z axis of the coordinate system. Thereafter, with use of the x and y coordinate values of edge points of the top surface of the objective 18 after the rotation except for the above edge points, coefficients a and b and constant r are found by the least squares method in accordance with the right-circle application equation to calculate a center position 491 and radius 492 of the right circle after the rotation. And a center position 486 of the right circle of the top surface of the objective 18 is calculated through inverse transformation before the rotation) of the center position 491 of the calculated right circle to obtain a position, posture and radius of the objective 18 after the coordinate system rotation. Even in this case, in the calculation of the right circle after the coordinate system rotation, further, coefficients a, b, h, g and f are found by the least squares method in accordance with the aforementioned ellipse application equation, and a position and posture of the elliptical cylinder as well as a major and minor radii thereof are obtained through conversion to standard ellipse.

Figure 66:
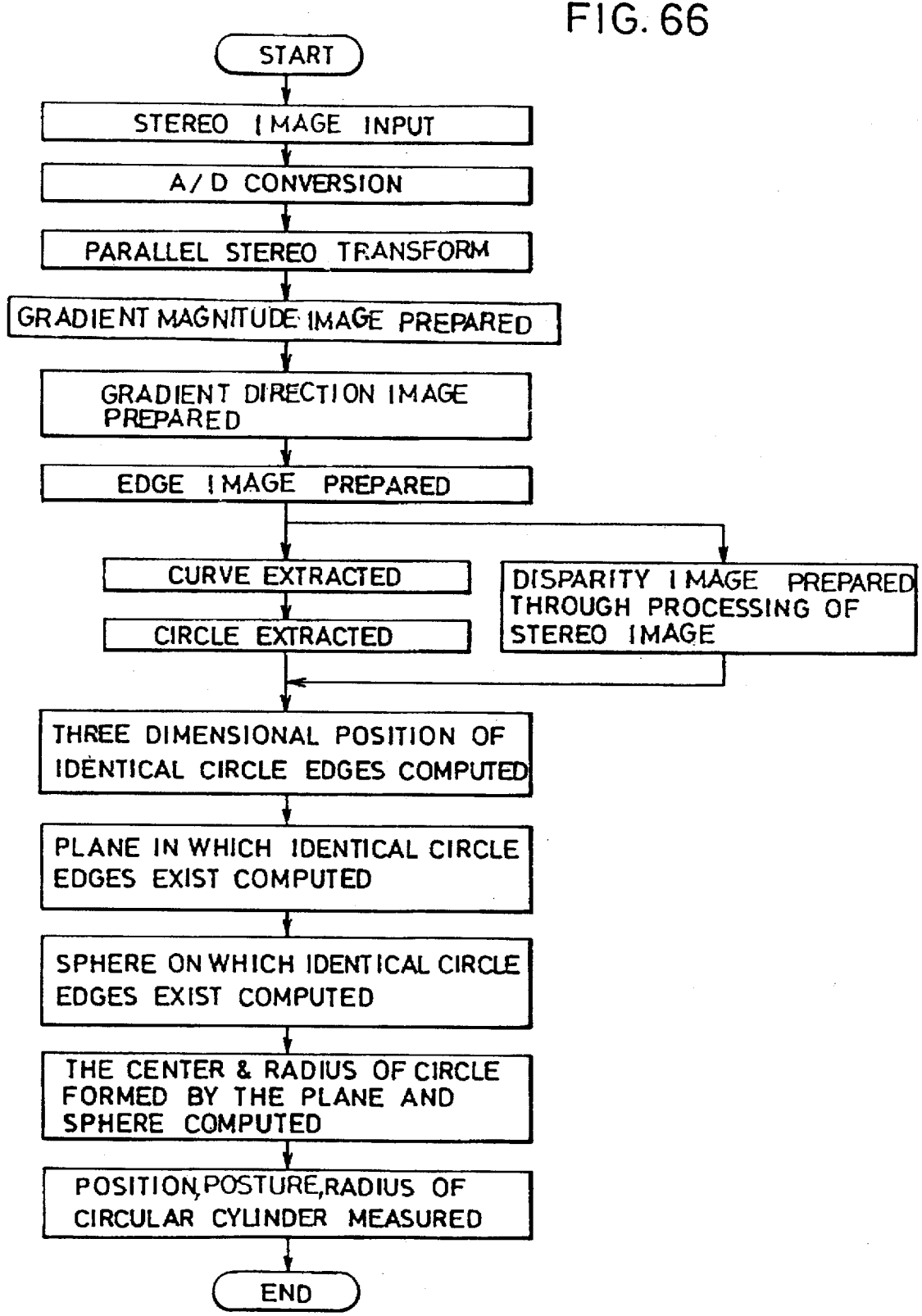
FIG. 66 is a flowchart for explaining the operation of a variation of other embodiment.
Figure 67:
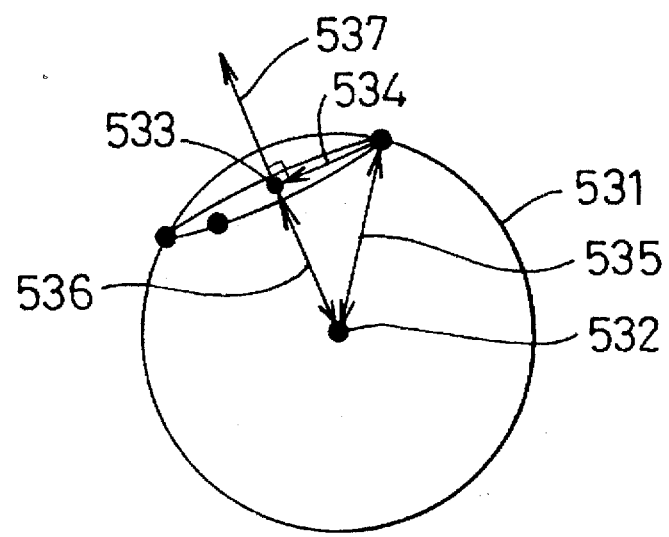
FIG. 67 is a diagram for explaining a form of the operation of the embodiment of FIG. 66.

In an embodiment of FIG. 66, three-dimensional positions of points are calculated based on the disparity of the extracted circle edges as mentioned above, and coefficients a, b and c are calculated by the least squares method in accordance with the aforementioned plane applying equation to find a plane Pa containing the top surface of the objective 18. Further, as shown in FIG. 67, a sphere 531 containing the right circle of the top surface of an objective 18 in a three-dimensional space is found by the least squares method. When a sphere is applied, since the right circle of the top surface is present on the same plane, the sphere is not uniquely determined. However, the center of the sphere is restricted to the extent that the center is present on a straight line perpendicular to the above plane Pa and passing through the center of the right circle present on the plane. Further, since the found sphere may be any sphere so long as its radius is larger than the right circle of the top surface and the sphere contains the right circle of the top surface, when any one value of any one of center coordinate axes of the sphere is fixed, the sphere can be determined. In the present embodiment, the Z coordinate value of the center of the sphere was fixed to a Z coordinate value $c_o$ different by more than the radius of the right circle from the Z coordinate values of the objective existence zone. In other words, an equation for the sphere was expressed as follows to find coefficients a and b and constant R by the least squares method.

$$x^2+y^2+z^2+ax+by-2c_oz+R=0$$

A center 533 of the right circle of the top surface of the circular cylindrical objective 18 is found by calculating an intersection point between the plane Pa and a straight line passing through a center 532 of the sphere and having the same direction vector as a normal vector 537 of the plane Pa. A radius 534 is found by subtracting a square of a distance 536 between the center of the sphere and the center of the right circle from a square of a radius 535 of the sphere to find a subtraction and then by finding a square root of the subtraction. Accordingly, even in this case, a position, posture and radius of the objective 18 can be found.

Figure 69:
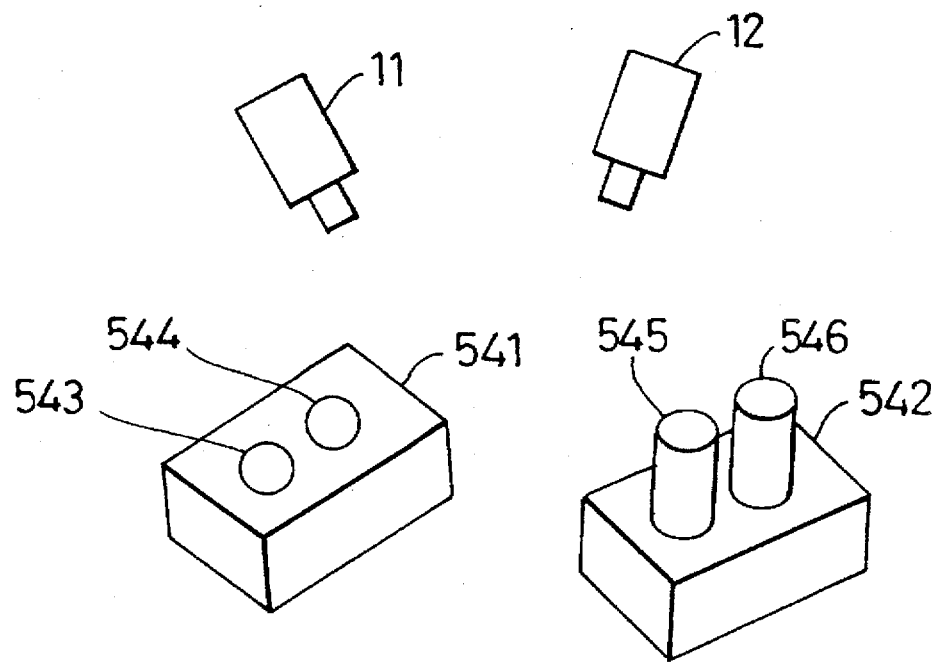
FIG. 69 is a perspective view of objectives in the embodiment of FIG. 68.
Figure 68:
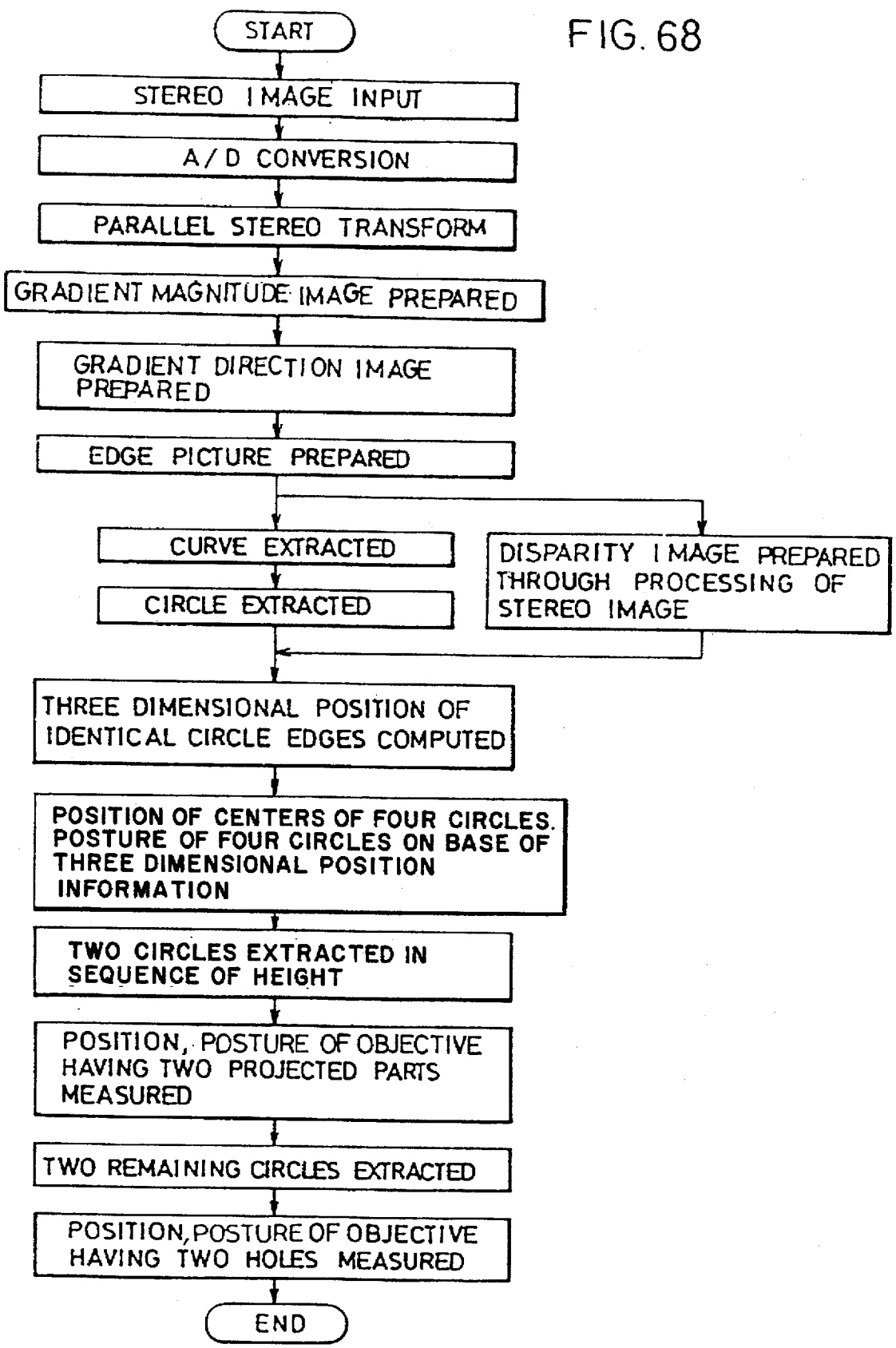
FIG. 68 is a flowchart for explaining the operation of an embodiment of the present invention which can be applied to an assembly control system.

An embodiment of FIGS. 68 to 70 shows an example where the present invention is applied to automatic assembling work. More in detail, as shown in FIG. 69, when it is desired to assemble a part 541 having two holes and a part 542 having two projections by means of robot, positions and posture of the holes and projections are detected to detect positions and postures of the parts 541 and 542.

More specifically, an edge image IE (see FIG. 70a) of a stereo reference image, a gradient direction image and a disparity image are created and curved edges are extracted from the edge image. That is, such 4 circular edges 701 to 704 as shown in FIG. 70b are extracted. When the direction of a segment connecting the middle point and centers of corresponding 4 circles 543 to 546 in a three-dimensional space as well as the direction of a normal of a plane defined by the 2 circles are calculated from the 4 circle edges, the position and posture of the part 542 having the two projections are determined. When the similar operation is carried out for the remaining 2 circles, the position and posture of the part having the two holes are determined.

In accordance with the present invention, as has been explained in the foregoing, a two-dimensional image is obtained from the same viewing point as a distance image obtained by photographing an objective in a three-dimensional space, a partial image in the two-dimensional image is specified, the specified two-dimensional partial image is applied to the distance image to extract a partial image from the distance image, and objective detecting operation is carried out over the distance partial image. That is, upon the objective detecting operation, an existence zone of the objective under detection in the distance image is previously restricted by utilizing the two-dimensional image, and the objective detecting operation is carried out over a distance partial image of the restricted zone. As a result, it will be appreciated that the present invention can realize a relatively high detecting operation when compared with the prior art for performing detecting operation over all the zones of the distance image.

What is claimed is:

1. A method for detecting a position, posture and shape of an objective, the method comprising the steps of:

obtaining a two-dimensional image of the objective from the same viewing point as a distance image obtained by photographing the objective in a three-dimensional space;

specifying a partial image in the two-dimensional image;

extracting a partial image of a distance image at a position corresponding to the position of the specified partial image of the two-dimensional image; and subjecting the partial image of the distance image to an objective detecting operation.

2. The objective recognition method as set forth in claim 1, wherein the step of specifying the partial image for the two-dimensional image is carried out based on shape pattern.

3. The objective recognition method as set forth in claim 1, wherein the step of specifying the partial image for the two-dimensional image is carried out based on statistical image features of texture.

4. The objective recognition method as set forth in claim 1, wherein the step of specifying the partial image for the two-dimensional image is carried out based on color or brightness.

5. The objective recognition method as set forth in claim 1, wherein the step of specifying the partial image for the two-dimensional image is carried out based on two-dimensional geometrical feature derived from three-dimensional geometrical feature of the target objective.

6. The objective recognition method as set forth in claim 1, wherein, as a pre-processing, a specific zone indicative of a specified height is extracted from the distance image and the partial image is specified from a two-dimensional image for the specified zone.

7. The objective recognition method as set forth in claim 1, wherein, upon objective detecting operation, three-dimensional information obtained from a distance partial image is applied to a plane, the three-dimensional information is rotated on an origin of a camera coordinate system to cause a normal of the plane to coincide with a Z axis of the camera coordinate system, the three-dimensional information after the rotation is projected onto an X-Y plane of the coordinate system, a projected image is collated with a previously-registered model to find a temporary position and posture of the target objective, the temporary position and posture are subjected to an inverse transformation to calculate a position and posture of the target objective before the rotation.

8. An objective recognition method comprising the steps of:

obtaining a two-dimensional image from the same viewing point as a distance image obtained by photographing an objective in a three-dimensional space;

specifying a partial image for the two-dimensional image;

applying the specified two-dimensional partial image to the distance image to extract a partial image for the distance image; and subjecting the distance partial image to an objective detecting operation, wherein three-dimensional information obtained from the distance partial image is applied to a plane, the three-dimensional information is rotated on an origin of a camera coordinate system to cause a normal of the plane to coincide with a Z axis of the camera coordinate system, the three-dimensional information is then projected onto an X-Y plane of the coordinate system, a projected image is collated with a previously-registered model to find a temporary position and posture of the target objective, the temporary position and posture are subjected to an inverse transformation to calculate a position and posture of the target objective before the rotation.

* * * * *